United States Patent
Ichikawa

(10) Patent No.: US 6,201,561 B1
(45) Date of Patent: Mar. 13, 2001

(54) OPTICAL SCANNER, SCANNING LENS AND IMAGE FORMING APPARATUS

(75) Inventor: Junichi Ichikawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/388,944

(22) Filed: Sep. 2, 1999

(30) Foreign Application Priority Data

Oct. 16, 1998 (JP) .................................................. 10-295892

(51) Int. Cl.⁷ ...................................................... B41J 15/14
(52) U.S. Cl. ........................ 347/241; 347/256; 347/243; 347/259; 359/197; 359/206; 359/216; 359/662
(58) Field of Search ..................................... 347/241, 243, 347/244, 256, 259, 260, 261; 359/197, 205, 206, 207, 215, 216, 662, 708, 732

(56) References Cited

U.S. PATENT DOCUMENTS

| | | | |
|---|---|---|---|
| 5,710,654 | * | 1/1998 | Ota ........................................ 359/205 |
| 5,926,306 | * | 7/1999 | Nakamura et al. ................... 359/206 |
| 6,046,835 | * | 4/2000 | Yamawaki et al. .................. 359/205 |
| 6,061,079 | * | 5/2000 | Ota et al. ............................. 347/243 |

FOREIGN PATENT DOCUMENTS

| | | |
|---|---|---|
| 62-138823 | 6/1987 | (JP) . |
| 63-204221 | 8/1988 | (JP) . |
| 4-50908 | 2/1992 | (JP) . |
| 6-18803 | 1/1994 | (JP) . |
| 8-171070 | 7/1996 | (JP) . |
| 8-190062 | 7/1996 | (JP) . |
| 9-96773 | 4/1997 | (JP) . |
| 9-230274 | 9/1997 | (JP) . |
| 10-73778 | 3/1998 | (JP) . |

* cited by examiner

Primary Examiner—N. Le
Assistant Examiner—Hai C. Pham
(74) Attorney, Agent, or Firm—Oliff & Berridge, PLC

(57) ABSTRACT

Even if light beams are caused to obliquely become incident on a light deflector, an optical scanner will be constructed of one Fθ lens without bending the center line of the lens. The optical scanner has a deflection part on which light beams are incident from a light source to incline their optical axes by a predetermined angle in a slow scan direction, and a scanning optical system for scanning an optical spot at a substantially constant velocity, and focusing incident light beams on a surface to be scanned. The scanning optical system is preferably constructed of a single lens, both sides of which are aspherical, this lens is caused to refract, on a first refractive surface, to reduce a change in an incident angle of the light beams in the slow scan direction, which change in response to an deflection angle, and is caused to refract, on a second refractive surface, such that the light beams after emission are emitted in a substantially coincided orientation in the slow scan direction. Therefore, it is possible to maintain an excellent image-formation performance on the surface to be scanned, and to reduce the curved scanning lines even if light beams obliquely become incident on one piece of scanning lens.

20 Claims, 41 Drawing Sheets

ONE-PIECE SYSTEM
F θ LENS

CURVED SCANNING LINE

ROTATION OF BEAM

SPECIAL TORIC PLANE HAVING CURVED BUS

SCHEMATIC VIEW

COUNTERMEASURE AGAINST ROTATION

INFLUENCE OF BUS ACTING
ON OUT-OF-AXIS LIGHT BEAM

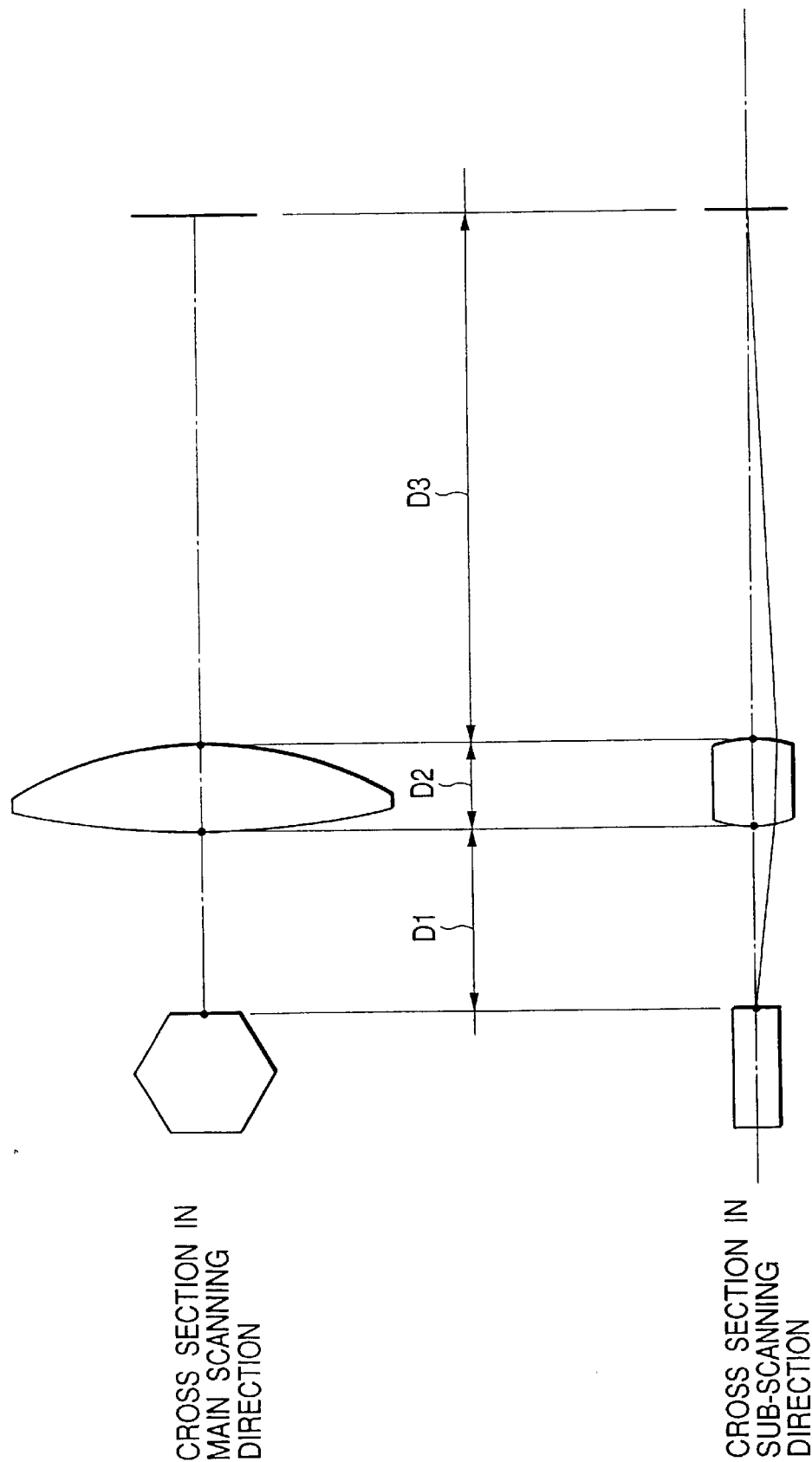

(1ST EMBODIMENT)

(2ND EMBODIMENT)

(3RD EMBODIMENT)

(4TH EMBODIMENT)

(5TH EMBODIMENT)

(6TH EMBODIMENT)

(1ST EMBODIMENT)

(2ND EMBODIMENT)

(3RD EMBODIMENT)

(4TH EMBODIMENT)

(5TH EMBODIMENT)

(6TH EMBODIMENT)

(1ST EMBODIMENT)

(2ND EMBODIMENT)

(3RD EMBODIMENT)

(4TH EMBODIMENT)

(5TH EMBODIMENT)

(6TH EMBODIMENT)

Ex.6 EOS

SCANNING POSITION (mm)

A3 8deg 116mm

OPTICAL SCANNER, SCANNING LENS AND IMAGE FORMING APPARATUS

BACKGROUND OF THE INVENTION

1. Field of the Invention

The present invention relates to an optical scanner for scanning laser beams, a scanning lens, which is an optical component for scanning laser beams, and an image forming apparatus for forming an image by scanning laser beams, and more particularly to an optical scanner having an one-piece comprised scanning lens having the function of an Fθ lens used in a laser scanning optical system, a scanning lens and an image forming apparatus.

2. Description of the Related Art

A laser beam scanner is used for a laser printer or a digital copying machine. This laser beam scanner generally comprises: as shown in, for example, FIG. 3, a laser beam source 11; a collimator lens 13 for converting divergent light from the laser beam source 11 into substantially parallel light beams; a slit 15; a cylinder lens 17 for focusing only parallel light beams in the slow scan direction; a light deflector 19 having a reflective surface near a focal position focused by the cylinder lens 17 for rotating at a constant angular velocity; an Fθ lens 21 for moving a light beam deflected at a constant angular velocity on a surface to be scanned at a constant velocity and focusing the light beam in the fast scan direction; and an inclination-correcting cylinder mirror 23 for causing the reflective surface of the light deflector 19 to be conjugate with the surface to be scanned in the slow scan direction and focusing the light beam on the surface to be scanned (see Japanese Published Unexamined Patent Application No. 6-18803).

In the above-described laser beam scanner, the following three functions are requested for the optical system (scanning optical system) on or after the light deflector. The first function is to convert a light beam deflected by the light deflector at a constant angular velocity so as for the light beam to scan on the surface to be scanned at a constant velocity. The second function is to cause the reflective surface of the light deflector to be conjugate with the surface to be scanned in order to prevent the scanning line position on the surface to be scanned from fluctuating in the slow scan direction by means of an error when a plurality of reflective surfaces, which the light deflector has, incline in the slow scan direction. The third function is to cause both substantially parallel light beams in the fast scan direction and divergent light beams in the slow scan direction to form an image on the surface to be scanned.

Such functions required for the scanning optical system have generally been implemented by a plurality of optical elements (two pieces of Fθ lenses and a cylinder mirror in the above-described example). In order to reduce the component count in the laser beam scanner and to make the apparatus size compact, however, there have been proposed a large number of techniques for providing one piece of lens with the above three functions (Japanese Published Unexamined Patent Application Nos. 62-138823, 4-50908, 8-190062 and the like). Almost all of these techniques are applied to an optical system in which an incident light beam on a light deflector and a reflective light beam thereby are in a fast scan surface including the normal of a deflecting reflective surface.

As the scanning optical system using an Fθ lens, there are an underfilled optical system and an overfilled optical system.

In the underfilled optical system, the width of a light beam becoming incident on a polygonal rotating mirror is smaller than the polygonal rotating mirror, and the light beam does not protrude outwardly of the reflective surface while the surface to be scanned is being scanned by the light deflector (see the Japanese Published Unexamined Patent Application No. 6-18803). In the underfilled optical system, as shown in FIG. 4, all light beams becoming incident on the light deflector are used for deflection and scanning, and therefore, the light beam energy is effectively used. Since the width of a light beam becoming incident on the Fθ lens irrespective of any scanning angle is constant, there is a merit that the diameter and quantity of light of an optical spot to be imaged on the surface to be scanned are uniform. Since, however, the width of the reflective surface in the light deflector must be made sufficiently larger than that of the incident light beam, there is a demerit that the diameter of the polygonal rotating mirror will be dramatically large if a number of the reflective surfaces is increased to speed up or the width of the incident light beam on the light deflector is made larger to reduce the optical spot diameter on the surface to be scanned.

On the other hand, in the overfilled optical system, the width of a light beam becoming incident on a polygonal rotating mirror is larger than the polygonal rotating mirror, and the light beam always protrudes outwardly of the opposite sides of the reflective surface used for scanning while the surface to be scanned is being scanned by the light deflector (see the Japanese Published Unexamined Patent Application No. 8-171070). In the overfilled optical system, as shown in FIG. 5, part of a light beam becoming incident on the light deflector is used for deflection and scanning, and therefore, a loss in the light beam energy is significant. Since the width of a light beam becoming incident on the Fθ lens changes depending upon the scanning angle, there is a demerit that the diameter of an optical spot imaged on the surface to be scanned and power significantly change. Since, however, the width of the reflective surface in the light deflector becomes an opening width of the light beam becoming incident on the Fθ lens and the width of the reflective surface of the polygonal rotating mirror becomes smaller, there is a merit that the diameter of the polygonal rotating mirror required is small even if an attempt is made to increase the number of reflective surfaces or to make the optical spot diameter on the surface to be scanned smaller.

In order to reduce the respective demerits of the above-described underfilled and overfilled optical systems, there has been proposed a method of causing a light beam to become incident on the light deflector from near the central portion of the deflection angle of the light deflector as also shown in FIG. 6 (Japanese Published Unexamined Patent Application Nos. 63-204221 and 9-230274). In the case of the underfilled optical system, there is a merit that the width of the reflective surface can be made smaller and the diameter of the polygonal rotating mirror becomes smaller because the light beam width projected on the reflective surface becomes small. Also, in the case of the overfilled optical system, there is a merit that a change in the width of the incident light beam on the Fθ lens based on deflecting reflection becomes smaller and heterogeneity in the optical spot diameter and the quantity of light on the surface to be scanned is improved. Since it is actually necessary to separate the incident light beam on the light deflector from the deflected and reflected light beam, the light beam is caused to obliquely become incident in the slow scan direction although on the optical axis of the Fθ lens in the fast scan direction.

Also, for the optical scanner, there has been proposed a technique using a plurality of light beams in order to correspond to plural colors (see the Japanese Published Unexamined Patent Application No. 10-73778). According to this technique, as shown in FIG. 7, a plurality of light beams arranged in the slow scan direction are incident on a single light deflector and a plurality of light beams reflected by the light deflector are guided to different positions on the surface to be scanned by respective different mirrors not to thereby increase the number of the light deflectors. Also, in order to cause the plurality of light beams arranged in the slow scan direction to become incident on the same reflecting point on the light deflector, the respective light beams are caused to become obliquely incident (hereinafter, referred to as oblique-incidence) on the light deflector.

[Problems to be solved by the Invention]

To cause a light beam to become oblique-incident on the light deflector in the slow scan direction has a merit, but when oblique-incident on the light deflector as shown in FIG. 8, the angle of a light beam deflected and scanned by the light deflector in the slow scan direction is changed by the deflection angle, and therefore, the lens incident position and angle of the deflected light beam becoming incident on the scanning optical system in the slow scan direction are changed by the deflection angle of the light deflector (the Japanese Published Unexamined Patent Application No. 10-73778). For this reason, in a case where the scanning optical system is constructed of one piece of lens, the curved scanning line on the surface to be scanned and the deteriorated image-formation performance of the optical spot could not be avoided because the locus of the light beam is curved with respect to the center line of the Fθ lens, which is a straight line in the lens shape conventionally proposed. In order to resolve such problems, as shown in FIGS. 9 and 10, the center line of the Fθ lens is incurvated to meet the locus of the incident light beam on the Fθ lens curved by the oblique-incidence to thereby prevent the deteriorated image-formation performance, and further at least one of the lens surfaces is shifted in the slow scan direction to reduce the curved scanning line on the surface to be scanned.

In a case, however, where the shape of the lens is incurvated to meet the curved locus of the lens incident light beam, the Fθ lens is to satisfy the performance only with respect to the light beam which becomes incident on the Fθ lens at a predetermined angle and position. Therefore, the same number of lenses as the number of light beams are required with respect to a plurality of light beams having different oblique incident angles, and it was not possible to reduce the number of the lenses by sharing the lens with respect to a plurality of light beams. Also, since a plurality of lenses are arranged in the slow scan direction, it is necessary to make the oblique incident angle of each light beam larger in order to cause a light beam to become incident on each lens, and as a result, the center line of the lens must be curved by a large amount, leading to a problem that it is difficult to manufacture the lens.

Also, in order to reduce the angle of oblique incidence, there is also a technique of causing both a light beam becoming incident on the light deflector and a light beam deflected and reflected by the light deflector to pass through a scanning lens (see Japanese Published Unexamined Patent Application Nos. 63-204221 and 9-96773). In a case where the scanning lens is constructed of one piece, optical paths of both the incident light beam on the light deflector and the light beam deflected and reflected approach each other from the scanning lens toward the surface to be scanned in the slow scan direction because the scanning lens is a convex lens, and it is difficult to separate the incident light beam from the deflected light beam. For the reason, the angle of oblique incidence had to be still made larger.

SUMMARY OF THE INVENTION

In consideration of the above-described facts, it is an object of the present invention to provide an optical scanner, a scanning lens and an image forming apparatus capable of being constructed of one lens system even for a plurality of light beams having different angles of oblique-incidence without bending the center line of the lens even if a light beam is caused to become obliquely incident on the deflection part.

Also, it is another object of the present invention to easily separate the incident light on the deflection part from the light deflected and reflected even when one piece of lens is used for the scanning lens.

With reference to FIGS. 1 and 2, a description will be made of the conceptions of the optical scanner which attains the above-described object. FIG. 1A shows the structure of the scanning optical system as viewed from the direction along the fast scan direction, and FIG. 1B shows the structure as viewed from the direction along the slow scan direction. FIG. 2 schematically shows the relation between the deflection part, the scanning optical system and the surface to be scanned, FIG. 2A shows the structure of the scanning optical system as viewed from the direction along the slow scan direction, and FIG. 2B shows the structure as viewed from the direction along the fast scan direction. FIGS. 1 and 2 show a light beam (solid line) for irradiating the vicinity of the central portion (COS; Center Of Scan) of the surface to be scanned, and a light beam (dotted line) for reaching the vicinity of the end portion (EOS; Edge Of Scan) of the surface to be scanned. An oblique-incident light beam on the deflection part is deflected and reflected by the deflection part, whereby after the deflection and reflection, the angle of the light beam toward the vicinity of EOS in the slow scan direction becomes larger than the angle of the light beam toward the vicinity of COS. Therefore, the angle and position of the light beam on the first refractive surface in the slow scan direction are changed depending on the deflection angle of the deflection part.

The first refractive surface of the scanning optical system reduces a change in the angle of the light beam in the slow scan direction caused by the deflection angle. More specifically, the shape of the first refractive surface in the slow scan direction is determined by the angle of oblique incidence of the incident light beam on the scanning optical system and the refractive index of the lens material. The deflected light beams, whose angles in the slow scan direction have been made substantially the same by the first refractive surface, are refracted by the second refractive surface at a position close to the deflection part in the vicinity of EOS rather than in the vicinity of COS, whereby the light beams toward the vicinity of COS and the vicinity of EOS after emitted from the second refractive surface enter a substantially aligned state both in angle and in position in the slow scan direction as shown in FIG. 1A. As shown in FIG. 2B, the direction of the light beams refracted by the first refractive surface, that is, a light beam L1 passing through the scanning optical system, among light beams for irradiating the vicinity of COS, and a light beam L2 passing through the scanning optical system, among light beams for reaching the vicinity of EOS become substantially in parallel with each other, and light beams refracted by the second refractive surface coincide as viewed from the slow scan direction. Therefore, the first and second refractive surfaces are caused to have such a function, whereby it is possible to maintain the excellent image-formation performance on the surface to be scanned, and to also reduce the curved scanning line even if a light beam obliquely becomes incident on a single lens.

According to the invention specified in claim 1, there is provided an optical scanner having a deflection part for deflecting, in a fast scan direction, light beams incident to incline their optical axes by a predetermined angle in a slow scan direction, which intersects the fast scan direction; and a scanning optical system provided on the deflection side of the deflection part, for focusing, on the surface to be scanned, the light beams incident to scan an optical spot, wherein the scanning optical system is constructed of a scanning lens, which refracts, on a first refractive surface on the side of the deflection part, to reduce a change in the incident angle of the incident light beams in the slow scan direction, which changes in response to an deflection angle of the deflection part within a fast scan range in the fast scan direction, and which emits, on a second refractive surface on the side of the surface to be scanned, such that the light beams after emission substantially coincide in the slow scan direction.

In the optical scanner according to claim 1, a light beam becomes incident on the deflection part such as a polygonal rotating mirror having a plurality of deflecting surfaces for reflecting incident light beams. This light beam is caused to becomes incident to incline its optical axis by a predetermined angle in the slow scan direction, that is, is caused to obliquely become incident, and the incident light beam is deflected into the fast scan direction by the deflection part. The light beam thus deflected is focused on the surface to be scanned by the scanning optical system, and the optical spot is scanned. When the light beam is caused to obliquely become incident on the deflection part from the slow scan direction as described above, the angle of the light beam deflected and scanned in the slow scan direction is changed by the deflection angle, and therefore, the incident position and angle of the deflected light beam becoming incident on the scanning optical system in the slow scan direction are changed by the deflection angle of the deflection part. More specifically, the light beam, which has been caused to obliquely become incident on the deflection part, is deflected and reflected by the deflection part, whereby after the deflection and reflection, the angle of the light beam toward the vicinity of the scanning end portion in the slow scan direction becomes larger than the angle of the light beam toward the vicinity of the center of scanning. Therefore, the angle and position of the light beam on the first refractive surface in the slow scan direction are changed depending upon the deflection angle of the deflection part.

Thus, the scanning optical system is constructed of the following scanning lens. The scanning lens refracts to reduce the change in the incident angle of the incident light beam in the slow scan direction which changes in response to the deflection angle, in the fast scan direction, of the deflection part within the fast scan range on the first refractive surface on the side of the deflection part. More specifically, the deflected light beams based on the fast scan are caused to have substantially the same orientation of the slow scan direction on the first refractive surface within the fast scan range. This causes the light beams refracted on the first refractive surface to become light beams having substantially the same orientation. At the same time, the light beams after the emission on the second refractive surface of the scanning lens on the side of the surface to be scanned are emitted to substantially coincide in the slow scan direction. More specifically, the light beams refracted on the second refractive surface are caused to coincide, as viewed from the slow scan direction, with the deflected light beam whose orientation in the slow scan direction has been made substantially the same by the first refractive surface. This enables an excellent image-formation performance to be maintained on the surface to be scanned and the curved scanning line to be reduced even if the light beams obliquely become incident on the scanning lens.

Generally, the thickness of the lens differs between in the vicinity of the central optical axis and in the marginal portion. Therefore, the deflected light beam in the vicinity of the central optical axis is different from that in the marginal portion in an optical length from the deflecting surface to the first refractive surface of the lens and an optical length from the first refractive and the second refractive surface. Thus, when, for example, a light beam in the vicinity of the optical axis having the shortest optical length from the deflecting surface to the first refractive surface, is set to a reference light beam, the incident angle on the first refractive surface in the slow scan direction can, according to the present invention, be set to a reference angle, and the emitting direction and position on the second refractive surface in the slow scan direction, that is, the optical path in the slow scan direction can be set to the reference optical path. In this case, the scanning optical system according to the present invention corresponds to refracting to reduce a change from the reference angle on the first refractive surface, and refracting to substantially coincide with the reference optical path on the second refractive surface.

The above-described deflection part is capable of using a polygonal rotating mirror having a plurality of deflecting surfaces for reflecting an incident light beam. In the polygonal rotating mirror having a plurality of deflecting surfaces, the angles of the respective deflecting surfaces have variations (so-called surface-inclination). In order to resolve this problem, therefore, an image-formation optical system (so-called anamorphic optical system), in which incident light beams are imaged into a long linear shape on the deflecting surface in the fast scan direction, is preferably provided on the incidence side of the deflection part.

Also, in the scanning optical system, an incident light beam is preferably focused on the surface to be scanned so that an optical spot is scanned at a substantially constant velocity.

In this respect, a light beam deflected and reflected by a deflection part does not pass the same optical path as the incident light beam by causing a light beam to obliquely become incident on the deflection part. For this reason, it becomes easy to separate the incident light on the deflection part from the light deflected and reflected even when a single lens is used for the scanning lens according to the present invention.

The invention specified in claim 2 is characterized in that the scanning lens is constructed of a single lens whose double sides are aspherical. A lens optical system having focusing and divergence as the object can be basically constructed of a piece of lens, and can be generally constructed of a spherical lens. Since, however, the spherical lens can be elucidated by a single theory in which a spherical surface is regarded as a boundary, a structure of multi-group and multi-pieces is anticipated in order to implement the scanning lens, and the structure becomes complicated. On the other hand, when the boundary surface is made to be an aspherical surface, there are some cases where lens function based on the multi-group and multi-piece can be implemented by one surface. For this reason, the scanning lens is constructed of a single lens whose double sides are aspherical to thereby obtain a scanning optical system with a simple structure.

The invention specified in claim 3 is characterized in that the scanning lens functions as an Fθ lens. Of the functions required for the scanning optical system, it can be implemented by an Fθ lens to scan a light beam, which is deflected at a substantially constant angular velocity by the deflection part, on the surface to be scanned at a substantially constant velocity. Therefore, the scanning lens functions as an Fθ lens, whereby the light beam can be scanned and focused without impairing the function as the Fθ lens even if the light beam incident on the scanning lens becomes obliquely incident.

According to the invention specified in claim 4, there is provided an optical scanner having a deflection part for deflecting, in a fast scan direction, a light beam incident to incline its optical axis by a predetermined angle in the slow scan direction, which intersects the fast scan direction; and a scanning optical system provided on the deflection side of the deflection part, for focusing, on a surface to be scanned, the light beam incident to scan an optical spot, wherein the scanning optical system is a scanning lens constructed of a single lens, and when the lens surface on the side of the deflection part is set to a first surface, the lens surface on the side of the surface to be scanned is set to a second surface, curvature radii at a light beam passage position at the same deflection angle for the first and second surfaces in the slow scan direction are set to Rs1 and Rs2 respectively, and curvature radii at the light beam passage position for the first and second surfaces in the fast scan direction are set to Rt1 and Rt2 respectively, the shapes of the first and second surfaces at a position where at least light beams having the same deflection angle pass through are formed to satisfy the following equations:

|Rs1/Rs2|>5.9

|Rt1/Rt2|>3.7

The shapes of the surfaces of the scanning lens can be determined by the angle of oblique-incidence of an incident light beam on the scanning lens and the refractive index of the lens material. Since the angle and position of the light beam in the slow scan direction are different at a point of time whereat the light beam becomes incident on the first surface of the scanning lens, the image-formation performance cannot be satisfied when the first surface is caused to have strong power enough to focus the light beam. In a case where the scanning lens is aspherical, the curvature radius of the lens, at a position where the light beam passes through, is changed in response to the deflection angle. At any light beam passage positions, the power in the fast scan direction and in the slow scan direction become greater on the second surface than on the first surface. Thus, by defining the sizes of the curvature radii for the first and second surfaces, that is, relation of power by each of the following equations:

|Rs1/Rs2|≧5.9, |Rt1/Rt2|≧3.7 the image-formation performance can be satisfied. However, the lens surface on the side of the deflection part is set to a first surface, the lens surface on the side of the surface to be scanned is set to a second surface, curvature radii at a light beam passage position at the same deflection angle for the first and second surfaces in the slow scan direction are set to Rs1 and Rs2 respectively and curvature radii at a light beam passage position in the fast scan direction are set to Rt1 and Rt2 respectively.

In this respect, the scanning optical system can be constructed of the following scanning lens. The scanning lens can be constructed such that it refracts to reduce the change in the incident angle of the incident light beam in the slow scan direction which changes in response to the deflection angle, in the fast scan direction, of the deflection part within the fast scan range on the first surface on the side of the deflection part, and that the light beams after the emission on the second surface on the side of the surface to be scanned are emitted to substantially coincide in the slow scan direction. Such construction causes the deflected light beam based on the fast scan to have the substantially same orientation of the slow scan direction on the first surface within the fast scan range. Thus, the light beam refracted on the first surface become light beam having the substantially same orientation. Also, the light beam refracted on the second surface are caused to coincide, as viewed from the slow scan direction, with the deflected light beam whose orientation in the slow scan direction has been made substantially the same by the first surface. This enables an excellent image-formation performance to be maintained on the surface to be scanned and the curved scanning line to be reduced even if the light beam obliquely become incident on the scanning lens.

Also, in order to satisfy the image-formation performance by eliminating any influences of an change in the angle of the deflected light beam, in the slow scan direction, caused by making a light beam obliquely become incident (oblique incidence) to incline its optical axis by a predetermined angle in the slow scan direction, an angle to be aligned by the first surface is preferably within 0.3 degree.

In the invention specified in claim 5, an aspherical shape of a scanning lens has been specified. In other words, since the scanning lens has an aspherical shape, it is possible to specify it mathematically. Concretely, assuming the direction of the axis of rotation of the deflection part to be x, the fast scan direction perpendicular to the x-axis to be y, a direction perpendicular to the x-axis and y-axis to be z, a curvature radius near the z-axis in the slow scan direction to be RX, a curvature radius near the z-axis in the fast scan direction to be RY, a conical constant of the aspherical shape including the z-axis in the slow scan direction to be KX, a conical constant of the aspherical shape including the z-axis in the fast scan direction to be KY, and higher order aspherical constants to be AR, BR, CR, DR, AP, BP, CP and DP respectively, the aspherical shapes of the scanning lens on both sides are characterized by being curved surfaces in which the position z of the surface in the z-axis direction is represented by the following equation:

$$z = \frac{\frac{x^2}{RX} + \frac{y^2}{RY}}{1 + \sqrt{1 - (1+KX) \cdot \left(\frac{x}{RX}\right)^2 - (1+KY) \cdot \left(\frac{y}{RY}\right)^2}} +$$

$$AR \cdot [(1-AP) \cdot x^2 + (1+AP) \cdot y^2]^2 +$$

$$BR \cdot [(1-BP) \cdot x^2 + (1+BP) \cdot y^2]^3 +$$

$$CR \cdot [(1-CP) \cdot x^2 + (1+CP) \cdot y^2]^4 +$$

$$DR \cdot [(1-DP) \cdot x^2 + (1+DP) \cdot y^2]^5$$

[Equation 3]

The aspherical shapes in the first and second surfaces of the scanning lens can be expressed using this equation. The detail of this equation is also described in Japanese Published Unexamined Patent Application No. 8-190062. The shape of the surface expressed by this equation is formed on a x-axis parallel to the axis of rotation of the deflection part and a y-axis perpendicular to the axis of rotation of the deflection part, and therefore, the center line of the lens becomes a straight line. Accordingly, in a case where a plurality of light beams are incident on the scanning lens at an angle based on symmetrical oblique incidence, the plurality of light beams can be caused to form an excellent image by a single scanning lens if the center line of the lens is caused to coincide with an axis of symmetry at an angle based on the oblique incidence.

The invention specified in claim 6 is characterized in that a plurality of light beams are incident on the deflection part. This enables each of a plurality of light beams to be scanned and focused in an optical scanner using the plurality of light beams even in a case where the light beams are independently used by bringing them into correspondence with each of multi-colors, for example, in the optical scanner.

The invention specified in claim 7 is characterized in that the deflection part has a deflecting surface for reflecting incident light beams, the angles which the incident light beams form with a normal of the deflecting surface become a substantially coincided angle in the slow scan direction and the light beams become incident from both sides with the normal substantially as the center. In this manner, the light beams from the deflection part become incident on the scanning lens from both sides with the normal of the deflecting surface substantially as the center, and the both sides of the scanning lens can be used with the normal of the deflecting surface substantially as the center.

The invention specified in claim 8 is characterized in that the plurality of light beams are incident on the deflection part at different angles in the slow scan direction. Therefore, even in a case where a plurality of light beams are caused to obliquely become incident on the scanning lens at different angles from the same direction, the image-formation performance can be satisfied even for the plurality of light beams at different angles of oblique-incidence if such a shape of the lens as to satisfy the above-described condition at the lens passage position for each light beam is adopted.

The invention specified in claim 9 is characterized in that at least any one of the first and second surfaces of the scanning lens is decentered to reduce the curved scanning line formed on the surface to be scanned by the deflection of the deflection part.

In a case where the curved scanning line on the surface to be scanned is still large for the target even if the image-formation performance has been satisfied in respect of the shape of the scanning lens, it is possible to further reduce the curved scanning line by decentering or shifting the both sides of the lens within the slow scan surface. This shift can be performed at least on any one of the first and second surfaces. Also, it is preferable to shift on the side of the light beam incident on the deflection part. It does not make any difference whether the shift amount is equal or different on both sides, but when different amounts are adopted, the degree of freedom increases, and therefore, it becomes easy to make the curved scanning line and the image-formation performance compatible.

The invention specified in claim 10 is characterized in that the scanning lens is formed asymmetrically in the slow scan direction.

In the case of causing a light beam to obliquely become incident on the scanning lens, the light beam for passing through the lens uses only an area on one side with respect to the center line of the lens. In the case of a so-called double-pass, in which the incident light beam on the deflection part and the light beam deflected and reflected by the deflection part pass through the scanning lens, the above-described condition for the shape of the lens surface is given to satisfy the performance for the deflected light beam, and it is not necessary to satisfy the condition for the incident lightbeam on the deflection part. In the case of a lens symmetrical in the slow scan direction, when the double-pass is performed, the incident light beam and the deflected light beam approach to each other between the scanning lens and the surface to be scanned because the lens is a convex lens and it becomes difficult to separate the both. Thus, the shape of the scanning lens is made asymmetrical in the slow scan direction, and an area, through which the incident light beam side passes, is caused to have power in the slow scan direction in which it becomes easy to separate the incident light beam from the deflected light beam, whereby it becomes easy to separate the incident light beam from the deflected light beam.

The invention specified in claim 11 is characterized in that when a focal length on x-axis of the scanning lens in an incident light beam passage area is set to fin, and a focal length on x-axis in a deflected light beam passage area is set to fout, fin and fout satisfy the relation given by $$\text{fin} < 0, \text{ or fin} > \text{fout}.$$

In order to make the shape of the scanning lens asymmetrical in the slow scan direction, the condition of fin <0 can be satisfied when a focal length on x-axis of the scanning lens in the incident light beam passage area is set to fin, and a focal length on x-axis in the deflected light beam passage area is set to fout. When this equation is satisfied, the angle of oblique incidence on the Fθ lens can be made larger than the angle of oblique incidence on the deflection part because the incident light beam side has negative power. Also, if the relation of fin>fout is satisfied even if the power is not made negative, a degree that the incident light beam approaches the deflection-reflective light beam is reduced from the Fθ lens toward the surface to be scanned, and therefore, it becomes easier to separate the incident light beam from the deflected light beam than when a lens symmetrical with respect to the slow scan direction is used.

The invention specified in claim 12 is characterized in that the scanning lens is, on both the first and second surfaces, formed into the aspherical shape specified in claim 5 in an area where a light beam deflected by the deflection part passes through, and that assuming higher order aspherical constants to be A, B, C and D, in an area where a light beam becoming incident on the deflection part passes through, shapes of the first and second surfaces on y-axis are curved surfaces obtained by rotating the shapes about an axis, parallel to x-axis, spaced apart by RS from the origin for which first and second surfaces a position z on a surface in the z-axis direction is represented by the following equation:

$$z = \frac{\frac{y^2}{RY}}{1 + \sqrt{1 - (1 + KY) \cdot \left(\frac{y}{RY^2}\right)}} + A \cdot y^4 + B \cdot y^6 + C \cdot y^8 + D \cdot y^{10}$$

A curve expressed by this equation is set to a shape obtained by rotating it about an axis, parallel to y-axis, spaced apart by RS in the z-axis direction, whereby even if the shape of the scanning lens is asymmetrical between on the incident light beam side and on the deflected light beam side in the slow scan direction, the shapes at a position where the incident light beam side and the deflected light beam side are in contact with each other can be made to be the same in order to constitute the lens by one piece.

The invention specified in claim 13 is characterized in that the shape of the scanning lens satisfies the following equations:

$$A = AR \cdot (1+AP)^2$$

$$B = BR \cdot (1+BP)^2$$

$$C = CR \cdot (1+CP)^2$$

$$D = DR \cdot (1+DP)^2$$

Since KY is a common value in each of the above-described equations, if the other aspherical coefficients A, B, C and D are determined as described above, junctures between the incident light beam side surface and the deflected light beam side surface have the same shape, and the usable range of the lens surface is not narrowed even if they are made into an asymmetric shape in the slow scan direction. Also, the lens can be easily manufactured. Each of these equations can be derived by developing concerning x=0 in the equation (6).

According to the invention specified in claim 14, there is provided one piece of scanning lens provided between a surface to be scanned and a deflection part for deflecting, at a substantially constant angular velocity in a fast scan direction, light beams incident to incline their optical axes by a predetermined angle in the slow scan direction, which intersects the fast scan direction, for focusing, on the surface to be scanned, light beams incident to scan an optical spot, wherein when the lens surface on the side of the deflection part is set to a first surface, the lens surface on the side of the surface to be scanned is set to a second surface, curvature radii at a light beam passage position at the same deflection angle for the first and second surfaces in the slow scan direction are set to Rs1 and Rs2 respectively, and curvature radii at the same light beam passage position in the fast scan direction are set to Rt1 and Rt2 respectively, both the first surface and the second surface are formed into an aspherical shape and the shape of the scanning lens at a position where light beams at the same deflection angle pass through is formed to satisfy the following equations:

$$|Rs1/Rs2| \geq 5.9$$

$$|Rt1/Rt2| \geq 3.7$$

As described above, the shapes of the surfaces of the scanning lens can be determined by the angle of oblique-incidence of an incident light beam on the scanning lens and the refractive index of the lens material. At any light beam passage positions, the power in the fast scan direction and in the slow scan direction is greater on the second surface than on the first surface. For this reason, by defining the sizes of the curvature radii of the first and second surfaces, that is, the relation of power in each of the above-described equations, the image-formation performance of a scanning lens as a single unit provided between the deflection part and the surface to be scanned for scanning and focusing can be satisfied. This scanning lens whose image-formation performance has been satisfied is provided between the deflection part and the surface to be scanned, whereby there can be easily constructed an optical scanner capable of keeping the shape of the optical spot on the surface to be scanned even if the light beam obliquely becomes incident on the deflection part.

In this respect, the scanning lens according to the present invention can be constructed such that it refracts to reduce the change in the incident angle of the incident light beam in the slow scan direction which changes in response to the deflection angle, in the fast scan direction, of the deflection part within the fast scan range on the first surface on the side of the deflection part, and that the light beams after the emission on the second surface on the side of the surface to be scanned are emitted to substantially coincide in the slow scan direction. Such a construction causes the deflected light beam based on the fast scan to have the substantially same orientation of the slow scan direction on the first surface within the fast scan range. Thus, the light beams refracted on the first surface become light beams having substantially the same orientation. Also, the light beam refracted on the second surface are caused to coincide, as viewed from the slow scan direction, with the deflected light beam whose orientation in the slow scan direction has been made substantially the same by the first surface. This enables an excellent image-formation performance to be maintained on the surface to be scanned and the curved scanning line to be reduced even if the light beams obliquely become incident on the scanning lens.

Also, according to the present invention, a scanning optical system included in an optical scanner according to any one of claims 4 to 13 can be used.

An image forming apparatus specified in claim 15 comprises: a deflection part for deflecting, in a fast scan direction, light beams incident to incline their optical axes by a predetermined angle in the slow scan direction, which intersects the fast scan direction; a scanning optical system provided on a deflection side of the deflection part, for focusing, on a photoreceptor, the light beams incident to scan an optical spot, for refracting, on the first refractive surface on the side of the deflection part, to reduce the change in the incident angle of the incident light beams in the slow scan direction, which changes in response to the deflection angle of the deflection part within the fast scan range in the fast scan direction, and for emitting, on the second refractive surface on the side of the photoreceptor, such that the light beams after the emission substantially coincide in the slow scan direction; and an image forming part for using an image on the photoreceptor formed by irradiation light to form the image on a recording medium.

In the image forming apparatus according to the present invention, light beams are incident on the deflection part to incline the optical axes by a predetermined angle in the slow scan direction. The light beams are incident on the scanning optical system provided on the deflection side of the deflection part to scan an optical spot to be formed on the photoreceptor. The light beams thus incident are focused on the photoreceptor by the scanning optical system. In the scanning optical system, the light beams are refracted, on the first refractive surface on the side of the deflection part, to reduce the change in the incident angle of the incident light beams in the slow scan direction, which changes in response to the deflection angle of the deflection part within the fast scan range in the fast scan direction, and are, on the second refractive surface on the side of the photoreceptor, emitted such that the light beams after the emission substantially coincide in the slow scan direction. More specifically, as described above, the deflected light beams based on the fast scan are caused to have substantially the same orientation in the slow scan direction by refraction on the first refractive surface within the fast scan range. Also, the light beams after emission from the second refractive surface are caused to substantially coincide in the slow scan direction, and the light beams refracted on the second refractive surface are caused to coincide, as viewed from the slow scan direction, with the deflected light beams whose orientation in the slow scan direction has been made substantially the same by the first refractive surface. This enables an excellent image-formation performance to be maintained on the photoreceptor and the curved scanning lines to be reduced even if the light beams obliquely become incident on the scanning lens. Therefore, an image to be formed on the photoreceptor maintains an excellent image-formation performance and has curved scanning lines reduced, and an image to be formed on a recording medium by the image forming part becomes an excellent image which maintains an excellent image-formation performance and has curved scanning lines reduced.

In this respect, for a scanning optical system according to the present invention, a scanning optical system included in an optical scanner according to any one of claims 2 to 13 can be used.

An image forming apparatus specified in claim 16 comprises: a deflection part for deflecting, in a fast scan direction, a plurality of light beams incident to incline their optical axes by a predetermined angle in the slow scan direction, which intersects the fast scan direction; a scanning optical system provided on the deflection side of the deflection part, for focusing, on a photoreceptor, each of a plurality of light beams incident to scan an optical spot, for refracting, on the first refractive surface on the side of the deflection part, to reduce the change in the incident angle of the incident light beams in the slow scan direction, which changes in response to the deflection angle of the deflection part within the fast scan range in the fast scan direction, and for emitting, on the second refractive surface on the side of the photoreceptor, such that the light beams after the emission substantially coincide in the slow scan direction; a guiding part for guiding each of a plurality of light beams emitted from the scanning optical system to different positions on the photoreceptor; and an image forming part for using each of images on the photoreceptor formed by irradiation light by each of the light beams guided by the guiding part to form a composite image on a recording medium by combining those images.

According to the present invention, a plurality of light beams are incident on the deflection part to incline the optical axes by a predetermined angle in the slow scan direction. The scanning optical system focuses each of the plurality of light beams from the deflection part on the photoreceptor. The scanning optical system refracts, on the first refractive surface, each of the plurality of light beams to reduce the change in the incident angle of the incident light beams in the slow scan direction, which changes in response to the deflection angle, and emits on the second refractive surface such that the light beams after the emission substantially coincide in the slow scan direction. The light beams emitted from the scanning optical system are guided to different positions on the photoreceptor respectively by the guiding part. This enables scanning by the plurality of light beams on the photoreceptor, different images, for example, images having different colors are formed on the photoreceptor by each of the light beams, and a composite image is formed on a recording medium by using respective images on the photoreceptor to combine those images by means of an image forming part. Even if different images are formed on the photoreceptor using a plurality of light beams in this manner, the light beams reaching the photoreceptor become, as described above, such that the change in the incident angle of the light beams in the slow scan direction which changes in response to the deflection angle is reduced by the first refractive surface, and that those light beams coincide as viewed from the slow scan direction by the second refractive surface. Therefore, the respective light beams can maintain an excellent image-formation performance on the photoreceptor and the curvature in the respective scanning lines can also be reduced even if the light beams are caused to obliquely become incident. Accordingly, the respective images to be formed on the photoreceptor maintain the excellent image-formation performance and have the curvature in the scanning lines reduced. Each of images to be formed on the recording medium by the image forming part maintains the excellent image-formation performance and becomes an excellent image with curved scanning lines reduced. Therefore, an excellent image can be formed respectively even if images are formed at different positions on the photoreceptor.

In this respect, for a scanning optical system according to the present invention, a scanning optical system included in an optical scanner according to any one of claims 2 to 13 can be used.

An image forming apparatus specified in claim 17 comprises: a deflection part for deflecting, in a fast scan direction, a plurality of light beams incident to incline their optical axes by a predetermined angle in a slow scan direction, which intersects the fast scan direction; a scanning optical system provided on the deflection side of the deflection part, for focusing each of a plurality of light beams incident to scan an optical spot, for refracting, on a first refractive surface on the side of the deflection part, to reduce the change in the incident angle of the incident light beams in the slow scan direction, which changes in response to the deflection angle of the deflection part within a fast scan range in the fast scan direction, and for emitting, on a second refractive surface on the side of the photoreceptor, such that the light beams after the emission substantially coincide in the slow scan direction; a photosensitive part having a plurality of photoreceptors, comprising each of the plurality of light beams corresponded to each of the plurality of photoreceptors respectively; a guiding part for guiding each of a plurality of light beams emitted from the scanning optical system onto the corresponding photoreceptor; and an image forming part for using each of images on the photoreceptor formed by irradiation light by each of the light beam guided by the guiding part to form a composite image on a recording medium by combining those images.

According to the present invention, the photosensitive part has a plurality of photoreceptors, and each of the plurality of light beams corresponds to each of the plurality of photoreceptors. In each of these photoreceptors, the light beams are deflected by the deflection part, the change in the incident angle of the light beams in the slow scan direction which changes in response to the deflection angle by the scanning optical system is reduced, and the plurality of light beams coincided as viewed from the slow scan direction are focused. Each of these plurality of light beams is guided onto the photoreceptor to which each of the plurality of light beams corresponds by the guiding part. In this manner, an image is formed on each of the plurality of photoreceptors. These images are combined by the image forming part, and a composite image thus combined is formed on a recording medium. Therefore, the image formed on each photoreceptor maintains an excellent image-formation performance, and the curved scanning line is reduced. The composite image to be formed on the recording medium by the image forming part maintains the excellent image-formation performance, and becomes an excellent image with the curved scanning line reduced.

In this respect, for a scanning optical system according to the present invention, a scanning optical system included in an optical scanner according to any one of claims 2 to 13 can be used.

The invention specified in claim 18 is characterized in that the guiding part includes a separating part for separating into light beams corresponding to each of the photoreceptors. As this separating part, one piece of reflection member such as a prism having reflective surfaces corresponding to each of a plurality of light beams can be used. Through the use of this reflection member as the separating part, the plurality of light beams from the scanning optical system can be easily separated, and each light beam can be easily guided to each photoreceptor.

An image forming apparatus specified in claim 19 comprises: a deflection part having a plurality of deflecting surfaces for reflecting incident light beams, for deflecting, to each of different deflecting surfaces in a fast scan direction, each of a plurality of light beams incident to incline their optical axes by a predetermined angle in the slow scan direction, which intersects the fast scan direction; a scanning optical system having a plurality of scanning lenses, provided on the deflection side of the deflection part, for focusing one or a plurality of light beams incident to scan an optical spot while causing to correspond to one or a plurality of light beams deflected by each of the plurality of deflecting surfaces, for refracting, on the first refractive surface on the side of the deflection part, to reduce the change in the incident angle of the incident light beams in the slow scan direction, which changes in response to the deflection angle of the deflection part within the fast scan range in the fast scan direction, and for emitting, on the second refractive surface on the side of the photoreceptor, such that the light beams after the emission substantially coincide in the slow scan direction; a photosensitive part having a plurality of photoreceptors, comprising each of the plurality of light beams corresponded to each of the plurality of photoreceptors; a guiding part for guiding each of a plurality of light beams emitted from the scanning optical system onto the corresponding photoreceptor; and an image forming part for using respective images on the photoreceptor formed by irradiation light to form a composite image on a recording medium by combining those images.

The deflection part according to the present invention has a plurality of deflecting surfaces, and light beams are incident on each of the different deflecting surfaces to incline their optical axes by a predetermined angle in the slow scan direction. There can be two or more different deflecting surfaces. Two or more different deflecting surfaces deflect each of one or a plurality of light beams incident in the fast scan direction. Light beams incident on each of these deflecting surfaces are preferably two or more light beams. As a preferred example, there is an example in which two light beams are deflected by each of two deflecting surfaces respectively, and in this case, four light beams can be deflected, and a light beam which takes charge of each of, for example, four colors can be deflected. Each of a plurality of light beams deflected by the deflection part becomes such that the change in the incident angle of the incident light beams in the slow scan direction, which changes in response to the deflection angle, is reduced by the scanning optical system, and that the plurality of light beams coincided as viewed from the slow scan direction are focused. The scanning optical system has scanning lenses of a number corresponding to a number of deflecting surfaces used at the same time. Therefore, each of light beam groups consisting of one or a plurality of light beams deflected by different deflecting surfaces, that is, each of a plurality of deflecting surfaces corresponds to the scanning lens so that each of one or a plurality of light beams included in the light beam group is scanned and focused by the corresponding scanning lens.

The photosensitive part has a plurality of photoreceptors so that each of a plurality of light beams corresponds to each of a plurality of photoreceptors. To each of these photoreceptors, one or a plurality of light beams deflected by the deflection part are focused. Each of the plurality of light beams, that is, each of the plurality of light beams emitted from the scanning optical system is guided onto the photoreceptor to which each of the plurality of light beams corresponds by the guiding part. In this manner, an image is formed on each of the plurality of photoreceptors. These images are synthesized by the image forming part, and a composite image thus synthesized is formed on the recording medium. Therefore, an image to be formed on each photoreceptor maintains an excellent image-formation performance and has the curved scanning line reduced, and the composite image to be formed on the recording medium by the image forming part becomes an excellent image having an excellent image-formation performance maintained and the curved scanning line reduced.

In this respect, for a scanning optical system according to the present invention, a scanning optical system included in an optical scanner according to any one of claims 2 to 13 can be used.

The invention specified in claim 20 is characterized in that the deflection part causes light beams to become incident on each of the deflecting surfaces opposed to incline their optical axes by a predetermined angle in the slow scan direction, which intersects the fast scan direction. For the deflection part, a polygonal rotating mirror can be used, but in a case where light beams are incident on the polygonal rotating mirror from one direction as viewed from a direction along the slow scan direction, the deflecting surface is not used in the other directions. For this reason, if light beams are incident on a polygonal rotating mirror from another direction as viewed from a direction along the slow scan direction, a plurality of similar optical paths will be able to be formed. In this case, if light beams are incident on each of the deflecting surfaces opposed, symmetrical optical paths will be able to be formed, making it possible to construct the apparatus easily.

BRIEF DESCRIPTION OF THE DRAWINGS

FIG. 17 is a chart showing the distance relationship around an Fθ lens;

DETAILED DESCRIPTION OF PREFERRED EMBODIMENT

Hereinafter, with reference to the drawings, the detailed description will be made of an example of an embodiment of the present invention.

[First Embodiment]

A first embodiment is the application of the present invention to an optical scanner for scanning and focusing laser beams emitted from a semiconductor laser.

Figure 11:
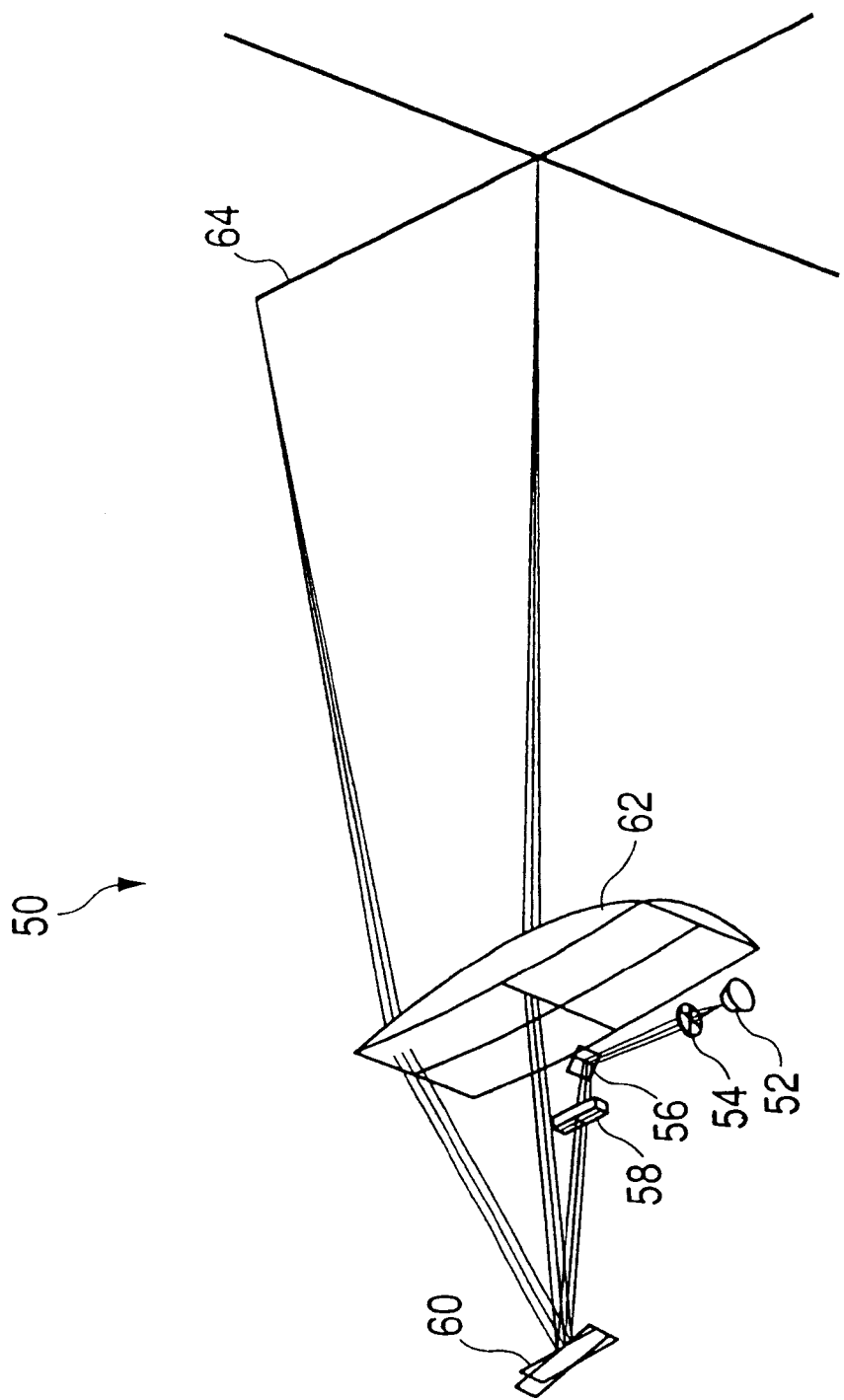
FIG. 11 is a perspective view showing schematic structure of an optical scanner according to a first embodiment of the present invention.

As shown in FIG. 11, a light scanner 50 as an optical scanner according to the present embodiment has a semiconductor laser 52, and on the laser beam emission side of this semiconductor laser 52, there is provided a collimator lens 54 for shaping laser beams emitted from the semiconductor laser 52 into substantially parallel laser beams. On the laser beam emission side of the collimator lens 54, there is arranged a cylindrical lens 58 as an imaging optical system having lens power in a direction corresponding to the slow scan direction, for imaging via a mirror 56 substantially parallel laser beams as a long linear image in a direction corresponding to the fast scan direction.

As a deflection part for reflecting a laser beam incident such that the reflection plane is located at the imaging position of this linear image or in the vicinity thereof to deflect at constant angular velocity in a direction corresponding to the fast scan direction, a light deflector 60, for example, a polygon mirror is arranged. At a side opposite to the laser beam of the light deflector 60, there is arranged an Fθ lens 62 as a scanning optical system, which is one piece of scanning lens, for focusing such that the laser beam spot moves on the surface to be scanned with constant velocity. On the emission side of the Fθ lens 62, the surface to be scanned 64 is positioned.

In this respect, in the light scanner 50 according to the present embodiment, a laser beam is incident from substantially the center of the deflection angle of the light deflector 60 in the fast scan direction, and is incident on the light deflector 60 at an angle to the normal to the reflective surface of the light deflector 60 in the slow scan direction.

Also, in the present embodiment, a description will be made of a case where a light beam is deflected at equal angular speed by the light deflector, and the present invention is not limited thereto, but a reflection mirror such as a galvanomirror and a resonant scanner may be used.

Also, in the present embodiment, a description will be made of a case where a light beam deflected by the light deflector moves a laser beam spot with constant velocity by the Fθ lens, and the present invention is not limited thereto, but can be also applied to a case where the laser beam spot moves at rough linear rate on the surface to be scanned.

Next, a description will be made of the operation of an optical scanner 50 according to the present embodiment. A laser beam emitted from a semiconductor laser 52 is shaped into substantially parallel laser beams by a collimator lens 54, and the laser beams thus shaped have their directions deflected by a mirror 56 to face a cylindrical lens 58. The cylindrical lens 58 refracts the laser beams incident only in a direction corresponding to the slow scan direction. In this manner, the substantially parallel laser beams incident on the cylindrical lens 58 are imaged as a long linear image in a direction corresponding to the fast scan direction. In the vicinity including the imaged position of this linear image, the reflective surface by the light deflector 60 is located, and the light deflector 60 reflects the laser beams incident to deflect at constant angular velocity in a direction corresponding to the fast scan direction. The laser beams deflected by the light deflector 60 are incident on the Fθ lens 62, and the Fθ lens 62 focuses to move the laser beam spot on the surface to be scanned with constant velocity.

Next, a description will be made of progress of laser beams around the Fθ lens 62 in the optical scanner 50 according to the present embodiment.

When laser beams are caused to obliquely become incident on the light deflector 60 from the slow scan direction as described above, the angle, in the slow scan direction, of the light beams deflected and scanned by the light deflector is changed by the deflection angle. For this reason, the lens incident position and angle, in the slow scan direction, of the deflected light beams incident on the Fθ lens 62 are changed by the deflection angle of the light deflector. More specifically, as shown in solid line and in dotted line in FIG. 2B light beams near COS and light beams near EOS are different from each other in incident position and angle on the Fθ lens 62. The light beams caused to obliquely become incident on the light deflector are deflected and reflected by the light deflector, whereby after the deflection and reflection, an angle, in the slow scan direction, of light beams facing near EOS becomes larger than an angle of light beams facing near COS. Therefore, the angle and position, in the slow scan direction, of the light beams on the first surface of the Fθ lens 62 are changed by the deflection angle of the light deflector.

Thus, in the present embodiment, the Fθ lens 62 is caused to have a function of reducing a change in an angle, in the slow scan direction, of the light beams caused by the deflection angle on becoming incident, and a function of refracting at a position close to the light deflector in response to the deflection angle from near COS to near EOS on emitting to align the orientation of the outgoing light beams.

Figure 1A:
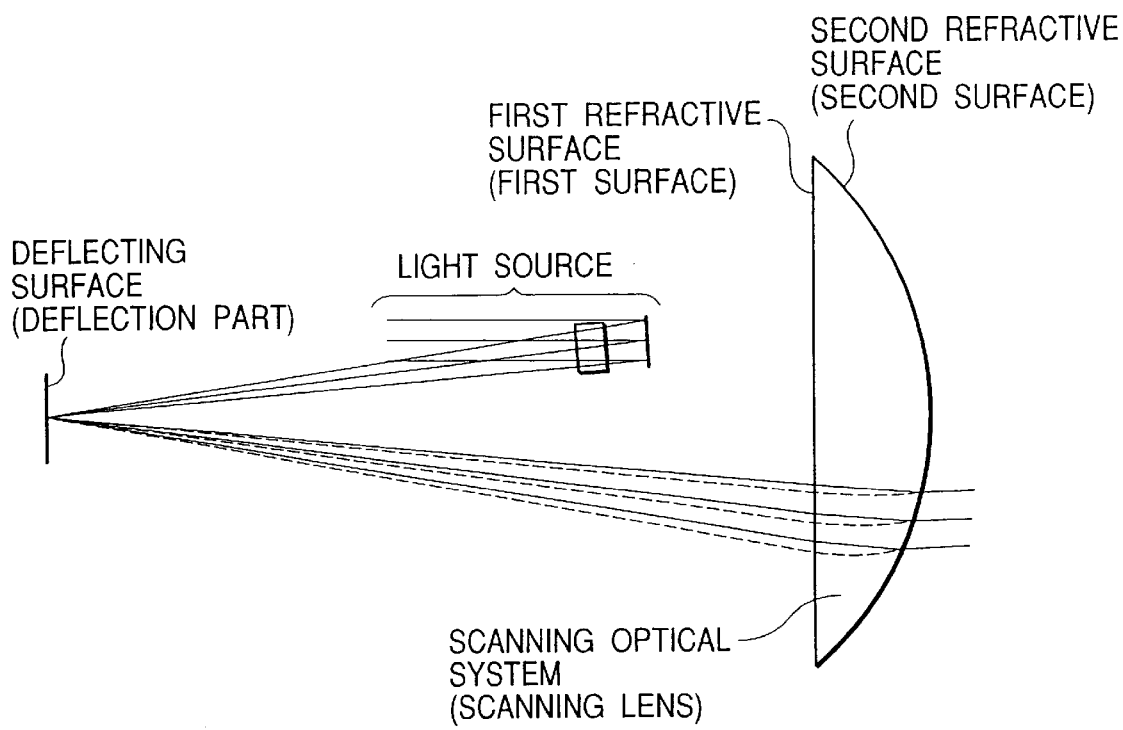
FIGS. 1A and 1B are explanatory views showing the present invention.
Figure 1B:
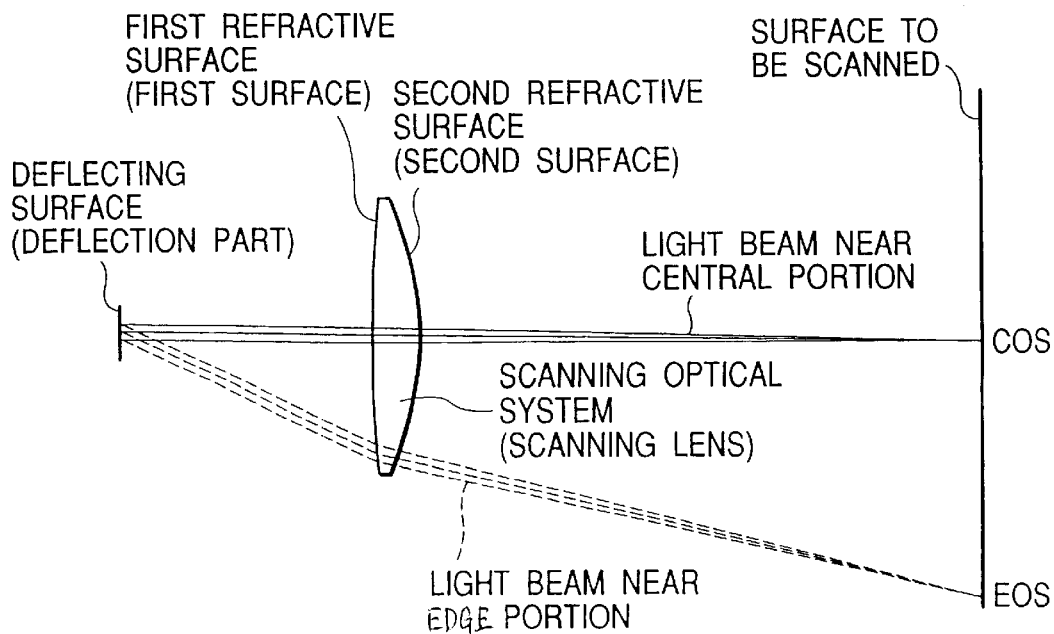
Figure 2A:
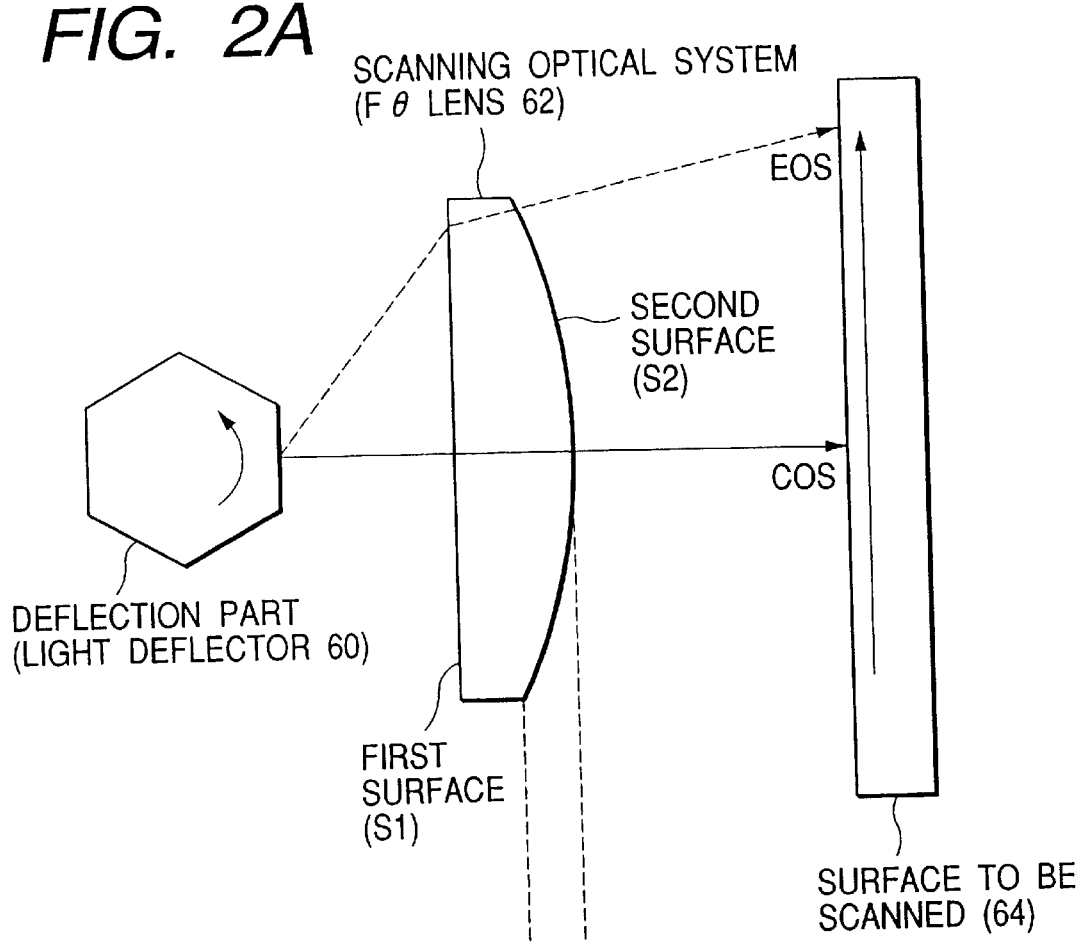
FIGS. 2A and 2B are explanatory views showing the present invention.

More specifically, the shape of the first surface of the Fθ lens 62 in the slow scan direction can be determined by the angle of oblique-incidence of incident light beam on the Fθ lens 62 and the refractive index of the lens material. Therefore, a light beam L1 passing through the Fθ lens 62 among light beams refracted by the first surface to irradiate the vicinity of COS, and a light beam L2 passing through the Fθ lens 62 among light beams to reach the vicinity of EOS become substantially parallel with each other as shown in FIG. 2 so that the change in the angle of the light beam in the slow scan direction caused by the deflection angle is reduced.

Figure 2B:
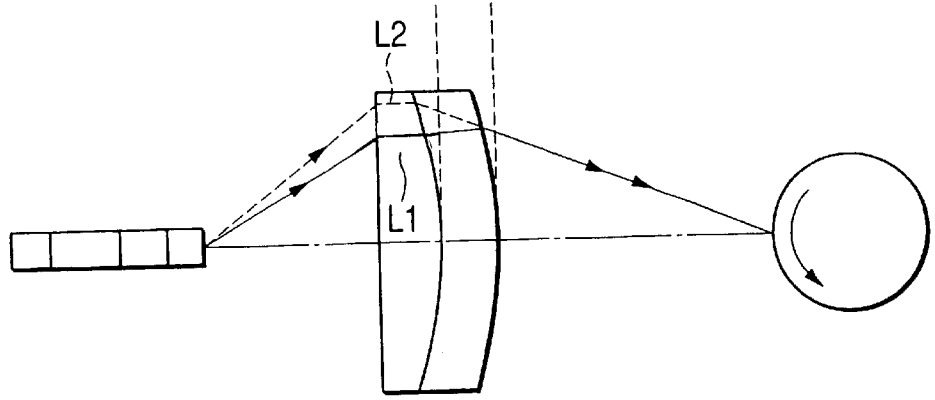
Figure 3:
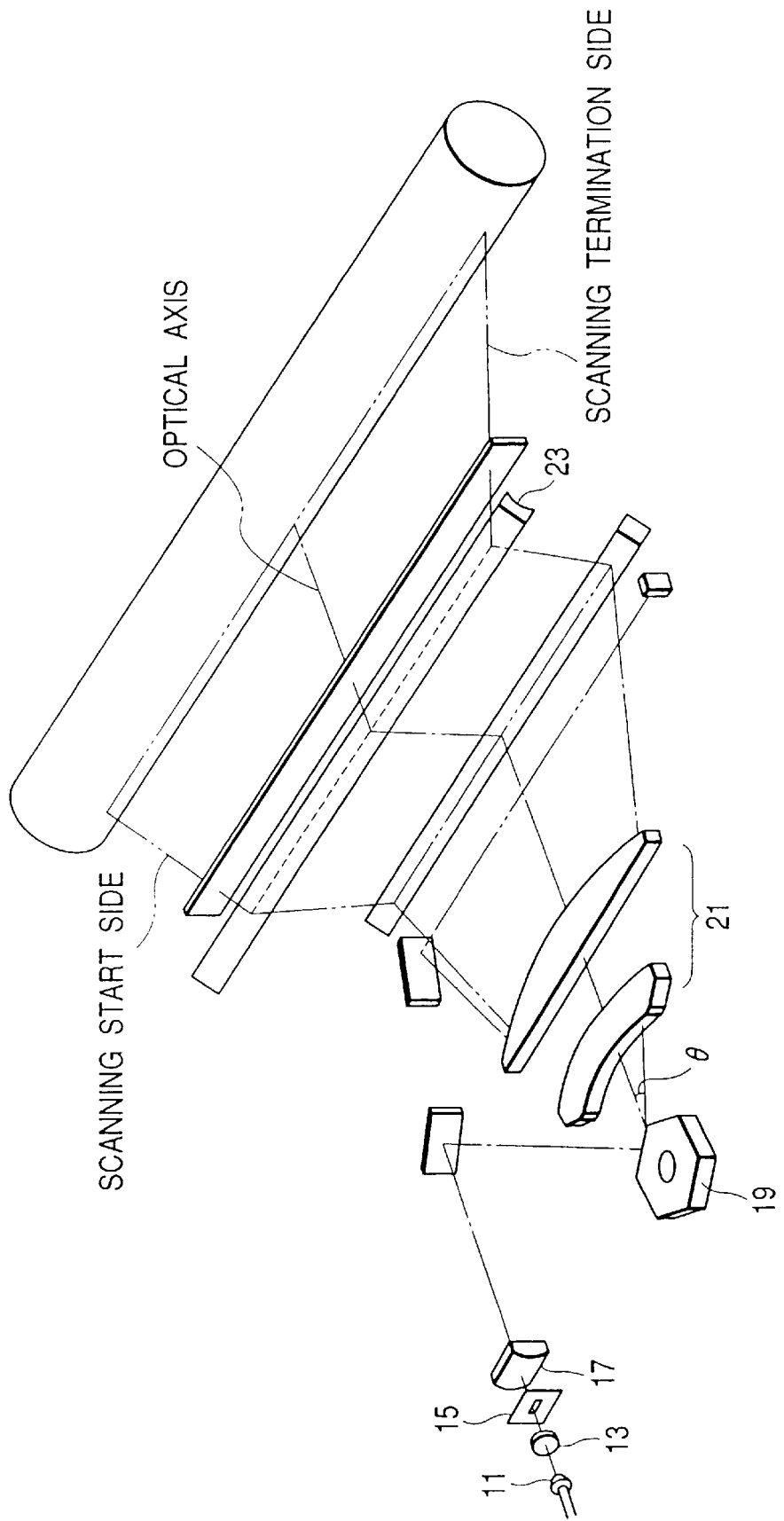
FIG. 3 is a perspective view showing a conventional, general laser beam scanner.
Figure 4:
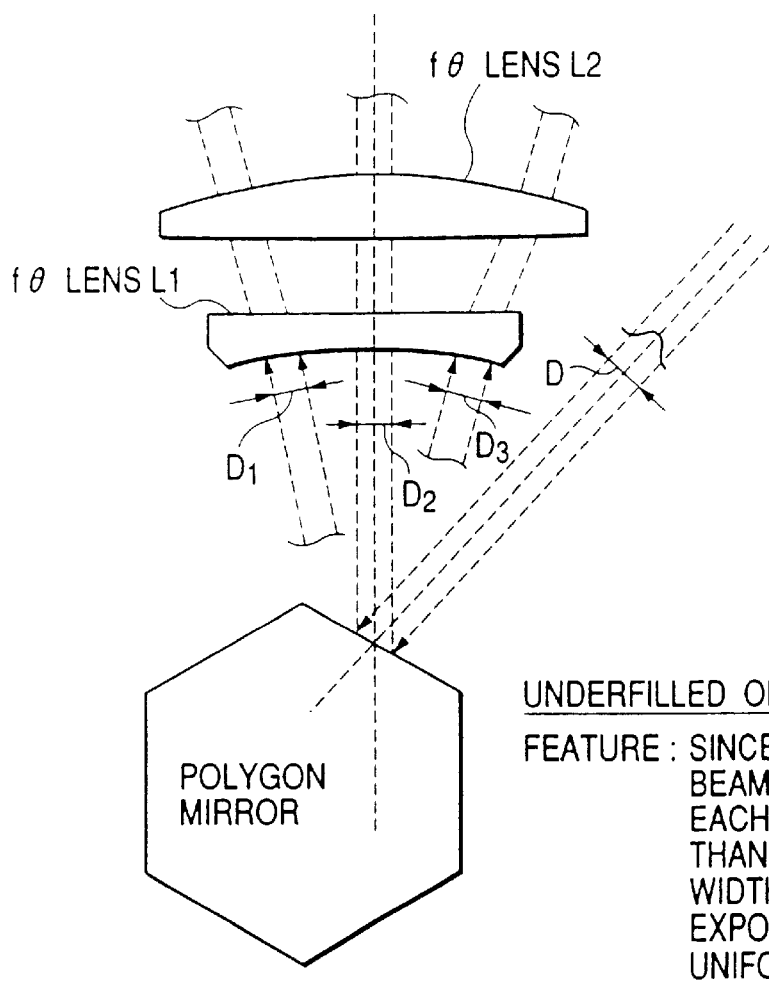
FIG. 4 is an explanatory view showing an underfilled optical system.
Figure 5:
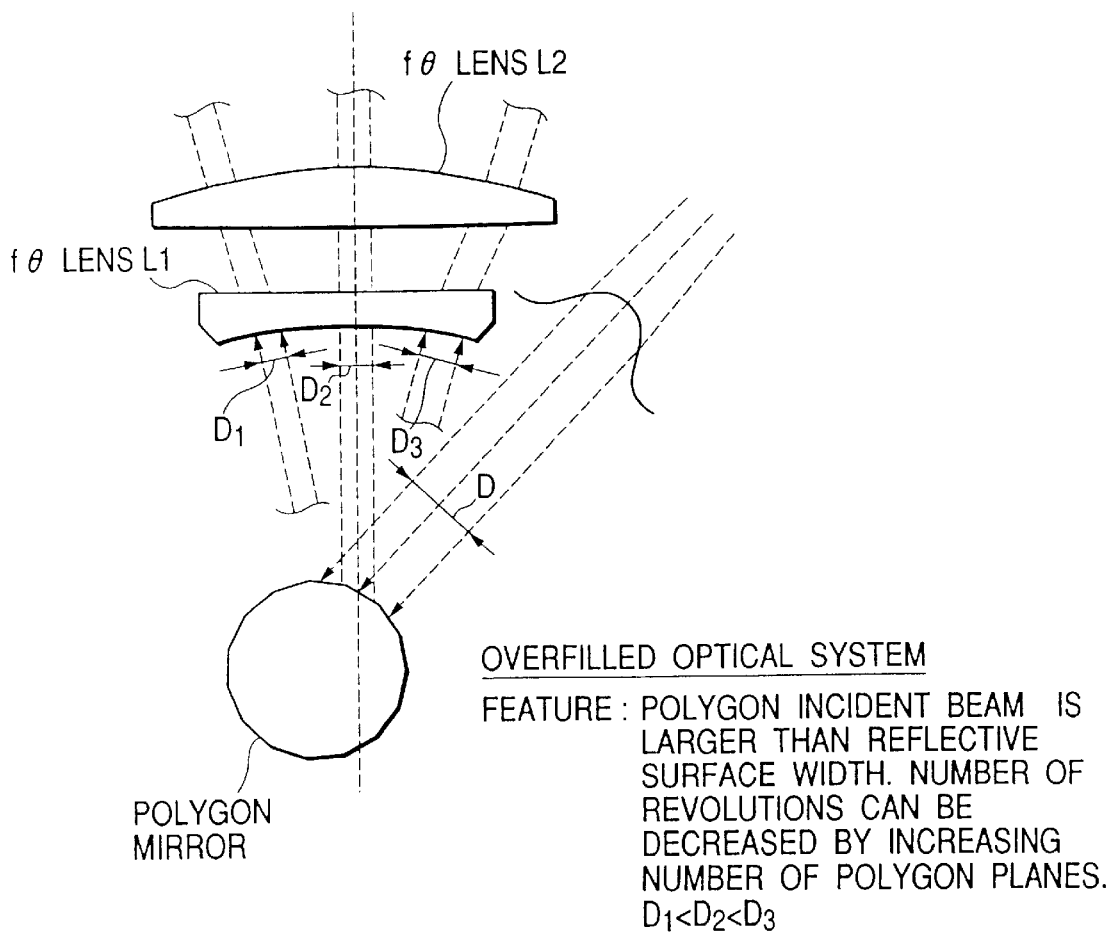
FIG. 5 is an explanatory view showing an overfilled optical system.
Figure 6:
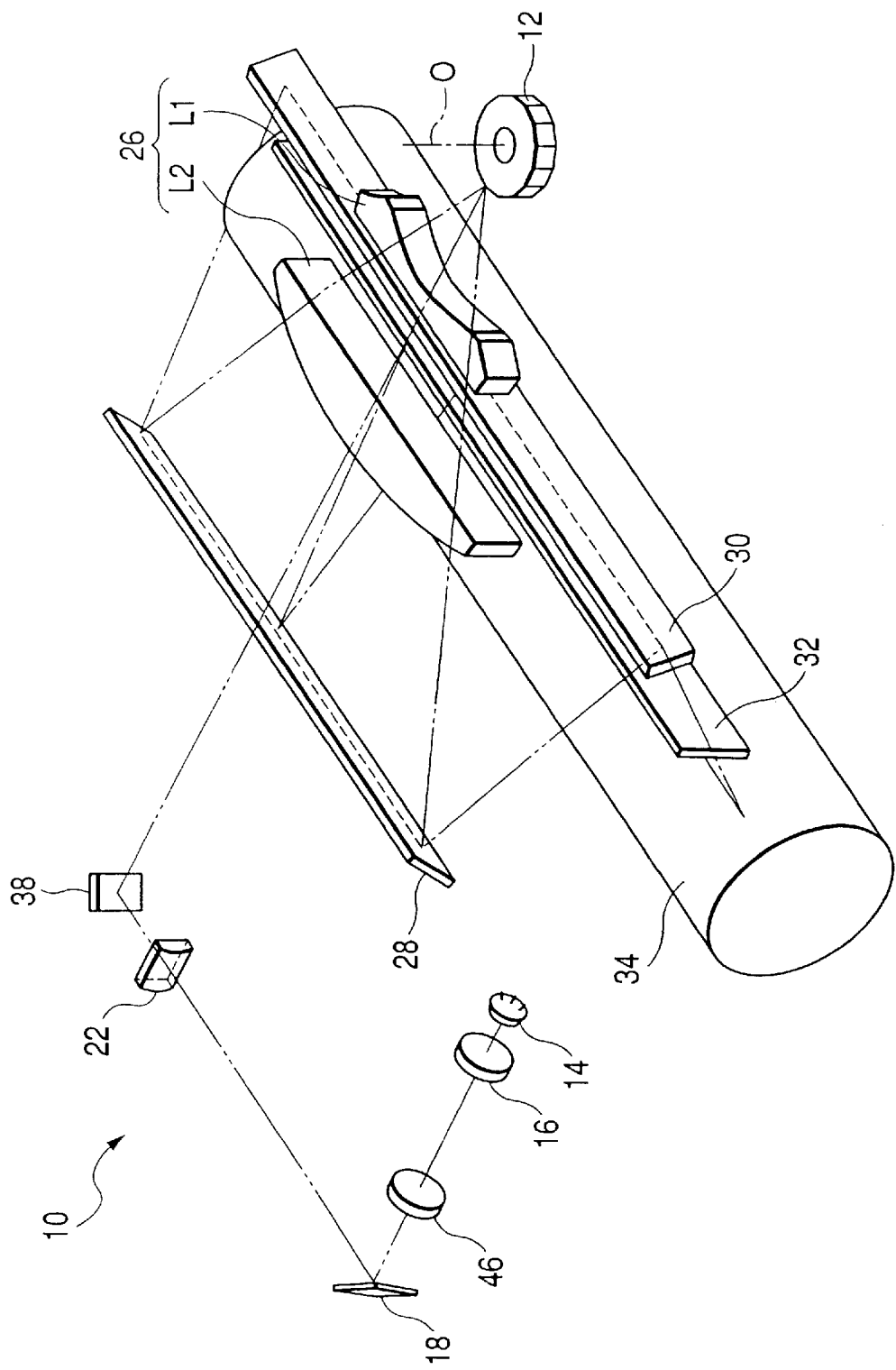
FIG. 6 is a perspective view showing a laser beam scanner for causing light beams to become incident on a light deflector from the vicinity of the center of the deflection angle.
Figure 7:
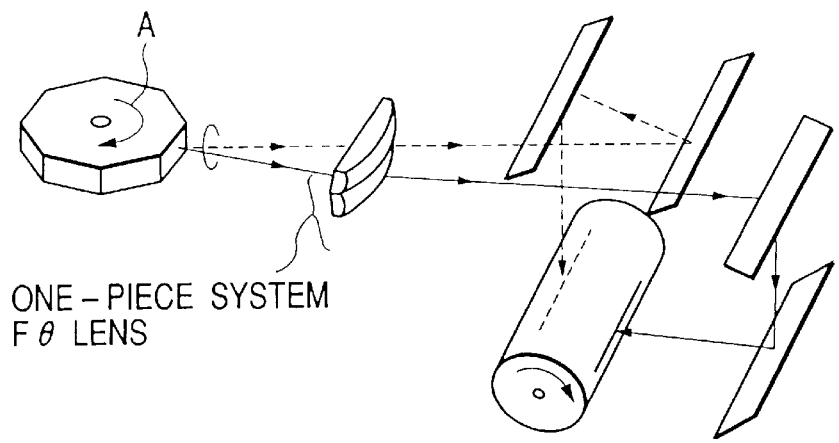
FIG. 7 is a perspective view showing a laser beam scanner for coping with plural colors using a plurality of light beams.
Figure 8A:
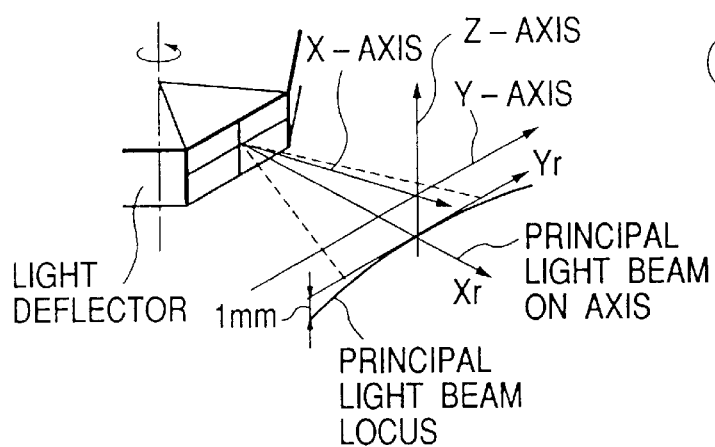
FIGS. 8A, 8B, 8C and 8D are explanatory views showing that the incident angle on a scanning lens in the slow scan direction changes by a change in the deflection angle.
Figure 8B:
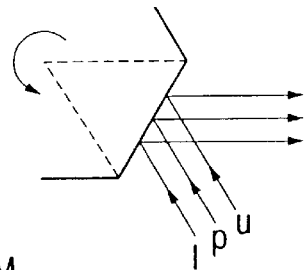
Figure 8C:
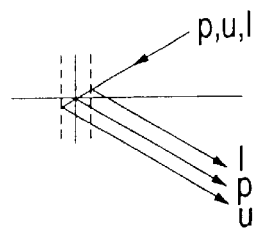
Figure 8D:
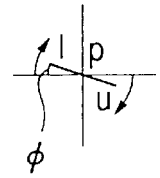
Figure 9:
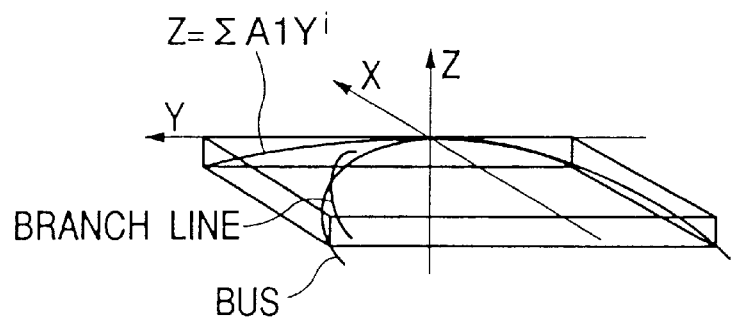
FIG. 9 is an explanatory view showing a structure for correcting the curvature in the locus of scanning light beams.
Figure 10:
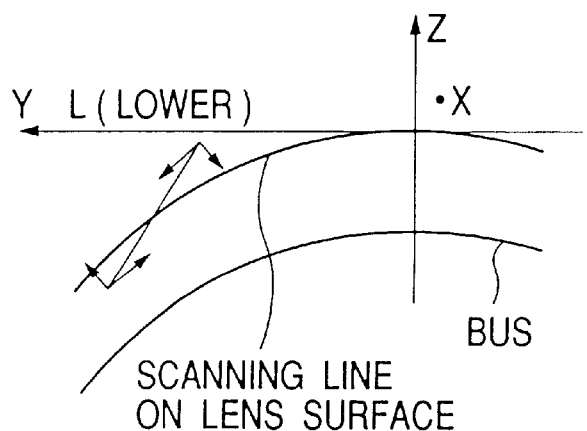
FIG. 10 is an explanatory view showing a structure for correcting the curvature in the locus of scanning light beams.

Since the thickness of the Fθ lens 62 becomes thinner toward the marginal portion, with respect to the deflected light beams whose angle in the slow scan direction has been caused to be substantially the same by the first surface, an optical path length of the Fθ lens 62, through which light beams to reach the vicinity of COS pass, becomes longer than an optical path length of the Fθ lens 62, through which light beams to reach the vicinity of EOS pass. Therefore, the light beams to reach the vicinity of EOS reach the second surface faster than the light beams to reach the vicinity of COS. For this reason, on the second surface, the light beams are refracted at a position close to the light deflector in response to the deflection angle from the vicinity of COS to the vicinity of EOS to form a shape of the plane in which the orientation of the outgoing light beams is aligned. In this manner, as shown in FIG. 2B, the light beams facing the vicinity of COS and the vicinity of EOS after the emission from the second surface enter a substantially aligned state in both angle and position in the slow scan direction.

By causing the first and second surfaces to have such functions, an excellent image-formation performance can be maintained on the surface to be scanned, and the curved scanning line can be also reduced even if the light beam obliquely becomes incident on one piece of scanning lens whose center line is a straight line. For this reason, in a case where the Fθ lens is constructed of one piece as before, the center line of the lens is not curved, and neither is the image-formation performance of the optical spot deteriorated.

Since the angle and position are different in the slow scan direction of a light beam at a point of time whereat the light beam becomes incident on the first surface of the Fθ lens 62, the image-formation performance cannot be satisfied when the shape is determined such that the first surface has strong lens power. Since the Fθ lens 62 has a aspherical surface shape, the curvature radius of the lens at a position where the light beam passes through is changed in response to the deflection angle, but the power in the fast scan direction and in the slow scan direction becomes greater on the second surface than on the first surface at any light beam passage position. In order to satisfy the image-formation performance, it is preferable to define the magnitudes of the curvature radii of the first and second surfaces, the relationship of power, in the above-described equations (1) and (2). In this case, the angle to be reduced by the first surface is preferably within 0.3 degree, and by doing so, the image-formation performance can be satisfied by eliminating the influences by the change in the angle, in the slow scan direction, of the deflected light beam caused by oblique incidence.

In this respect, the aspherical shape in the first and second surfaces can be represented by a curved surface expressed by the equation (3). The shape of a plane expressed by this equation is formed on x-axis parallel to the axis of rotation of the light deflector and y-axis perpendicular to the axis of rotation thereof, and therefore, the center line of the Fθ lens 62 becomes a straight line. Therefore, in a case where a plurality of light beams are incident on the Fθ lens 62 at an angle based on symmetrical oblique incidence, the plurality of light beams can be satisfactorily imaged by a single Fθ lens 62 if the center line of the Fθ lens 62 is caused to coincide with the axis of symmetry of the angle based on the oblique incidence.

In the case of causing a light beam to obliquely become incident on the Fθ lens 62, the light beam for passing through the Fθ lens 62 uses only an area on one side with respect to the center line of the Fθ lens 62. In the case of a so-called double-pass, in which the incident light beam on the light deflector 60 and the light beam deflected and reflected by the light defector 60 pass through the Fθ lens 62, the above-described condition for the shape of the lens surface is given to satisfy the performance for the deflected light beam, and it is not necessary to satisfy the above-described condition for any passage light beams for causing to become incident on the light deflector 60.

If (fin<0) is satisfied when a focal length on x-axis in the incident light beam passage area of the scanning lens is set to fin, and a focal length on x-axis in the deflected light beam passage area is set to fout, the incident light beam side has negative power, and therefore, the angle of oblique incidence on the Fθ lens can be made to be larger than the angle of oblique incidence on the light deflector 60.

Also, if (fin>fout) is satisfied even if the power is not made to be negative, a degree that the incident light beam approaches the deflection-reflective light beam is reduced from the Fθ lens toward the surface to be scanned, and therefore, it becomes easier to separate the incident light beam from the reflected light beam than when a symmetrical lens is used in the slow scan direction.

In order to construct the lens of one piece even if the shape of the Fθ lens 62 is asymmetrical between the incident light beam side and the deflected light beam side in the slow scan direction, it is preferable that their shapes are the same at a position where the incident light beam side is in contact with the deflected light beam side. Thus, the incident light beam side is caused to come into contact with the deflected light beam side on the y-axis described above, the shape of the plane of the deflected light beam side is made into a shape represented by the equation (3), and the shape of the incident light beam side on the y-axis in the fast scan direction is made into a shape obtained by rotating a curve represented by the equation (6) about an axis parallel to the y-axis spaced apart by RS in the z-axis. In each of these equations, KY is a common value, and if the other aspherical coefficients are determined by equations (7) to (10), a juncture between the incident light beam plane and the deflected light beam plane has the same shape, and the usable range of the lens surface is not narrowed even if it is made into an asymmetric shape in the slow scan direction. Also, the lens can be easily manufactured.

[Second Embodiment]

The present embodiment is the application of the present invention to a so-called one-pass two-color type image forming apparatus for forming a two-color image using an optical scanner based on the above-described semiconductor laser. In this respect, the present embodiment includes portions identical to those in the above-described embodiment, and the portions identical are designated by the identical reference numerals to omit the detailed description.

Figure 12:
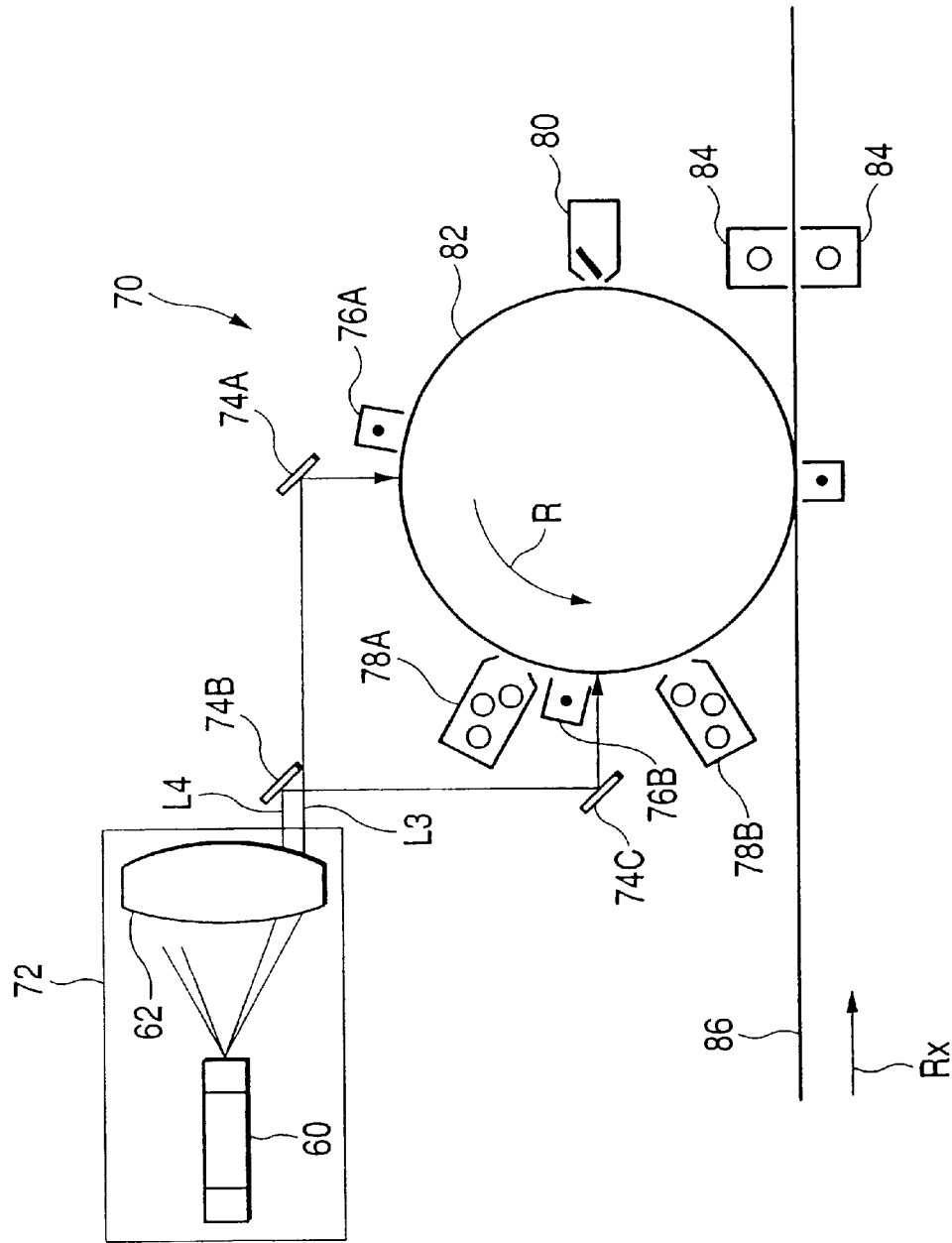
FIG. 12 is a perspective view showing schematic structure of an image forming apparatus according to a second embodiment of the present invention.

As shown in FIG. 12, an image forming apparatus 70 according to the present embodiment has a laser scanner 72. The laser scanner 72 has the substantially same structure as the optical scanner 50 shown in FIG. 11, and a semiconductor laser 52, a collimator lens 54, a mirror 56 and a cylindrical lens 58 are arranged sequentially. There is arranged a light deflector 60, which reflects a laser beam incident such that the reflective surface is positioned at the imaged position of a linear image of the cylindrical lens 58 or in the vicinity thereof, to deflect it with constant angular velocity in a direction corresponding to the fast scan direction. At a side opposite to the laser beam of the light deflector 60, there is arranged an Fθ lens 62, which is one piece of scanning lens, for focusing such that the laser beam spot moves on the surface to be scanned with constant velocity.

According to the present embodiment, in order to form a two-color image, two laser beams corresponding to color are incident on the light deflector 60. For these two laser beams, two semiconductor lasers 52 may be arranged, and a semiconductor laser array for emitting two beams may be used. In this manner, a laser beam L3 for taking charge of a first color and a laser beam L4 for taking charge of a second color are emitted from the Fθ lens 62.

On the emission side of the laser beam L3 for taking charge of the first color, on the emission side of the Fθ lens 62, there is provided a mirror 74A, and at a side opposite to the mirror 74A, there is positioned a photoreceptor 82 including a surface to be scanned 64. This photoreceptor 82 is constructed to be rotated at a fixed speed (in a direction indicated by an arrow R) by a driving part (not shown). In this respect, the driving of the photoreceptor 82 is not limited to rotary driving, but step-driving in synchronism with the scanning maybe used. Also, on the emission side of the laser beam L4 for taking charge of the second color, on the emission side of the Fθ lens 62, there is provided a mirror 74B, and at a side opposite to the mirror 74B, there is provided a mirror 74C. At a side opposite to the mirror 74C, there is positioned the photoreceptor 82.

Upstream of a position on the photoreceptor 82, onto which the laser beam L3 is radiated, along the rotating direction around the photoreceptor 82, there is provided a charger 76A, and downstream of the position on the photoreceptor 82, onto which the laser beam L3 is radiated, along the rotating direction, there is provided a developer 78A. Also, upstream of the position on the photoreceptor 82, onto which the laser beam L4 is radiated, along the rotating direction around the photoreceptor 82, there is provided a charger 76B, and downstream of the position on the photoreceptor 82, onto which the laser beam L4 is radiated, along the rotating direction, there is provided a developer 78B.

Upstream of the charger 76A along the rotating direction, there is provided a cleaner 80. Also, downstream of the developer 78B along the rotating direction, a sheet 86 is in contact, and is adapted to move in a direction indicated by an arrow Rx in coincidence with the rotation (arrow R) of the photoreceptor 82. Downstream of the sheet 86 in the moving direction, there is provided a fixing unit 84.

In this respect, the mirrors 74A, 74B and 74C arranged on the emission side of the Fθ lens 62 constitute a guiding part according to the present invention.

Next, a description will be made of the operation of the present embodiment.

Two laser beams emitted from a light source (not shown) are incident on the light deflector 60 at different angles (different angles of oblique incidence) in the slow scan direction. The laser beams are deflected at equal angle in the light deflector 60, are reflected in accordance with the different angles of oblique incidence respectively, and reach the Fθ lens 62. The Fθ lens 62 focuses the laser beams incident on the surface to be scanned (surface of the photoreceptor 82), and the laser beam spots focused are moved with constant velocity by the deflection of the light deflector 60. Therefore, the photoreceptor 82 is to be scanned and exposed with constant velocity.

In image formation, the photoreceptor 82 is first charged at predetermined electric potential by the charger 76A so that an electrostatic latent image for a first color image is formed by the laser beam L3 for taking charge of the first color. The photoreceptor 82 is rotating with constant velocity, and an electrostatic latent image formed is visualized as a first color toner image by the developer 78A including the first toner provided at the downstream side for visualizing the first color. In the charger 76B provided downstream of the developer 78A, the photoreceptor 82 is charged at predetermined electric potential again, and an electrostatic latent image for a second color image is formed by the laser beam L4 for taking charge of the second color. The electrostatic latent image formed as the second color by the rotation with constant velocity of the photoreceptor 82 is visualized as a second color toner image by the developer 78B including the second toner provided at the downstream side for visualizing the second color. Therefore, the first and second color images (toner images) are supposedly formed on the photoreceptor 82. The visualized two-color toner image formed on the photoreceptor 82 is transferred onto the sheet 86, and is melt-fixed by the fixing unit 84 provided at the downstream side in the conveying direction. Thus, the two-color image can be formed.

According to the present embodiment, in the Fθ lens 62 for scanning and focusing two laser beams deflected, the change in the angle of the light beam in the slow scan direction caused by the deflection angle is reduced, and the laser beams after the emission enter a substantially aligned state in both angle and position in the slow scan direction. Therefore, the curved scanning line can be also reduced while an excellent image-formation performance is maintained on the photoreceptor 82 respectively even if two laser beams obliquely become incident on one piece of scanning lens. For this reason, the image-formation performance does not vary for each color, nor is any color drift between two colors caused. Therefore, an excellent image can be obtained.

[Third Embodiment]

The present embodiment is the application of the present invention to an image forming apparatus for forming a multi-color image using an optical scanner based on the above-described semiconductor laser. In this respect, since the present embodiment has the substantially same structure as the above-described embodiment, the portions identical are designated by the identical reference numerals to omit the detailed description.

Figure 13:
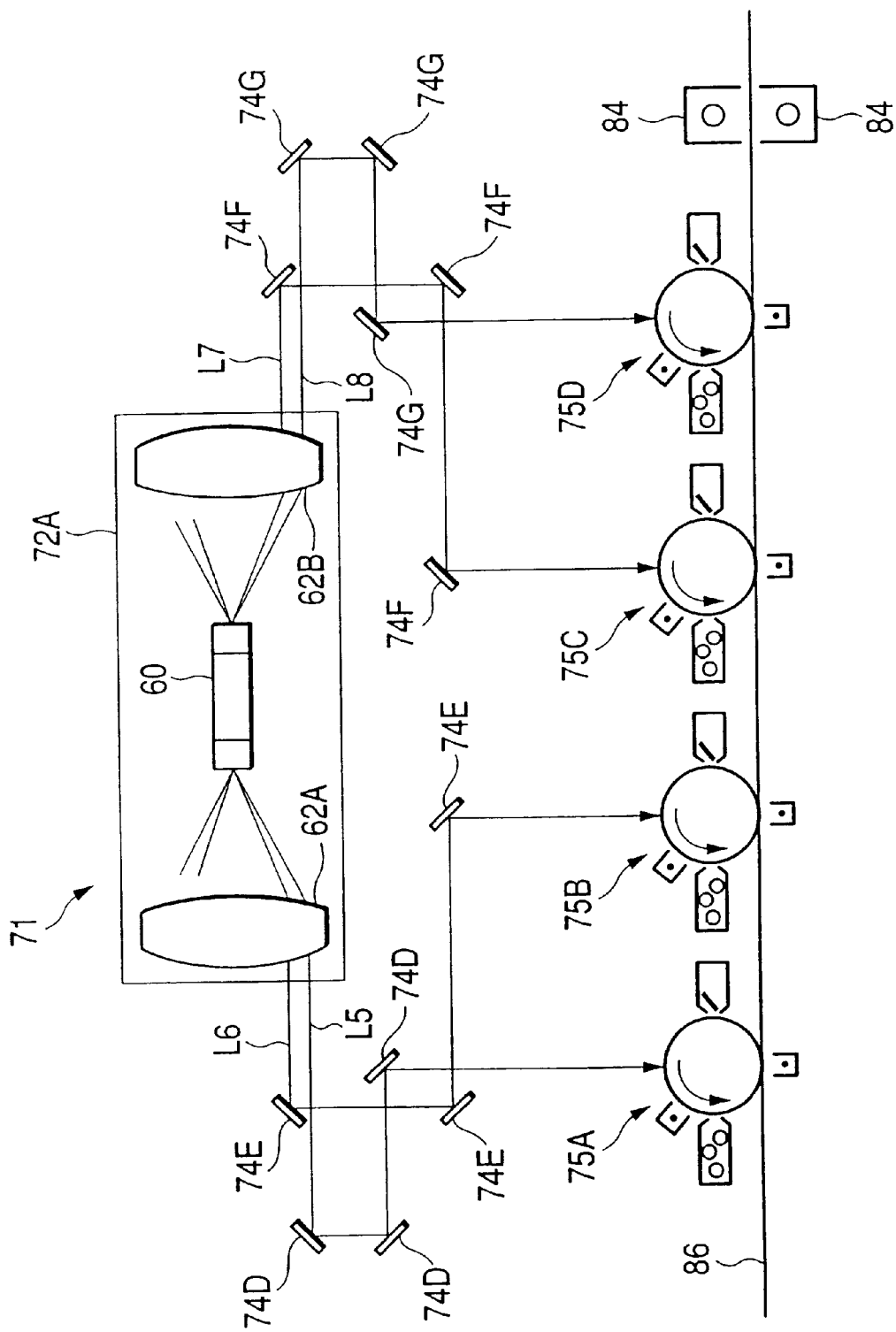
FIG. 13 is a perspective view showing schematic structure of an image forming apparatus according to a third embodiment of the present invention.

As shown in FIG. 13, an image forming apparatus 71 according to the present embodiment has a laser scanner 72A. The laser scanner 72A has the substantially same structure as the laser scanner 72 (optical scanner 50) shown in FIG. 12, but is different in that optical systems of FIG. 12 are arranged on both sides of the light deflector 60. More specifically, in the present embodiment, in order to form each of four colors (for example, four colors of YMCK) images as a multi-color image, two sets of optical systems, each of the systems, comprising a semiconductor laser 52, a collimator lens 54, a mirror 56 and a cylindrical lens 58 arranged sequentially, for emitting two laser beams, are arranged to emit four laser beams in total. There is arranged a light deflector 60 such that reflective surfaces (both sides) facing to each other are positioned at the imaged positions of linear images of the respective cylindrical lenses 58 or in the vicinity thereof. At respective sides opposite to the laser beam of the light deflector 60, there are arranged Fθ lenses 62A and 62B having the same shape.

According to the present embodiment, in order to form a four-color image, four laser beams corresponding to colors are incident on the light deflector 60. From the light deflector 60, two sets consisting of two laser beams each set are reflected and deflected toward the Fθ lenses 62A and 62B. From the Fθ lens 62A, the laser beam L5 for taking charge of the first color (for example, Y color) and the laser beam L6 for taking charge of the second color (for example, M color) are emitted. From the Fθ lens 62B, the laser beam L7 for taking charge of the third color (for example, C color) and the laser beam L8 for taking charge of the fourth color (for example, K color) are emitted.

On the emission side of the laser beam L5 for taking charge of the first color, on the emission side of the Fθ lens 62A, there are provided a plurality of mirrors 74D, and laser beams reflected by the plurality of mirrors 74D reach an image forming unit 75A. Also, on the emission side of the laser beam L6 for taking charge of the second color, on the emission side of the Fθ lens 62A, there are provided a plurality of mirrors 74E, and laser beams reflected by the plurality of mirrors 74E reach an image forming unit 75B. Similarly, on the emission side of the laser beam L7 for taking charge of the third color, on the emission side of the Fθ lens 62B, there are provided a plurality of mirrors 74F, and laser beams reflected by the plurality of mirrors 74F reach an image forming unit 75C. On the emission side of the laser beam L8 for taking charge of the fourth color, on the emission side of the Fθ lens 62B, there are provided a plurality of mirrors 74G, and laser beams reflected by the plurality of mirrors 74G reach an image forming unit 75D.

The image forming unit 75A is an image forming portion for a first color (for example, Y color) constructed in the same manner as the photoreceptor 82 of FIG. 12 and its surrounding equipment, and is provided with a charger 76A, a developer 78A, a cleaner 80 and a photoreceptor 82. In this respect, the developer in the image forming unit 75A is loaded with first color toner for visualizing the first color. Also, the image forming unit 75B is an image forming portion for a second color (for example, M color), and the developer is loaded with second color toner for visualizing the second color. Similarly, the image forming unit 75C is an image forming portion for a third color (for example, C color), and the developer is loaded with third color toner for visualizing the third color. The image forming unit 75D is an image forming portion for a fourth color (for example, K color), and the developer is loaded with fourth color toner for visualizing the fourth color.

In this respect, downstream of the sheet 86 in the moving direction, there is provided a fixing unit 84.

Also, mirrors 74D, 74E, 74F and 74G arranged on the emission side of the Fθ lenses 62A and 62B constitute a guiding part according to the present invention.

The image forming apparatus according to the present embodiment has the similar basic operation to the image forming apparatus 70 of FIG. 12, and therefore, the description is omitted.

According to the present embodiment, in the Fθ lenses 62A and 62B for scanning and focusing four laser beams deflected, the changes in the angles of the light beams in the slow scan direction caused by the deflection angle are reduced, and the laser beams after the emission enter a substantially aligned state in both angle and position in the slow scan direction. Therefore, the curved scanning line can be also reduced while the excellent image-formation performance is maintained on the photoreceptor 82 even if laser beams obliquely become incident on the Fθ lenses. For this reason, the image-formation performance does not vary for each color, nor is any color drift between four colors caused. Therefore, an excellent image can be obtained.

Also, according to the present embodiment, four laser beams are emitted using two scanning lenses, each of the scanning lenses for scanning and focusing two laser beams, and therefore, two sets of optical systems, each consisting of scanning lenses for causing two laser beams to become incident on a light deflector to scan and focus two laser beams deflected, are constructed whereby the image forming apparatus can be easily constructed.

[Fourth Embodiment]

The present embodiment is the application of the present invention to another image forming apparatus for forming a multi-color image using an optical scanner based on the above-described semiconductor laser. In this respect, since the present embodiment has the substantially same structure as the above-described embodiment, the portions identical are designated by the identical reference numerals to omit the detailed description.

Figure 14:
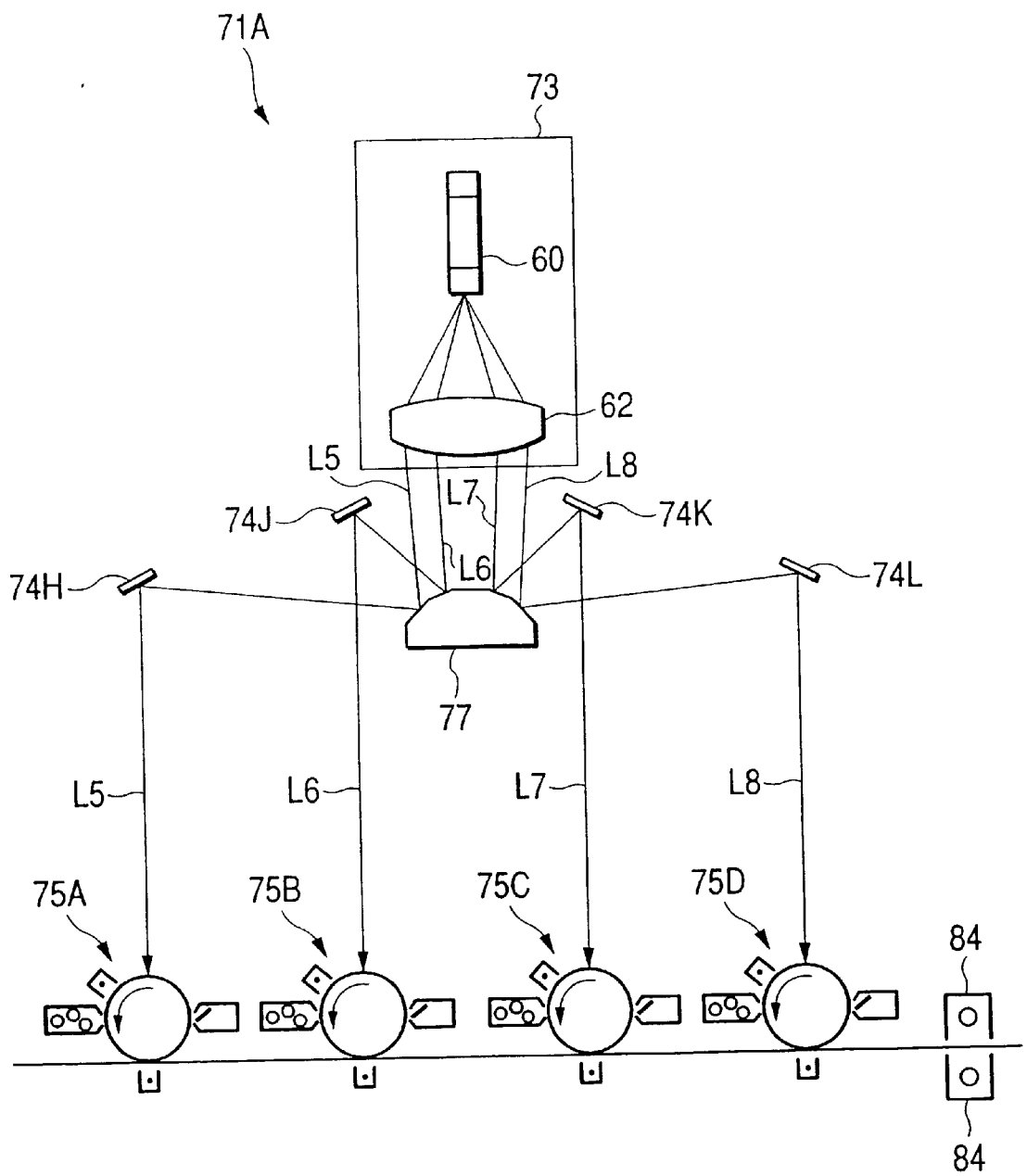
FIG. 14 is a perspective view showing schematic structure of an image forming apparatus according to a fourth embodiment of the present invention.

As shown in FIG. 14, an image forming apparatus 71A according to the present embodiment has a laser scanner 73. The laser scanner 73 has the substantially same structure as the laser scanner 50 shown in FIG. 11, and a semiconductor laser 52, a collimator lens 54, a mirror 56 and a cylindrical lens 58 are arranged sequentially. There is arranged a light deflector 60 for reflecting a laser beam incident such that a reflective surface is positioned at the imaged position of a linear image of the cylindrical lens 58 or in the vicinity thereof to deflect with constant angular velocity in a direction corresponding to the fast scan direction. At a side opposite to the laser beam of the light deflector 60, there is arranged an Fθ lens 62, which is one piece of scanning lens, for focusing such that the laser beam spot moves on the surface to be scanned with constant velocity.

Figure 15:
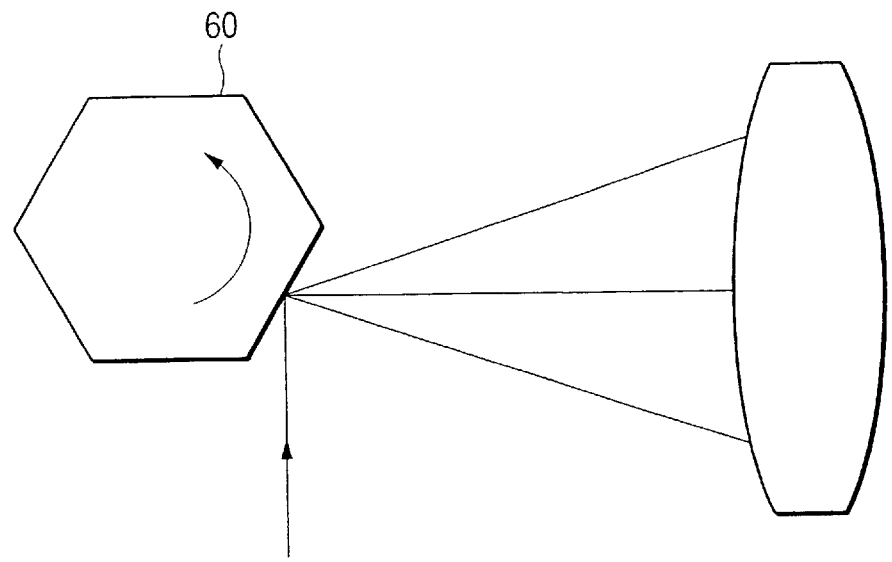
FIG. 15 is an image diagram showing an optical scanner included in the image forming apparatus shown in FIG. 14 as viewed from a direction along the slow scan direction near the light deflector.

According to the present embodiment, in order to form a four-color image, four laser beams corresponding to colors are incident on the light deflector 60. In this respect, FIG. 15 shows an incident state of laser beams when the light deflector 60 is viewed from a direction along the slow scan direction. As regards the four laser beams, four semiconductor lasers 52 may be arranged, and two sets of two-laser beam semiconductor laser arrays or a semiconductor laser array for emitting four laser beams may be used. In this manner, from the Fθ lens 62, there are emitted the laser beam L5 for taking charge of the first color (for example, Y color), the laser beam L6 for taking charge of the second color (for example, M color), the laser beam L7 for taking charge of the third color (for example, C color), and the laser beam L8 for taking charge of the fourth color (for example, K color).

On the emission side of laser beams from the Fθ lens 62, there is provided a multi facets folding mirror 77. The multi facets folding mirror 77 has at least four reflective surfaces, and separates and reflects the laser beams L5, L6, L7 and L8 in different directions.

On the reflection side of laser beam L5 by the multi facets folding mirror 77, there is provided a mirror 74H, and the laser beam reflected by the mirror 74H reaches the image forming unit 75A. Also, On the reflection side of laser beam L6 by the multi facets folding mirror 77, there is provided a mirror 74J, and the laser beam reflected by the mirror 74J reaches the image forming unit 75B. Similarly, on the reflection side of laser beam L7 by the multi facets folding mirror 77, there is provided a mirror 74K, and the laser beam reflected by the mirror 74K reaches the image forming unit 75C. On the reflection side of laser beam L8 by the multi facets folding mirror 77, there is provided a mirror 74L, and the laser beam reflected by the mirror 74L reaches the image forming unit 75D. These image forming units 75A, 75B, 75C and 75D are the same as the image forming units of FIG. 13, and therefore, the description is omitted.

In this respect, the multi facets folding mirror 77, the mirrors 74H, 74J, 74K and 74L, which are arranged on the emission side of the Fθ lens 62, constitute the guiding part according to the present invention. Also, the multi facets folding mirror 77 constitutes the separating part according to the present invention.

According to the present embodiment, in the Fθ lens 62 for scanning and focusing four laser beams deflected, the changes in the angles of the light beams in the slow scan direction caused by the deflection angle are reduced, and the laser beams after the emission enter a substantially aligned state in both angle and position in the slow scan direction. According to this Fθ lens, the curved scanning line can be also reduced while the excellent image-formation performance is maintained on the photoreceptor 82 even if laser beams obliquely become incident. More specifically, the four laser beams can be incident at the same point on the reflective surface of the light deflector, and it is not necessary to increase the thickness (in the slow scan direction) of the light deflector even in a case where a plurality of laser beams are used. For this reason, the motor load for rotating the light deflector is not increased, but the system load can be reduced.

Also, since the image-formation performance does not vary for each color, any drift among colors which may cause the color drift among four colors is not caused, but an excellent image can be obtained.

deflector 60 has a distance between the center of rotation and the reflective surface of 17 mm, and the center of rotation is arranged on the extension line of the incident light beam optical path to determine the structure of the Fθ lens in the first to sixth embodiments. The structure of the Fθ lens in the first to sixth embodiments is shown on the following Table 1.

TABLE 1

|  | Example 1 | Example 2 | Example 3 | Example 4 | Example 5 | Example 6 |
|---|---|---|---|---|---|---|
| α | 6 | 6 | 6 | 4 | 8 | 6 |
| D1 | 64.3935 | 61.6245 | 57.8138 | 61.4520 | 63.8626 | 56.8722 |
| D2 | 15.3407 | 17.0375 | 18.7505 | 16.4225 | 18.8919 | 14.6556 |
| D3 | 174.6990 | 173.6830 | 172.2500 | 174.2420 | 18.8919 | 173.0410 |
| n | 1.712004 | 1.608924 | 1.511080 | 1.608924 | 1.608927 | 1.608924 |
| S1 | | | | | | |
| RY | 1378.820 | 712.933 | 412.661 | 698.041 | 703.448 | 556.348 |
| RX | 108210 | −112785 | 219398 | −195797 | −189904 | −200 |
| KY | 77.9166 | 53.8461 | 16.7684 | 52.3607 | −106.3040 | 21.2907 |
| KX | 9192089 | 2218724 | −3756887 | 16162320 | −7739049 | 128 |
| AR | −1.416766E−07 | −1.215577E−07 | −1.354105E−07 | −1.413440E−07 | −1.114101E−07 | −1.095117E−07 |
| BR | 1.331015E−10 | 1.268546E−10 | 1.167794E−10 | 1.313270E−10 | 1.262050E−10 | 7.314465E−11 |
| CR | −3.695442E−14 | −3.757585E−14 | −3.738083E−14 | −3.793569E−14 | −3.466258E−14 | −1.616364E−14 |
| DR | 3.833663E−18 | 5.192516E−18 | 6.292219E−18 | 5.668012E−18 | 3.780015E−18 | −1.524816E−15 |
| AP | 3.183520E−01 | 3.216920E−01 | 3.018730E−01 | 2.380100E−01 | 1.725470E−01 | 6.392390E−01 |
| BP | −1.746260E−01 | −1.573540E−01 | −1.586030E−01 | −1.614760E−01 | −1.567060E−01 | −1.987450E−01 |
| CP | −1.755180E−01 | −1.721470E−01 | −1.716230E−01 | −1.712620E−01 | −1.812590E−01 | −3.0766760E−01 |
| DP | −2.744730E−01 | −2.900130E−01 | −2.814220E−01 | −2.974120E−01 | −2.661550E−01 | −8.756290E−01 |
| S2 | | | | | | |
| RY | −129441 | −117.521 | −105.939 | −117.409 | −120.549 | −123.204 |
| RX | −37.109 | −31.118 | −25.554 | −31.076 | −31.778 | −26.537 |
| KY | −1.95452 | −1.50020 | −1.41022 | −1.57281 | −1.05514 | −3.52887 |
| KX | −0.763668 | −0.854845 | −0.843653 | −0.804948 | −0.919249 | −0.503509 |
| AR | −2.294757E−08 | −2.067087E−08 | −2.233729E−08 | −1.831790E−08 | −1.160077E−08 | −3.305138E−08 |
| BR | 1.211493E−10 | 5.624319E−11 | −3.616776E−11 | 5.837080E−12 | 3.249415E−13 | 2.776293E−12 |
| CR | 3.640947E−14 | 4.298303E−14 | 4.147540E−14 | 4.314644E−14 | 4.730367E−14 | 7.065139E−14 |
| DR | −9809247E−18 | −9.802398E−18 | −9.850133E−18 | −8.044706E−18 | −9.475326E−18 | −3.902291E−18 |
| AP | 1.90574 | 1.90937 | 1.80020 | 2.18769 | 2.46577 | 2.27548 |
| BP | −0.797824 | −0.895758 | −0.705871 | −0.125402 | 1.534040 | −2.611510 |
| CP | −0.253282 | −0.269393 | −0.293560 | −0.282192 | −0.319468 | −0.472800 |
| DP | −0.189230 | −0.184234 | −0.196262 | −0.154166 | −0.233610 | −0.252690 |

Figure 16:
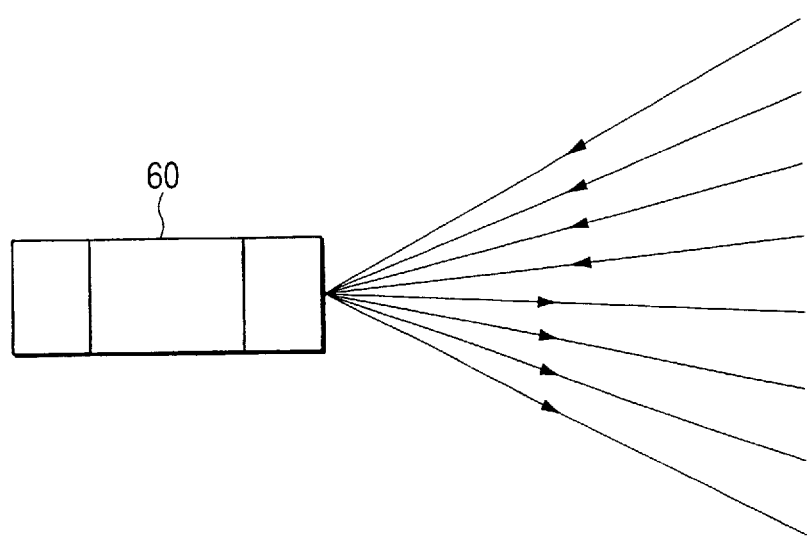
FIG. 16 is an explanatory view showing that a plurality of laser beams are incident one side in the slow scan direction.

In this respect, according to the present invention, since four laser beams are symmetrically arranged in the slow scan direction, the laser beams are incident on the light deflector 60 from the side in the fast scan direction. If, however, the four laser beams are incident from one side in the slow scan direction as shown in FIG. 16, it goes without saying that it is possible to cause them to become incident from the front.

[Embodiment]

Hereinafter, with reference to the drawings, the detailed description will be made of an example of embodiment according to the present invention. The present embodiment is applied to an optical system for use in the above-described optical scanner 50. In this respect, although various numerical values have been defined in the following embodiment, the present invention is not limited thereto.

As regards the optical quality in the following embodiment, light beams from the semiconductor laser 52, which is a light source, are made into parallel light beams with a diameter of 4 mm by the collimator lens 54, the light beams are limited to a width of 2.4 mm only in the fast scan direction by a slit, and thereafter, are imaged into a long linear shape near the reflective surface of the light deflector 60 in the fast scan direction by the cylinder lens 58 with a focal length of 50 mm, the polygon mirror of the light The Fθ lens specified in the Table 1 has been obtained by designing by changing various parameters under the same conditions that the scanning width of the optical scanner 50 is 210 mm and the focal length, in the fast scan direction, of the Fθ lens 62 is 172.02847 mm. In the Table, α is an angle of oblique incidence (deg), D1, D2 and D3 are, as shown in FIG. 17, a distance between the reflective surface of the light deflector 60 and the first surface of the Fθ lens 62, the central thickness of the Fθ lens 62, and a distance (all in mm) along the normal of the deflected reflective surface between the second surface of the Fθ lens 62 and the surface to be scanned 64 respectively, n designates the refractive index of the lens, and the other parameters are constants used in the equation (3). In each embodiment on the Table 1, the z-axis of each plane of the Fθ lens coincides with the normal including a light beam reflective point on the deflected reflective surface in the slow scan direction.

In each embodiment of the first embodiment to the third embodiment, the material of the Fθ lens 62 has been changed with the angle of oblique incidence on the light deflector 60 as six degrees. In the fourth and fifth embodiments, the angle of oblique incidence has been changed with respect to the second embodiment, and in the sixth embodiment, the curvature radius near the z-axis in the slow scan direction has been set smaller than the second embodiment.

Figure 18A:
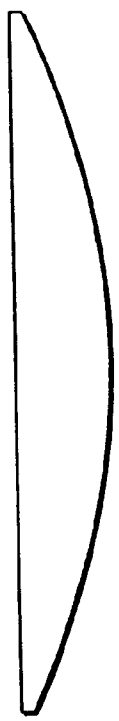
FIGS. 18A and 18B are charts showing the shape of the Fθ lens in a first embodiment.
Figure 18B:

The shape of the lens in the first embodiment is shown in FIG. 18. FIG. 18A is a cross-sectional view in the y-z plane, and FIG. 18B is a cross-sectional view in the x-z plane. It can be seen that the shape of the first surface in both the fast scan direction and in the slow scan direction is close to a plane, namely the power of the lens surface is small. Tables 2 to 7 summarize the curvature radius of lens surface at a light beam passage position in each embodiment.

TABLE 2

Slow scan direction S1

|  | Example 1 | Example 2 | Example 3 | Example 4 | Example 5 | Example 6 |
|---|---|---|---|---|---|---|
| α | 6 | 6 | 6 | 4 | 8 | 6 |
| n | 1.712004 | 1.608924 | 1.511080 | 1.608924 | 1.608924 | 1.608924 |
| Deflection angle | | | | | | |
| 17.5 | −614.806 | −2790.05 | 18247.9 | −4184.4 | 6745.85 | −285.069 |
| 15 | −1848.48 | 7170.93 | −35085.7 | 5889.62 | 4751.61 | −236.513 |
| 12.5 | −4147.04 | 11780.7 | −11944.7 | 18230.6 | 9769.85 | −204.726 |
| 10 | −20254.1 | 168636 | −10217 | −33859.3 | 70874.8 | −186.521 |
| 7.5 | 32239.7 | −29313.6 | −12297.5 | −17975.4 | −25855.4 | −176.138 |
| 5 | 931103 | −25173.7 | −19184.7 | −21409.5 | −19110.8 | −170.293 |
| 2.5 | −156268 | −31483.2 | −36788.6 | −34083.9 | −21259.2 | −167.307 |
| 0 | −157638 | −36904.4 | −56806.6 | −46507.3 | −23367.5 | −166.389 |

TABLE 3

Slow scan direction S2

|  | Example 1 | Example 2 | Example 3 | Example 4 | Example 5 | Example 6 |
|---|---|---|---|---|---|---|
| α | 6 | 6 | 6 | 4 | 8 | 6 |
| n | 1.712004 | 1.608924 | 1.511080 | 1.608924 | 1.608924 | 1.608924 |
| Deflection angle | | | | | | |
| 17.5 | −44.5987 | −37.4312 | −30.8124 | −35.9493 | −40.7334 | −31.3353 |
| 15 | −42.7589 | −36.1491 | −30.0105 | −34.6039 | −39.4174 | −30.0882 |
| 12.5 | −41.3651 | −35.1919 | −29.3976 | −33.6452 | −38.4154 | −29.2641 |
| 10 | −40.3906 | −34.5121 | −28.9448 | −32.9855 | −37.6918 | −28.715 |
| 7.5 | −39.7406 | −34.0478 | −28.6229 | −32.5445 | −37.1928 | −28.3525 |
| 5 | −39.3313 | −337486 | −28.4086 | −32.2635 | −36.8719 | −28.1232 |
| 2.5 | −39.1059 | −33.581 | −28.2858 | −32.1066 | −36.6939 | −27.9961 |
| 0 | −39.0338 | −33.5269 | −28.2458 | −32.056 | −36.6369 | −27.9554 |

TABLE 4

Slow scan direction S2/S1

|  | Example 1 | Example 2 | Example 3 | Example 4 | Example 5 | Example 6 |
|---|---|---|---|---|---|---|
| 7.5 | 13.76529 | 74.53809 | −592.226 | 116.3973 | −165.61 | 9.097376 |
| 15 | 43.23053 | −198.371 | 1169.114 | −170.201 | −120.546 | 7.860656 |
| 12.5 | 100.2546 | −334.756 | 406.3155 | −541.848 | −254.321 | 6.995807 |
| 10 | 501.4558 | −4886.29 | 352.9822 | 1026.49 | −1880.38 | 6.495595 |
| 7.5 | −811.253 | 860.9543 | 429.6385 | 552.333 | 695.1722 | 6.212433 |
| 5 | −23673.3 | 745.9183 | 675.3131 | 663.5827 | 518.3026 | 6.05525 |
| 2.5 | 3996.021 | 937.5302 | 1300.603 | 1061.585 | 579.3661 | 5.976082 |
| 0 | 4038.5 | 1100.74 | 2011.152 | 1450.814 | 637.8132 | 5.951945 |

TABLE 5

Fast scan direction S1

|  | Example 1 | Example 2 | Example 3 | Example 4 | Example 5 | Example 6 |
|---|---|---|---|---|---|---|
| α | 6 | 6 | 6 | 4 | 8 | 6 |
| n | 1.712004 | 1.608924 | 1.511080 | 1.608924 | 1.608924 | 1.608924 |
| Deflection angle | | | | | | |
| 17.5 | 1032.69 | 1600.69 | 1521.55 | 1580 | 1343.15 | −2509.54 |
| 15 | 1443.96 | 1696.17 | 806.444 | 1841.95 | 1090.28 | −3509.84 |

TABLE 5-continued

Fast scan direction S1

|  | Example 1 | Example 2 | Example 3 | Example 4 | Example 5 | Example 6 |
|---|---|---|---|---|---|---|
| 12.5 | 2493.87 | 1592.86 | 669.401 | 1646.03 | 1217.68 | 6081.91 |
| 10 | 5097.44 | 1349.09 | 581.176 | 1352.13 | 1217.64 | 1454.41 |
| 7.5 | 4175.6 | 1060.95 | 508.777 | 1047.03 | 1031.94 | 859.709 |
| 5 | 2130.85 | 860.088 | 456.448 | 841.904 | 855.918 | 653.028 |
| 2.5 | 1541.31 | 753.029 | 425.821 | 734.159 | 753.624 | 567.725 |
| 0 | 1398.82 | 720.246 | 415.898 | 701.358 | 721.49 | 543.783 |

TABLE 6

Fast scan direction S2

|  | Example 1 | Example 2 | Example 3 | Example 4 | Example 5 | Example 6 |
|---|---|---|---|---|---|---|
| α | 6 | 6 | 6 | 4 | 8 | 6 |
| n | 1.712004 | 1.608924 | 1.511080 | 1.608924 | 1.608924 | 1.608924 |
| Deflection angle |  |  |  |  |  |  |
| 17.5 | −108.454 | −113.011 | −109.356 | −112.314 | −130.104 | −103.037 |
| 15 | −124.078 | −120.877 | −113.051 | −118.544 | −134.163 | −107.111 |
| 12.5 | −125.876 | −119.435 | −111.395 | −116.813 | −128.605 | −112.135 |
| 10 | −126.229 | −118.212 | −109.955 | −115.705 | −125.152 | −117.383 |
| 7.5 | −127.919 | −118.614 | −109.588 | −116.261 | −124.658 | −122.011 |
| 5 | −130.168 | −119.757 | −109.81 | −117.531 | −125.633 | −125.451 |
| 2.5 | −131.897 | −120.737 | −110.108 | −118.597 | −126.716 | −127.498 |
| 0 | −132.521 | −121.1 | −110.228 | −118.991 | −127.149 | −128.165 |

TABLE 7

Fast scan direction S2/S1

|  | Example 1 | Example 2 | Example 3 | Example 4 | Example 5 | Example 6 |
|---|---|---|---|---|---|---|
| 17.5 | −9.52192 | −14.164 | −13.9137 | −14.0677 | −10.3237 | 24.35572 |
| 15 | −11.6375 | −14.0322 | −7.13345 | −15.5391 | −8.12653 | 32.76825 |
| 12.5 | −19.8121 | −13.3366 | −6.00926 | −14.0912 | −9.46837 | −54.2374 |
| 10 | −40.3825 | −11.4125 | −5.28558 | −11.686 | −9.72929 | −12.3903 |
| 7.5 | −32.6425 | −8.94456 | −4.64263 | −9.00586 | −8.27817 | −7.04616 |
| 5 | −16.37 | −7.18194 | −4.15671 | −7.16325 | −6.81284 | −5.20544 |
| 2.5 | −11.6857 | −6.23694 | −3.8673 | −6.19037 | −5.94735 | −4.45281 |
| 0 | −10.5555 | −5.94753 | −3.77307 | −5.89421 | −5.67437 | −4.24284 |

Tables 2 and 3 show curvature radii Rs1 and Rs2 at the light beam passage position on the first and second surfaces in the slow scan direction at deflection angle in increments of 2.5 deg for the first and second surfaces, and Table 4 shows the ratio of Rs1 to Rs2. Tables 5 to 7 summarize those in the fast scan direction similarly.

As will be apparent also from Tables 4 and 7, the shape of the Fθ lens in the first to the sixth embodiments satisfies the following relation:

$$|Rs1/Rs2| \geq 5.9$$

$$|Rt1/Rt2| \geq 3.7$$

A description will be made of a performance which the Fθ lens satisfying these conditions achieves.

Figure 19:
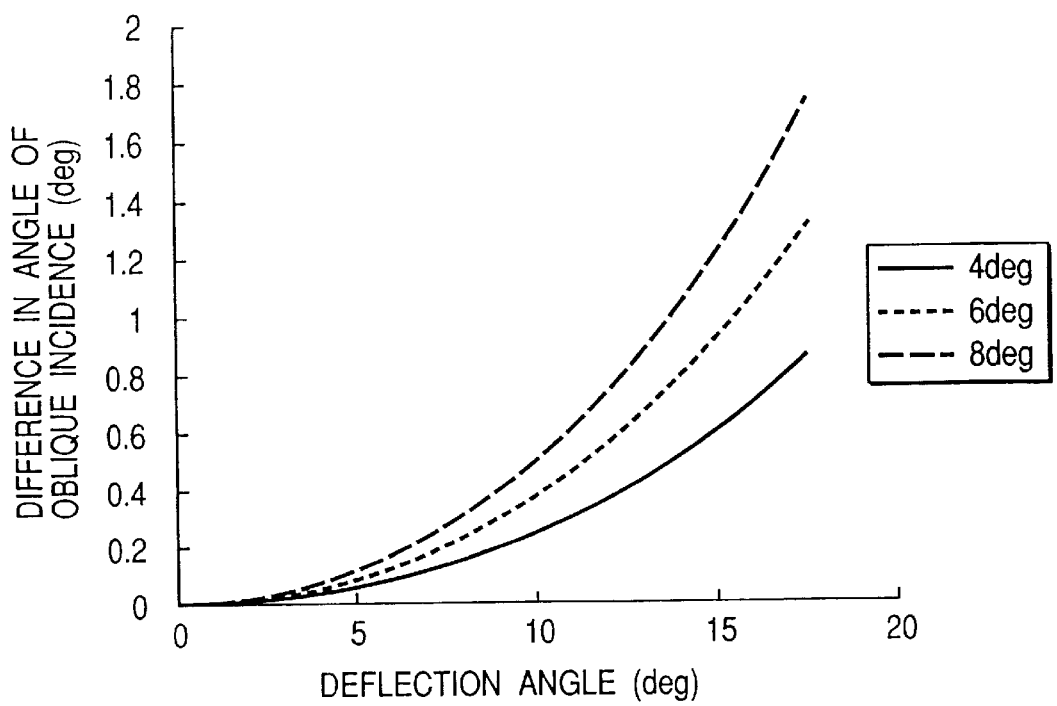
FIG. 19 is a chart showing an angular change in incident light beams on the Fθ lens in the slow scan direction.
Figure 20:
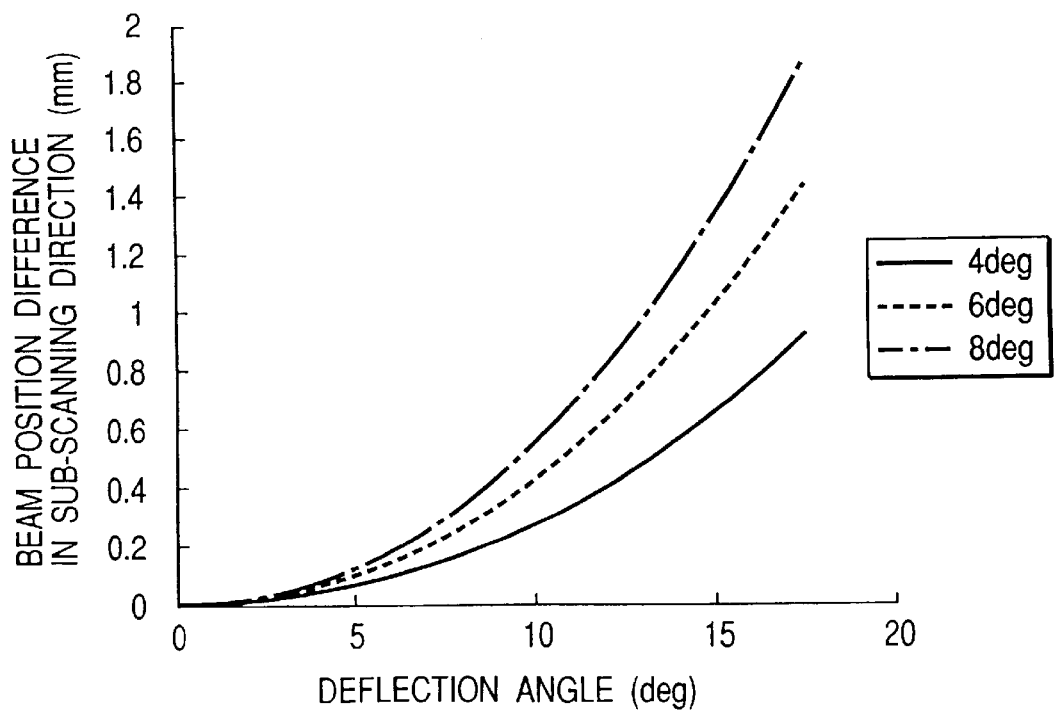
FIG. 20 is a chart showing a degree of curvature in the scanning locus on the first surface of the Fθ lens due to a change in the angle of oblique incidence.

A change angle in the light deflector of the optical system specified on Table 1 is such that the scanning width is 210 mm, the Fθ lens focal length F=172.02847 mm, and the maximum deflection angle θ of the light deflector is ±17.5 deg (angle of view of light beam is ±35 deg) from the generally-known definition equation Y (scanning width/2)= Fθ of the Fθ lens. FIG. 19 shows how the angle of the Fθ lens incident light beam in the slow scan direction changes when the deflection angle θ changes from 0 to 17.5 deg at the angle of oblique incidence of 4, 6 and 8 deg. The abscissa represents the deflection angle, and the ordinate represents the difference in angle of oblique incidence at each deflection position for the angle of oblique incidence at COS. When the angle of oblique incidence at the deflection angle of 0 deg is 4, 6 and 8 deg, changes in the angle of oblique incidence at the deflection angle of 17.5 deg become 0.9 deg (4 deg→4.9 deg), 1.3 deg (6 deg→7.3 deg) and 1.7 deg (8 deg→9.7 deg) respectively. Also, FIG. 20 shows how much the locus for scanning on the first surface is curved by this change in the angle of oblique incidence when incident on the lens first surface. Although the distance between the light deflector and the first surface slightly differs for each embodiment, the difference is small, and therefore, 60 mm in average is used in FIG. 20. When the angle of oblique incidence at the deflection angle of 0 deg is 4, 6 and 8 deg, the locus of the light beam on the first surface is curved by 0.9, 1.4 and 1.9 mm respectively.

Figure 21:
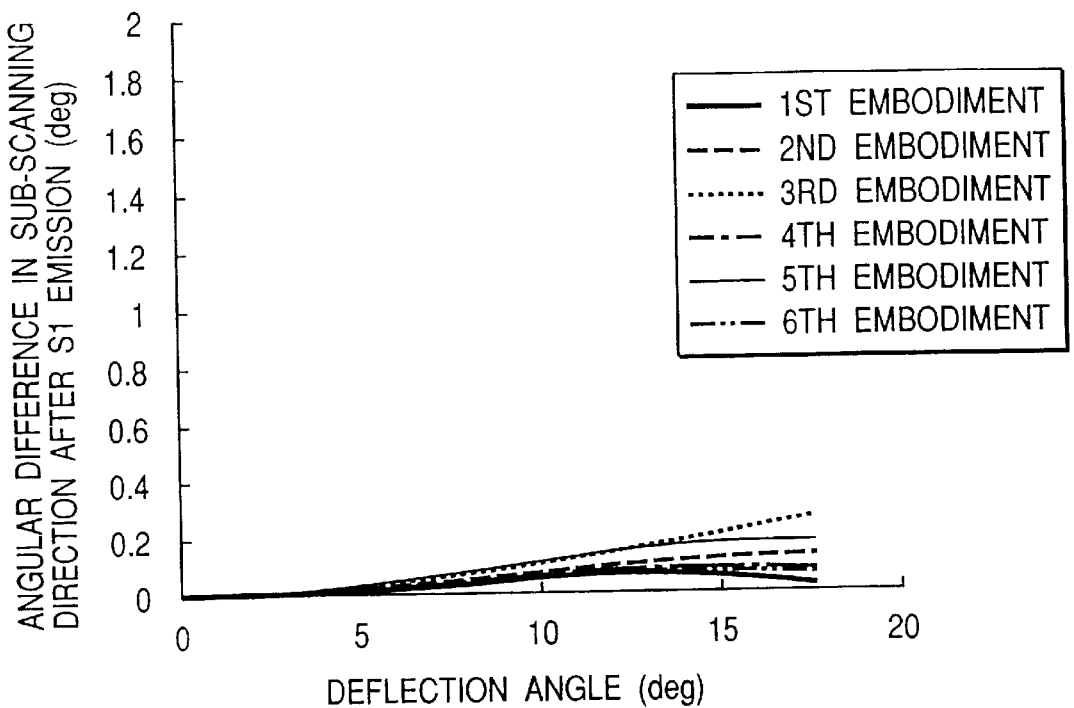
FIG. 21 is a chart showing a degree of reduction of a change in the angle of oblique incidence by the first surface of the Fθ lens.
Figure 22:
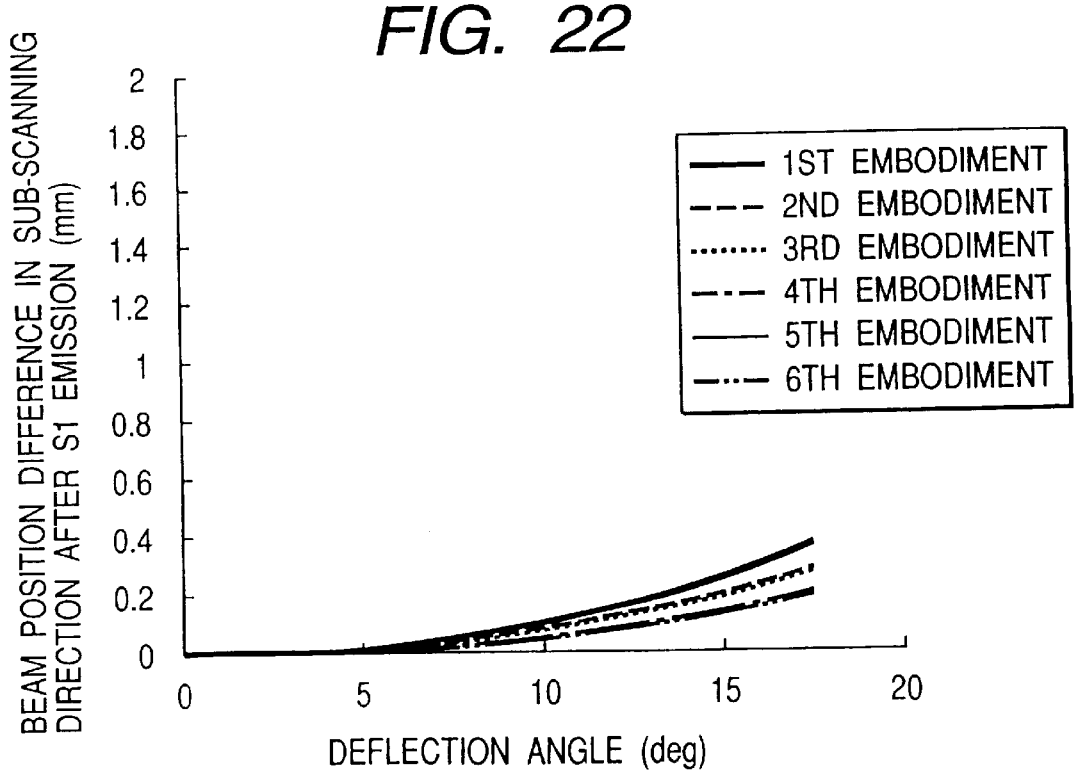
FIG. 22 is a chart showing a degree of reduction of a change in the curvature of locus of light beams by the second surface of the Fθ lens.
Figure 23:
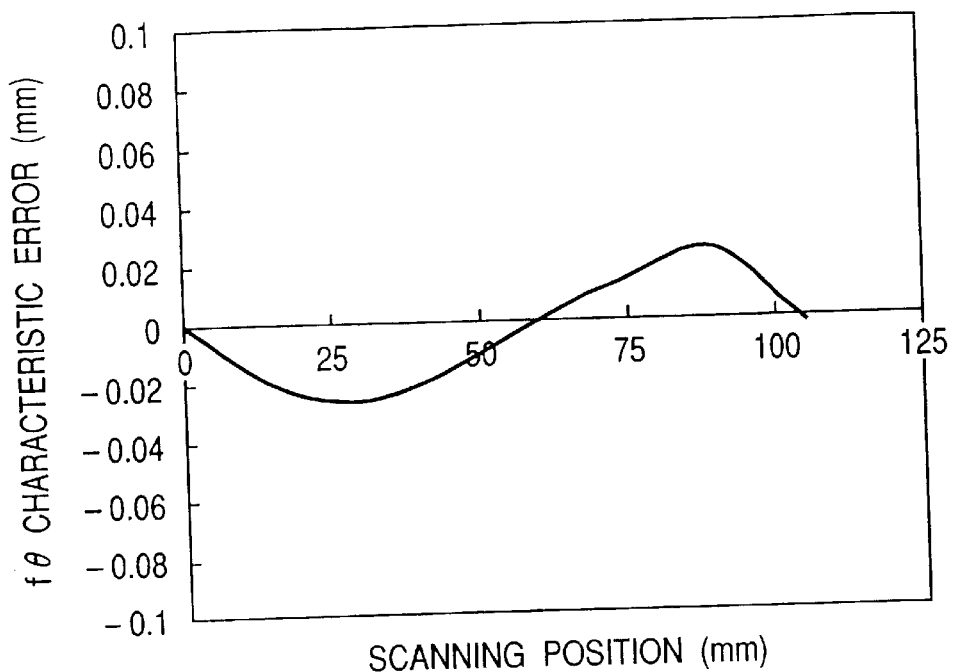
FIG. 23 is a chart showing the Fθ characteristic in the first embodiment.
Figure 24:
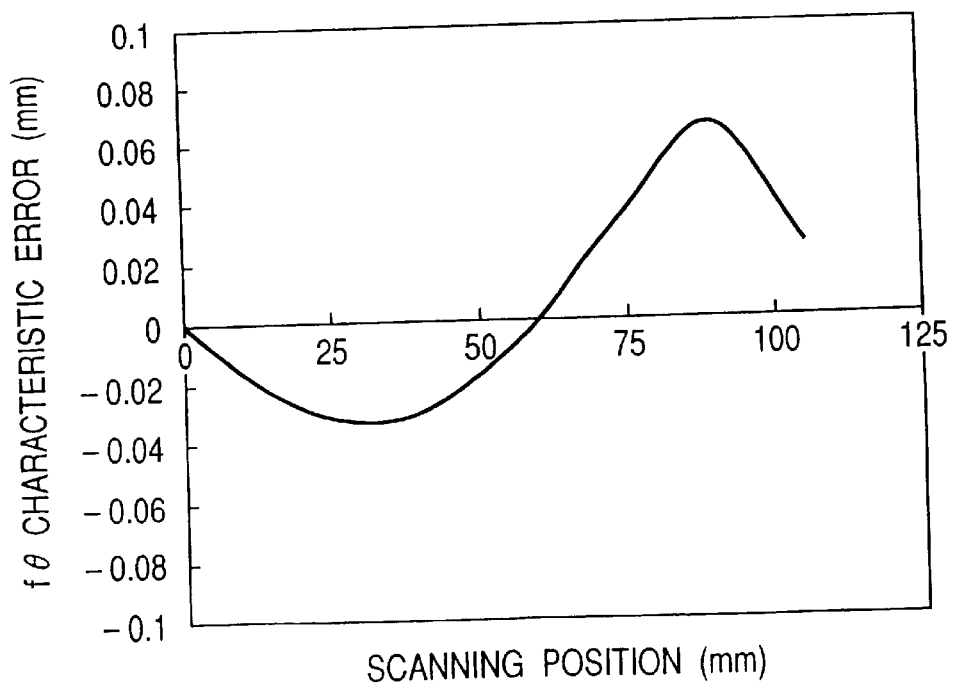
FIG. 24 is a chart showing the Fθ characteristic in the second embodiment.
Figure 25:
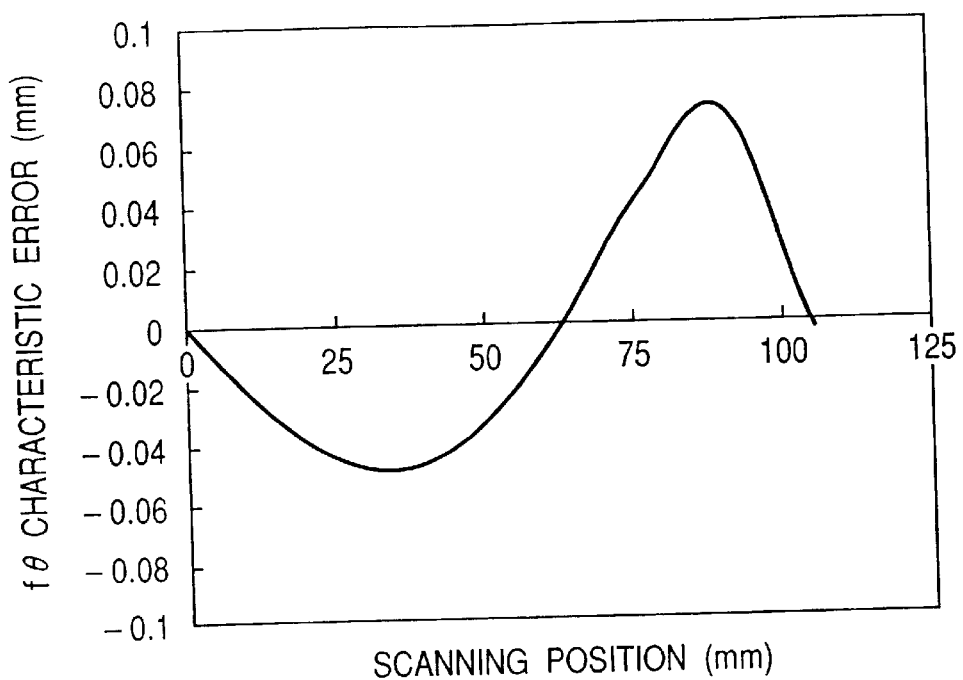
FIG. 25 is a chart showing the Fθ characteristic in the third embodiment.
Figure 26:
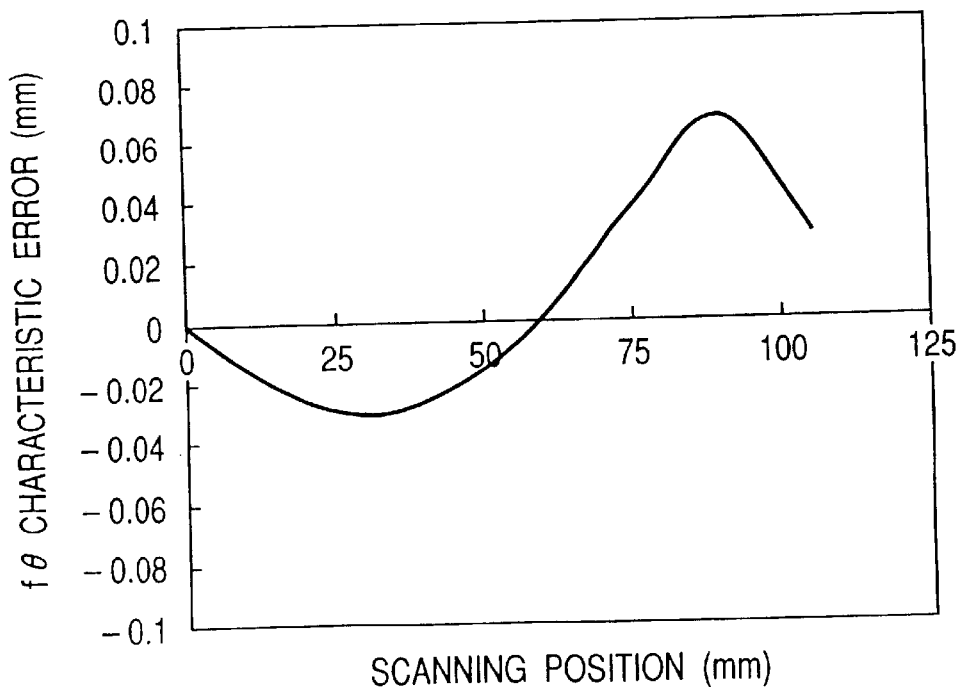
FIG. 26 is a chart showing the Fθ characteristic in the fourth embodiment.
Figure 27:
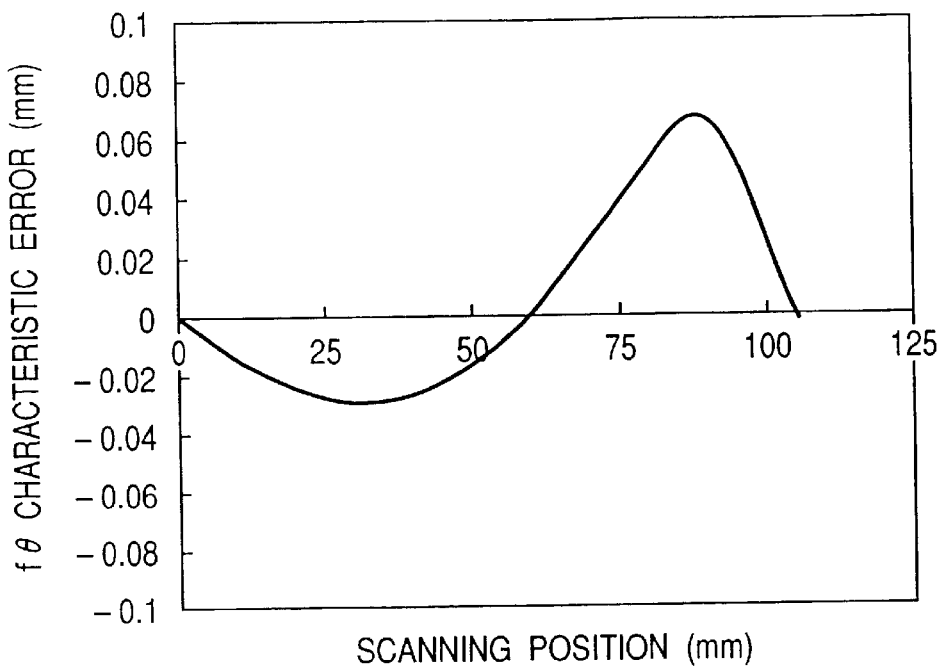
FIG. 27 is a chart showing the Fθ characteristic in a fifth embodiment.
Figure 28:
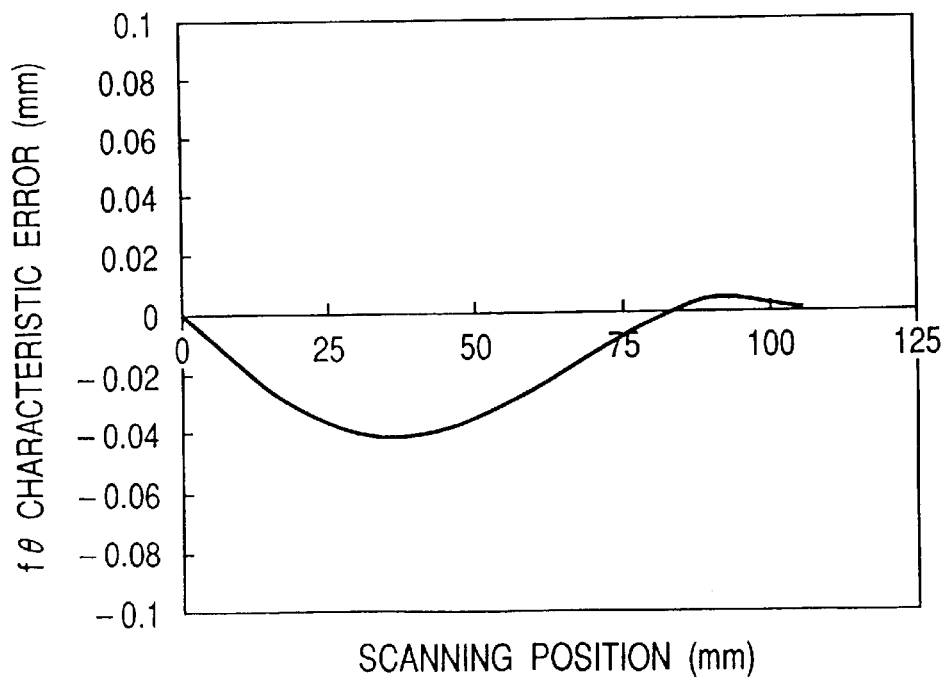
FIG. 28 is a chart showing the Fθ characteristic in a sixth embodiment.
Figure 29:
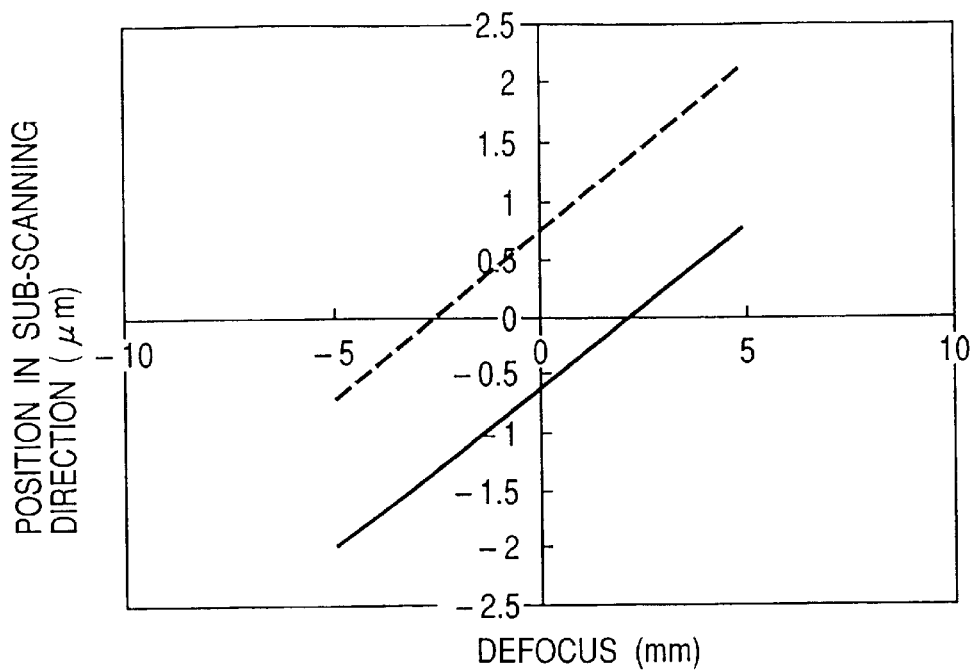
FIG. 29 is a chart showing surface-inclination correction performance of the light deflector in the first embodiment.
Figure 30:
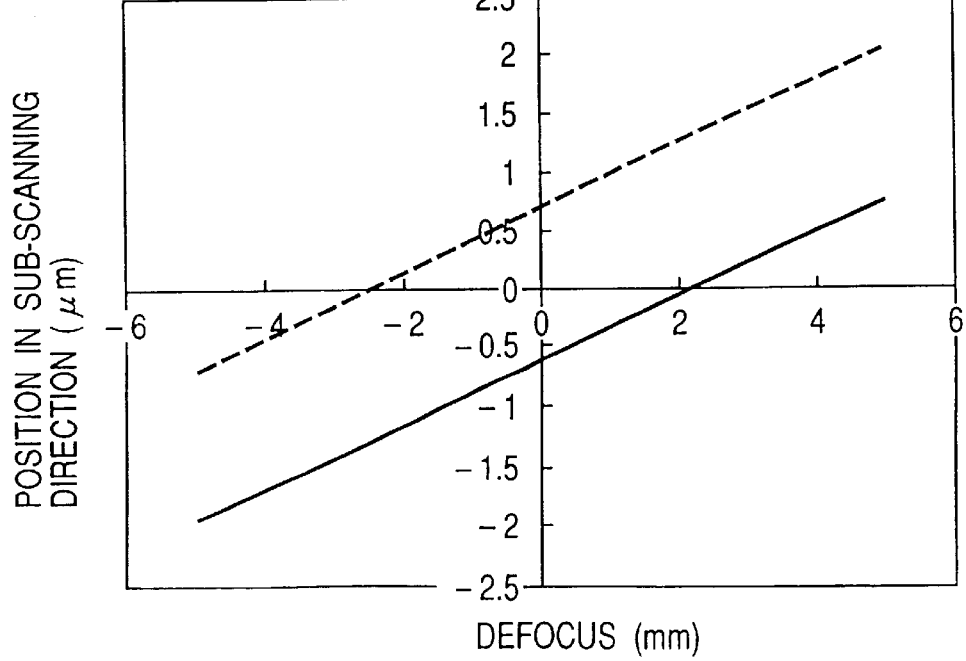
FIG. 30 is a chart showing plane-inclination correction performance of the light deflector in the second embodiment.
Figure 31:
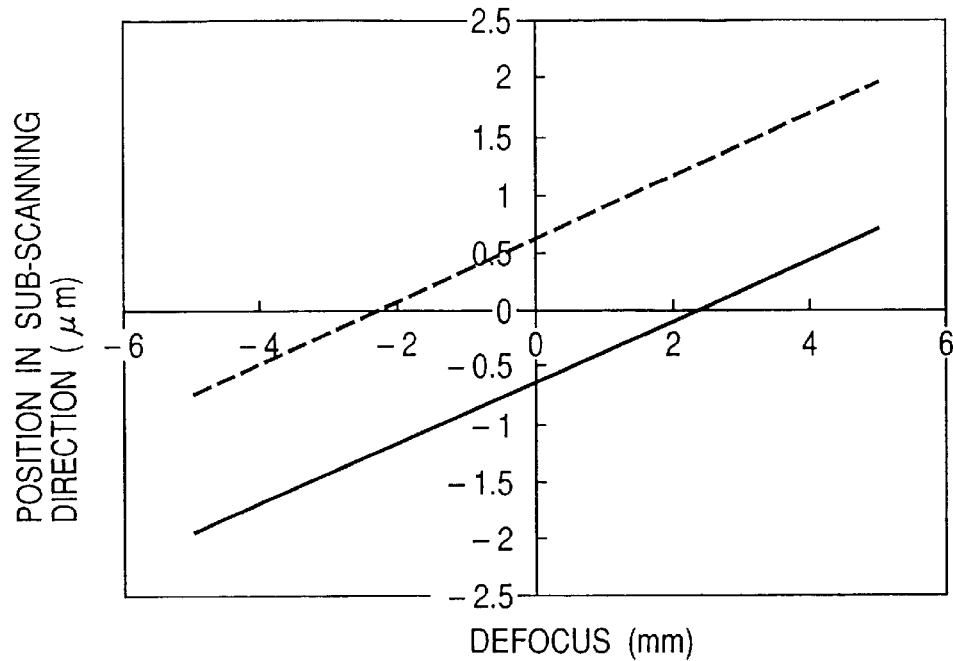
FIG. 31 is a chart showing plane-inclination correction performance of the light deflector in the third embodiment.
Figure 32:
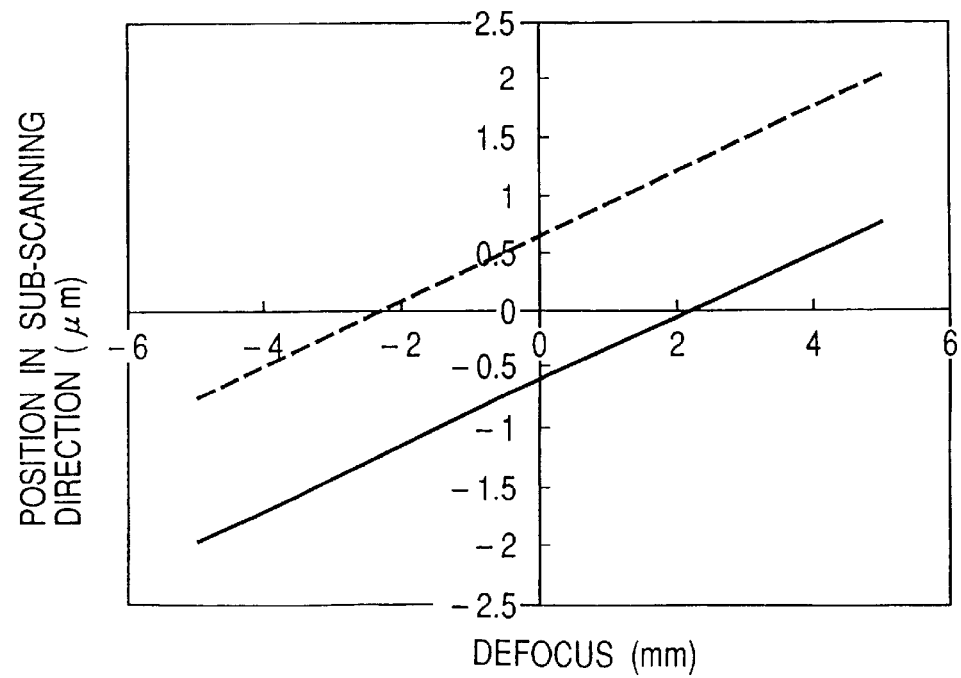
FIG. 32 is a chart showing plane-inclination correction performance of the light deflector in the fourth embodiment.
Figure 33:
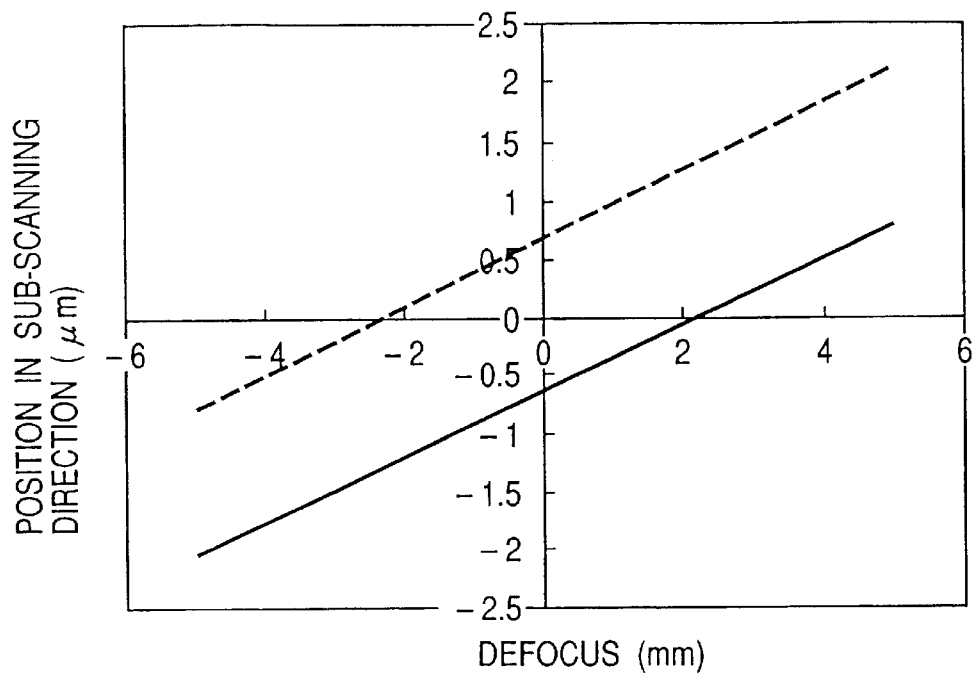
FIG. 33 is a chart showing plane-inclination correction performance of the light deflector in the fifth embodiment.
Figure 34:
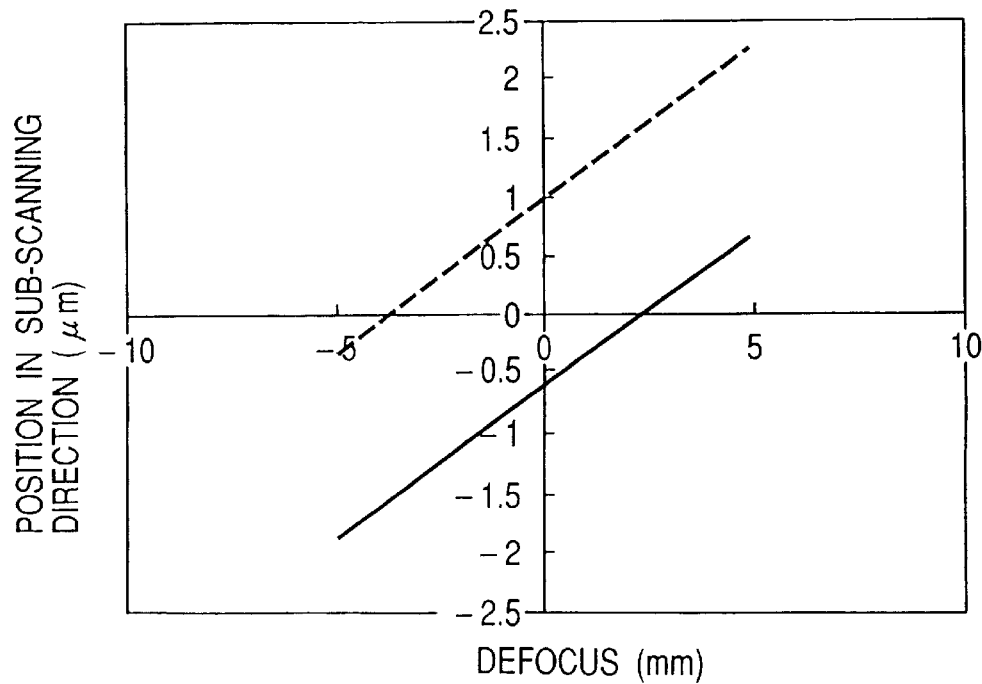
FIG. 34 is a chart showing plane-inclination correction performance of the light deflector in the sixth embodiment.
Figure 35:
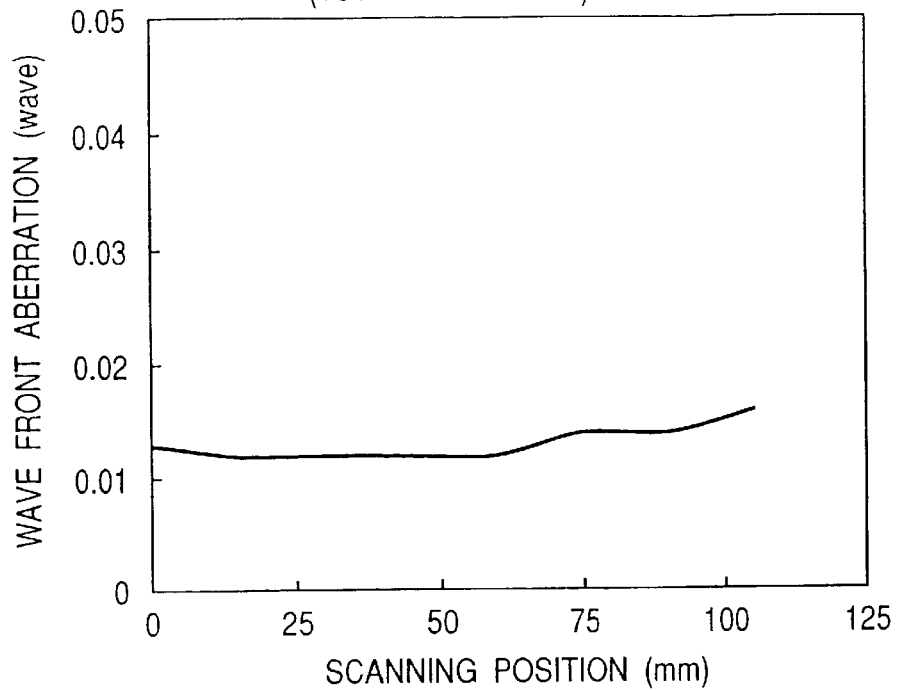
FIG. 35 is a chart showing the image-formation performance in the first embodiment.
Figure 36:
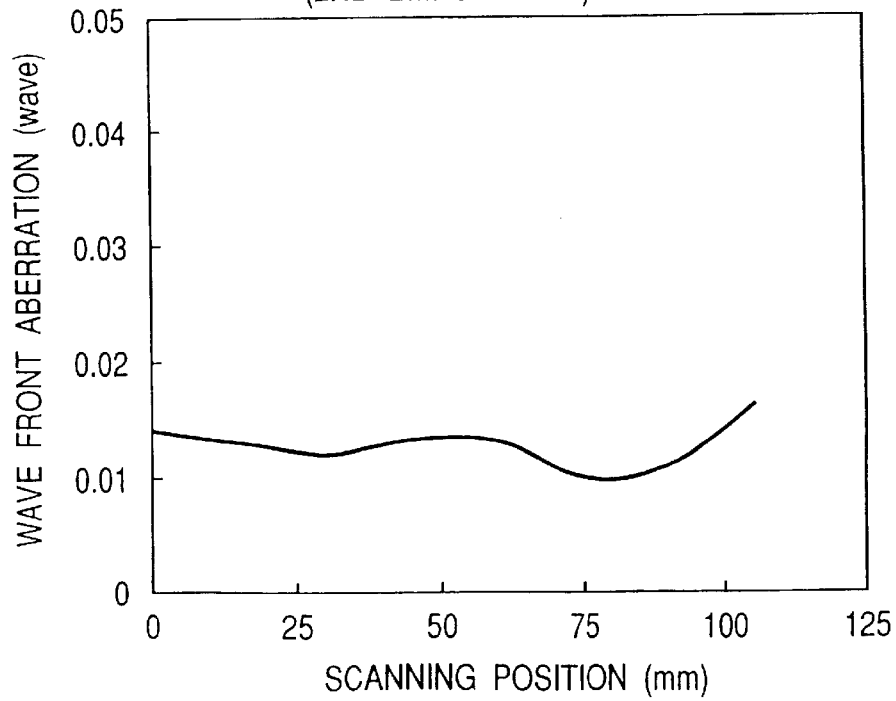
FIG. 36 is a chart showing the image-formation performance in the second embodiment.
Figure 37:
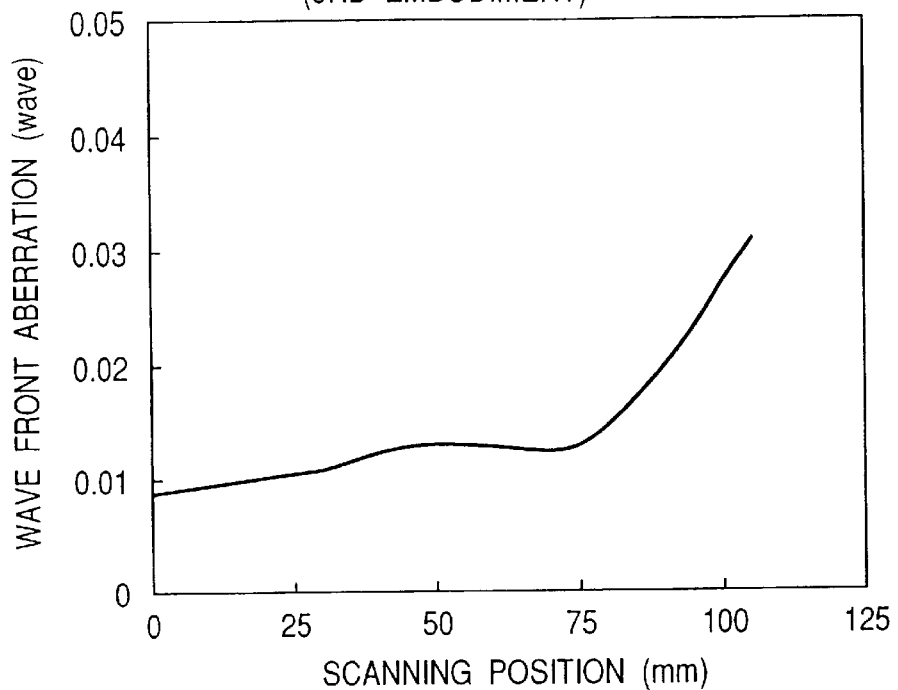
FIG. 37 is a chart showing the image-formation performance in the third embodiment.
Figure 38:
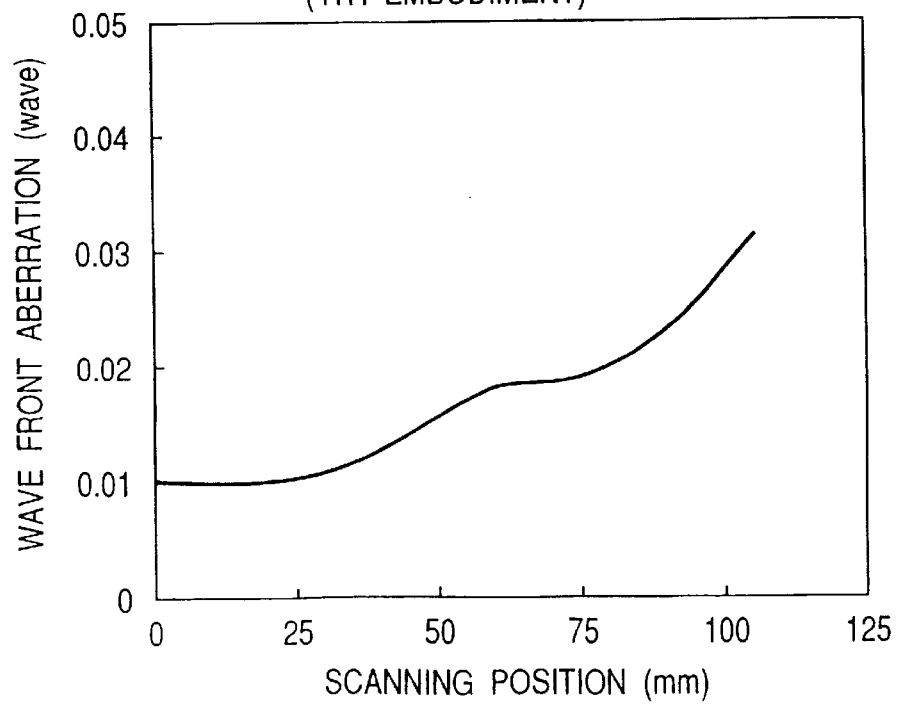
FIG. 38 is a chart showing the image-formation performance in the fourth embodiment.
Figure 39:
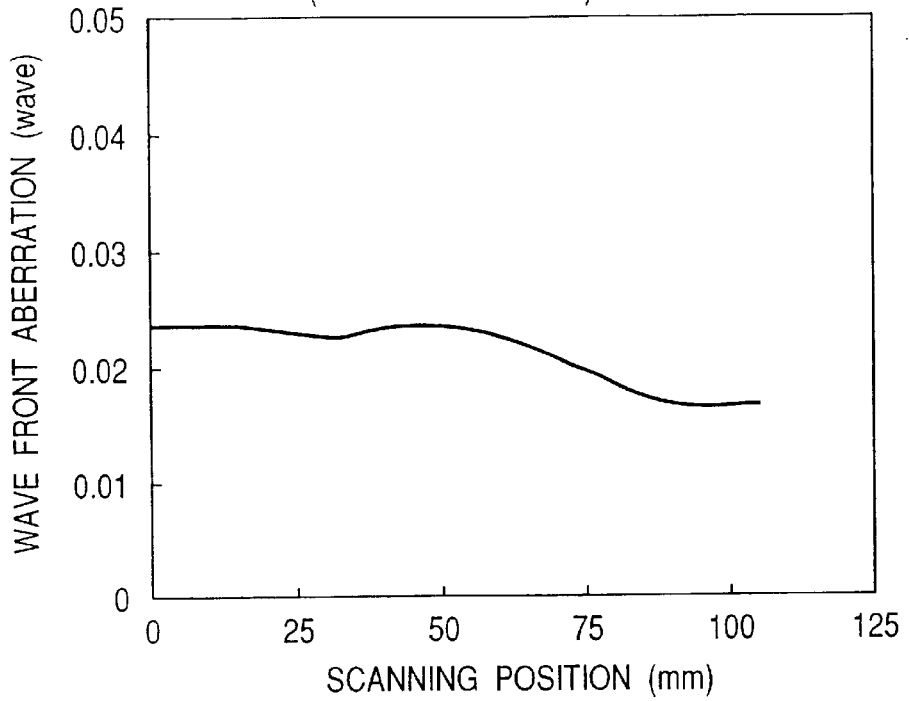
FIG. 39 is a chart showing the image-formation performance in the fifth embodiment.
Figure 40:
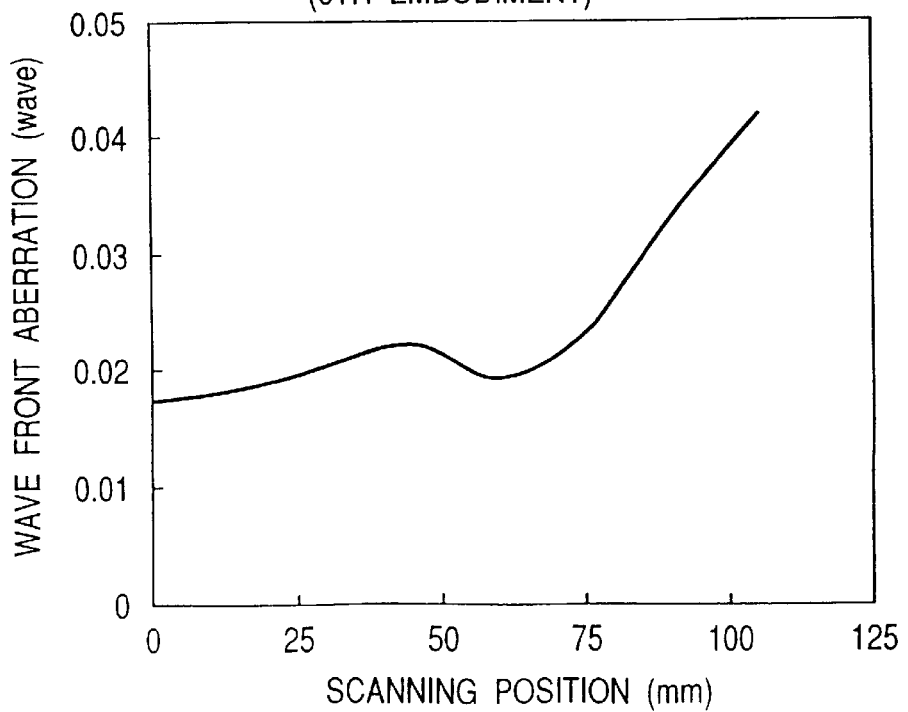
FIG. 40 is a chart showing the image-formation performance in the sixth embodiment.

FIG. 21 shows to what degree the change in the angle of oblique incidence shown in FIG. 19 has been decreased by the first surface. The difference in angle of oblique incidence, which was 1.7 deg at maximum at the incidence on the first surface, has been decreased to 0.3 deg or less even at maximum by the first surface. Also, when power, which is focused in the slow scan direction at a position close to the light deflector toward the EOS (scanning end portion) side, is applied by the second surface, FIG. 22 shows to what degree the curved light beam locus after the emission from the lens has been decreased. FIG. 22 shows the curved light beam locus in the x-y plane including a point on z-axis on the second surface. The curved light beam locus, which was 1.9 mm at maximum at the time of incidence on the first surface has been decreased to 0.4 mm or less by the second surface.

By decreasing the changes in the angle of oblique incidence and in the lens incident position in the slow scan direction by the deflection angle in this manner, it becomes possible to perform the conversion (Fθ characteristic) from constant angular velocity, for which has essentially been requested for the Fθ lens, to constant velocity, and the correction of inclination of the polygon mirror plane, and to satisfy the image-formation performance according to the present invention.

Here, the above-described three performances in the present embodiment are shown. First, FIGS. 23 to 28 show the Fθ characteristic in the first to sixth embodiments. The abscissa represents the scanning position, and the ordinate represents the error in the Fθ characteristic. The Fθ characteristic error has been calculated by a conventionally-known equation (actual scanning position—focal length F×deflection angle θ). In the first to sixth embodiments, the Fθ characteristic has been satisfactorily corrected as the error of 0.1 mm or less.

Next, the correction performance for inclination of the polygon mirror plane is shown in FIGS. 29 to 34. In FIGS. 29 to 34, the abscissa represents an amount of defocusing from the surface to be scanned, and the ordinate represents a misregistration of the light beam in the slow scan direction in order to indicate the optical path of a light beam for becoming incident on the surface to be scanned. When the inclination of the plane is 0, the light beam passes on the x-axis. The solid lines and broken lines in the figures indicate the optical paths at COS and EOS when the inclination of the polygon mirror plane was for 70 arc seconds. Since the correction of inclination of the plane restrains the light beam from shifting in the slow scan direction on the surface to be scanned even if the polygon mirror plane inclines, it is ideal that the position in the slow scan direction becomes 0 on the surface to be scanned (defocus 0 mm). As can be seen from FIGS. 29 to 34, the misregistration of the light beam on the surface to be scanned in the slow scan direction has been satisfactorily corrected to 1 μm or less at COS and EOS even if there is inclination of the polygon mirror plane for 70 arc seconds in the first to sixth embodiments.

Figure 41:
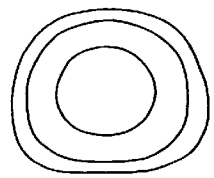
FIG. 41 is a chart showing the shape of an optical spot at EOS in the sixth embodiment.

Next, a description will be made of the image-formation performance. FIGS. 35 to 40 show the image-formation performance represented by wave front aberration (rms). As will be apparent from the figures, the wave front aberration is suppressed to be 0.04 wave or less even at maximum irrespective of the scanning position. The shape of the optical spot at EOS in the sixth embodiment whose wave front aberration was 0.04 wave at maximum is shown in FIG. 41. The horizontal direction in the figure is the slow scan direction, the vertical direction is the fast scan direction, three circles in the figure indicate spot-shaped contour lines, the outermost side thereof shows an intensity position of 5% when the intensity of the optical spot at the peak position is assumed to be 100%, the second one from outside shows an intensity position of 13.5%, and the innermost side shows an intensity position of 50%. The diameter of the optical spot is 50 μm in the fast scan direction and 58 μm in the slow scan direction at the intensity of 13.5%, which is normally used to define the diameter of the spot. The shape of the spot is a shape somewhat different from an ideal ellipse, but this degree of lost shape is a level at which no problem is presented particularly in practical use. Therefore, in the other embodiments, in which the wave front aberration is 0.04 wave or less as shown in FIG. 41, the lost profile of the optical spot is further smaller although the illustration is omitted.

Figure 42:
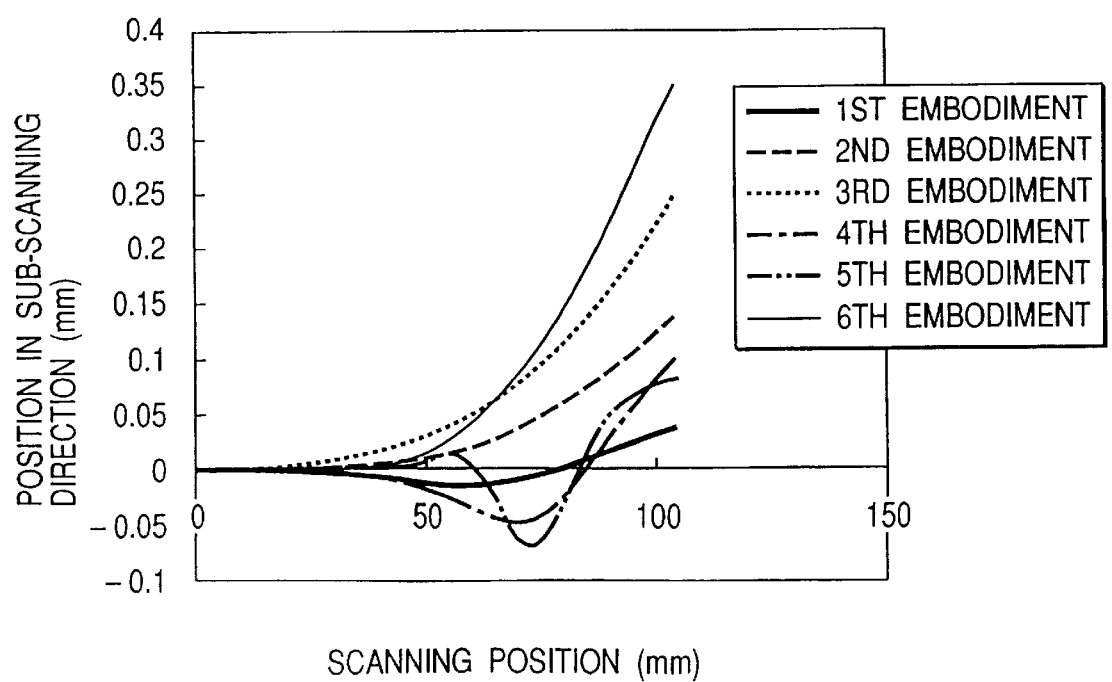
FIG. 42 is a chart showing a degree of curvature in the locus of light beams on the surface to be scanned.

FIG. 42 shows to what degree the locus of the light beam is curved on the surface to be scanned (BOW). The BOW has been corrected to a range from 0.04 mm (first embodiment) to 0.35 mm (sixth embodiment). Although the correction has been made to a level at which no problem is presented in normal use, a method for further decreasing the BOW will be described later.

Although in the first to sixth embodiments, there was one angle of oblique incidence at the scanning width of 210 mm in each embodiment, in a seventh embodiment to be described below, the design was made such that 4 deg and 8 deg as the angle of oblique incidence can be simultaneously used at the scanning width of 297 mm and the focal length of 332.3 mm. The maximum deflection angle θ of the light deflector is 12.8 deg (angle of view of the light beam is 25.6 deg) from the relation of Y=Fθ.

The optical quality in the seventh embodiment has been obtained by calculating when light beams from a light source are made into parallel light beams with a diameter of 8 mm by a collimator lens, are imaged into a long linear shape near the reflective surface of the light deflector in the fast scan direction by a cylinder lens with a focal length of 103 mm, the polygon mirror of the light deflector has a distance between the center of rotation and the reflective surface of 17 mm, and the center of rotation is arranged on the extension line of the incident light beam optical path.

Figure 43A:
FIGS. 43A and 43B are charts showing the shape of the Fθ lens in a seventh embodiment.
Figure 43B:
Figure 44:
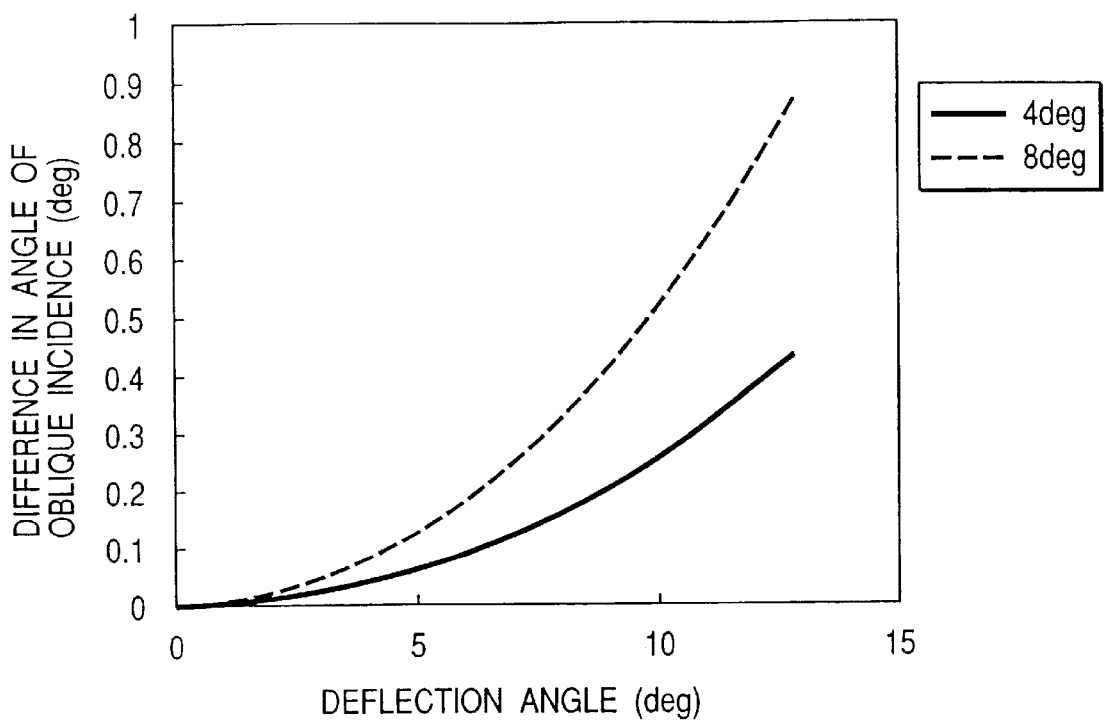
FIG. 44 is a chart showing a change in the angle of incident light beams on the Fθ lens in the seventh embodiment in the slow scan direction.
Figure 45:
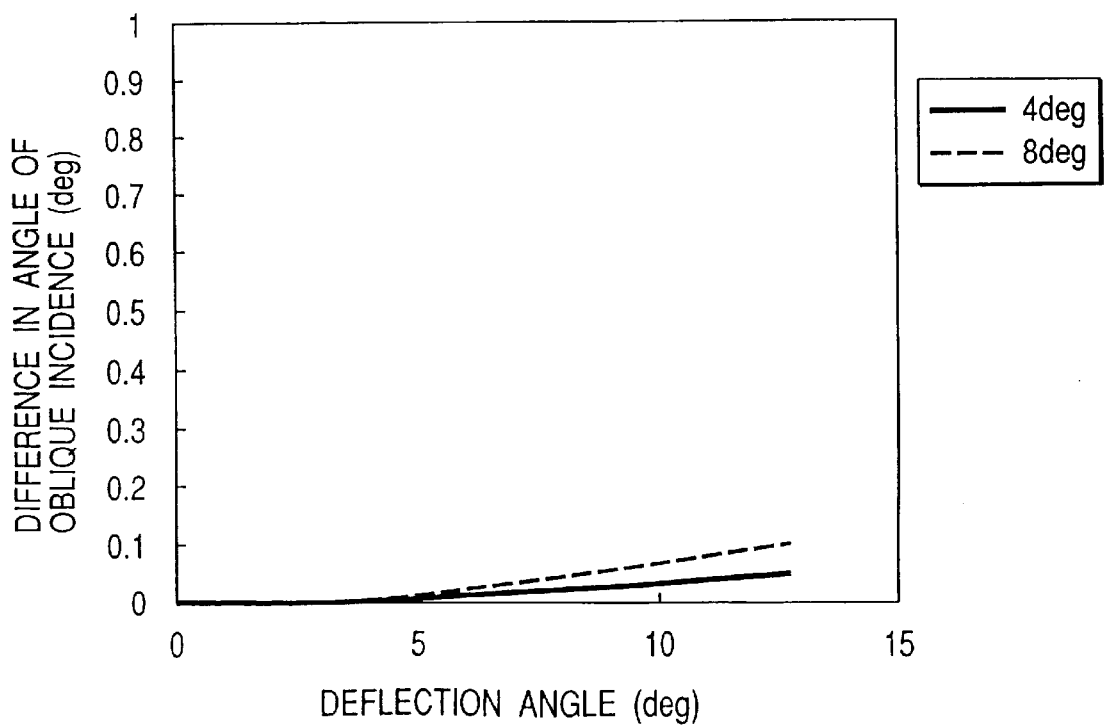
FIG. 45 is a chart showing a degree of reduction of a change in the angle of oblique incidence by the first surface of the Fθ lens in the seventh embodiment.

The shape of the Fθ lens in the seventh embodiment is shown in FIGS. 43A and 43B. The lens parameters in the seventh embodiment are shown below.

| D1 | 143.559 | D2 | 22.479 | D3 | 329.157 | n | 1.588546 |
|---|---|---|---|---|---|---|---|
| S1 | | | | | | | |
| RY | 1191.53 | RX | 2.68E+06 | KY | 47.1969 | KX | 1.63E+09 |
| AR | −6.54434E−9 | BR | 1.55993E−12 | CR | −1.70743E−16 | DR | −1.43255E−23 |
| AP | 0.00623889 | BP | 01.11294 | CP | −0.483685 | DP | −2.70993 |

-continued

| D1 | 143.559 | D2 | 22.479 | D3 | 329.157 | n | 1.588546 |

S2

| RY | −232.672 | RX | −62.8226 | KY | −1.8717 | KX | −0.895159 |
| AR | −1.60633E−9 | BR | 6.64881E−17 | CR | 6.96807E−16 | DR | −5.73494E−20 |
| AP | 1.82238 | BP | −11.1481 | CP | −0.70045 | DP | −0.565437 |

The shape of the cross section in the slow scan direction (FIG. 43A) is similar to that in the first to sixth embodiments, and the first surface is nearly a plane. The cross section in the fast scan direction (FIG. 43B) has a smaller curvature radius than that in the first to sixth embodiments, but has a larger curvature radius than the second surface as in the case of the first to sixth embodiments. The following Tables 8 to 10 summarize curvature radii Rs1, Rt1, Rs2, Rt2, |Rs1/Rs2| and |Rt1/Rt2| at the light beam passage position on the first and second surfaces. As will be apparent from Table 10, |Rs1/Rs2| and |Rt1/Rt2| at the light beam passage position are within the ranges represented by the equations (1) and (2).

TABLE 8

| Deflection | S1 | | | |
|---|---|---|---|---|
| | Slow scan direction | | Fast scan direction | |
| angle | 4 deg | 8 deg | 4 deg | 8 deg |
| 12.8 | 9625.35 | 7919.22 | 1553.66 | 1560.46 |
| 10 | 16511.6 | 10332.5 | 1348.67 | 1331.7 |
| 7.5 | 32567.3 | 13859.9 | 1267.27 | 1251.18 |
| 5 | 89900.4 | 18705.7 | 1221.48 | 1208.85 |
| 2.5 | 2.59E+06 | 23726.1 | 1196.52 | 1186.48 |
| 0 | −333040 | 26045.8 | 1188.49 | 1179.35 |

TABLE 9

| Deflection | S2 | | | |
|---|---|---|---|---|
| | Slow scan direction | | Fast scan direction | |
| angle | 4 deg | 8 deg | 4 deg | 8 deg |
| 12.8 | −69.6708 | −77.7952 | −251.203 | −263.719 |
| 10 | −67.8813 | −75.9763 | −246.973 | −259.781 |
| 7.5 | −66.7458 | −74.7771 | −242.723 | −254.981 |
| 5 | −65.9806 | −73.9622 | −239.371 | −251.122 |
| 2.5 | −65.5387 | −73.4932 | −237.265 | −248.72 |
| 0 | −65.394 | −73.3403 | −236.549 | −247.911 |

TABLE 10

| Deflection | Slow scan direction | | Fast scan direction | |
|---|---|---|---|---|
| angle | 4 deg | 8 deg | 4 deg | 8 deg |
| 12.8 | −138.155 | −101.796 | −6.18488 | −5.91713 |
| 10 | −243.242 | −135.996 | −5.4608 | −5.12624 |
| 7.5 | −487.93 | −185.35 | −5.22105 | −4.90695 |
| 5 | −1362.53 | −252.909 | −5.10287 | −4.8138 |
| 2.5 | −39570.7 | −322.834 | −5.04297 | −4.77034 |
| 0 | 5092.822 | −355.136 | −5.02429 | −4.75715 |

Figure 46:
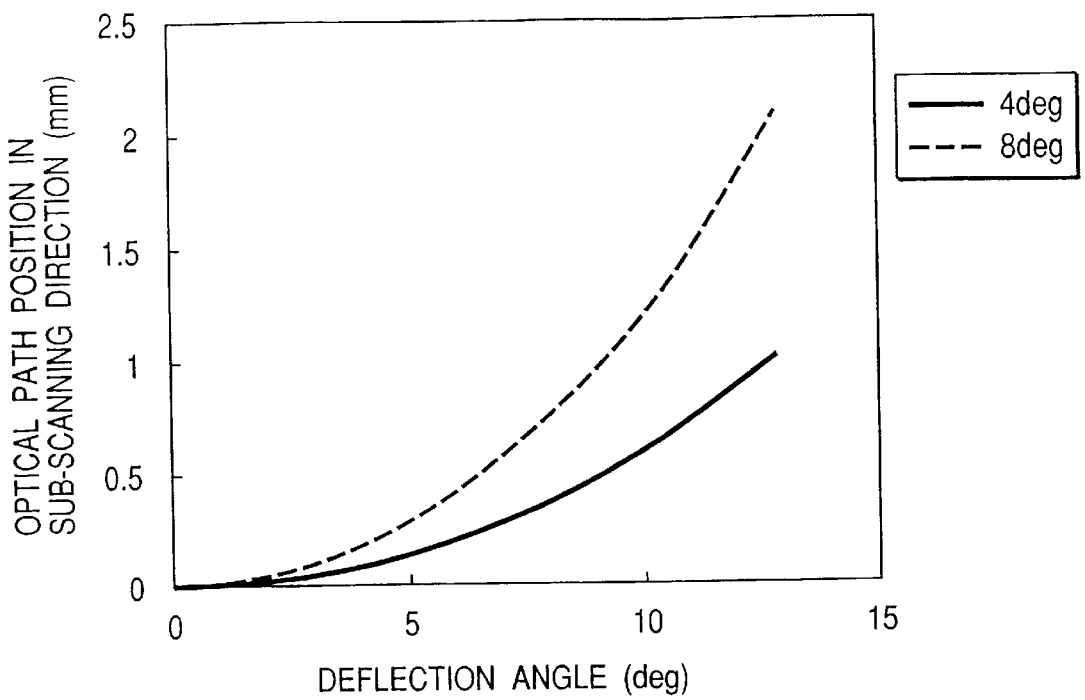
FIG. 46 is a chart showing a degree of curvature in the scanning locus on the first surface of the Fθ lens due to a change in the angle of oblique incidence in the seventh embodiment.
Figure 47:
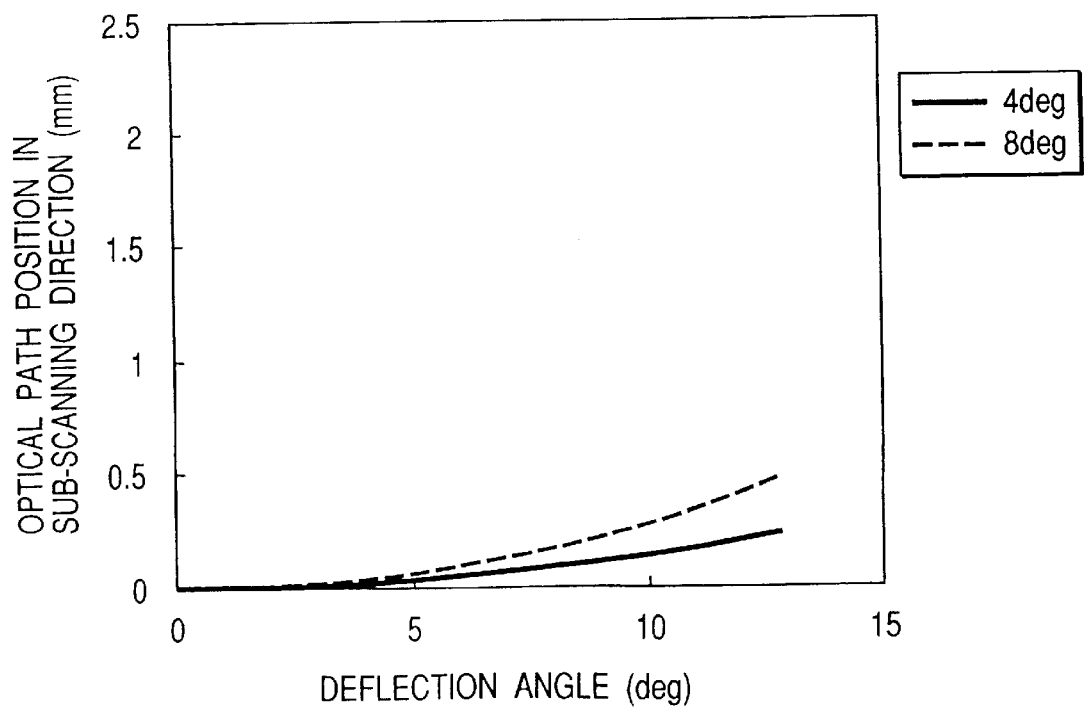
FIG. 47 is a chart showing a degree of reduction of a change in the curvature of locus of light beams by the second surface of the Fθ lens in the seventh embodiment.

Also in the seventh embodiment, FIGS. 44 to 47 show the state that the change in the angle of oblique incidence by the deflection angle is decreased on the first surface, and that the curved light beam locus is decreased by the second surface. When the angle of oblique incidence at the deflection angle of 0 deg is 4 and 8 deg, the changes in the angle of oblique incidence at the deflection angle of 12.8 deg become 0.4 deg (4 deg→4.4 deg), and 0.9 deg (8 deg→8.9 deg) respectively (FIG. 44), and the loci of the optical paths on the first surface are curved 1.0 mm (at 4 deg) and 2.0 mm (at 8 deg) respectively (FIG. 46). The change in the incident angle is decreased to 0.1 deg or less (FIG. 45) by the first surface, and the curved light path locus is decreased to 0.5 mm or less by the second surface (FIG. 47).

Figure 48:
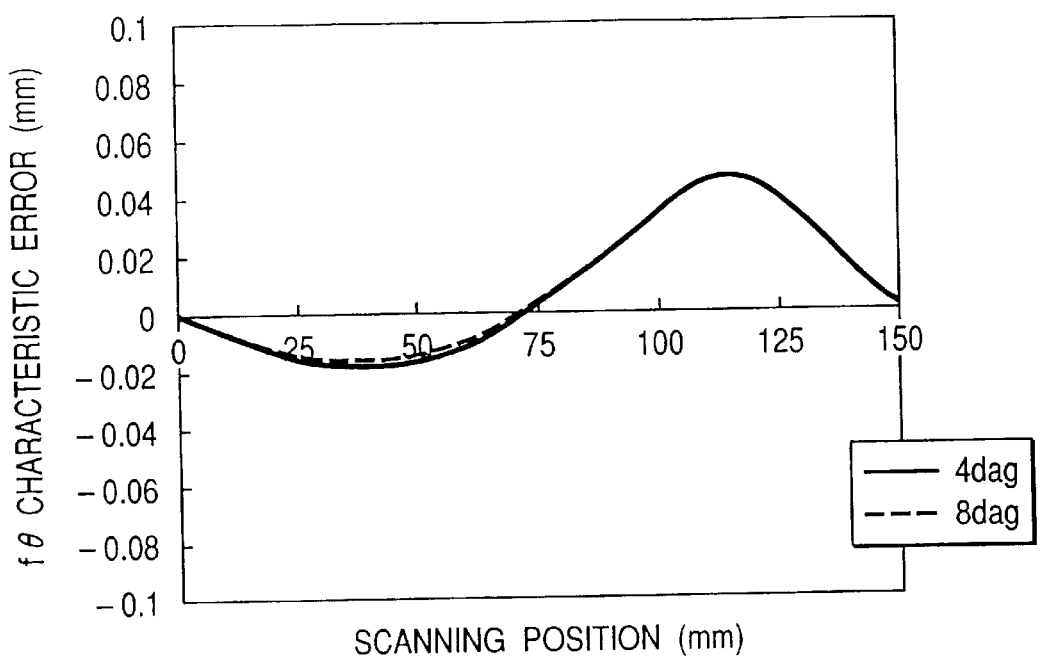
FIG. 48 is a chart showing the Fθ characteristic in the seventh embodiment.
Figure 49:
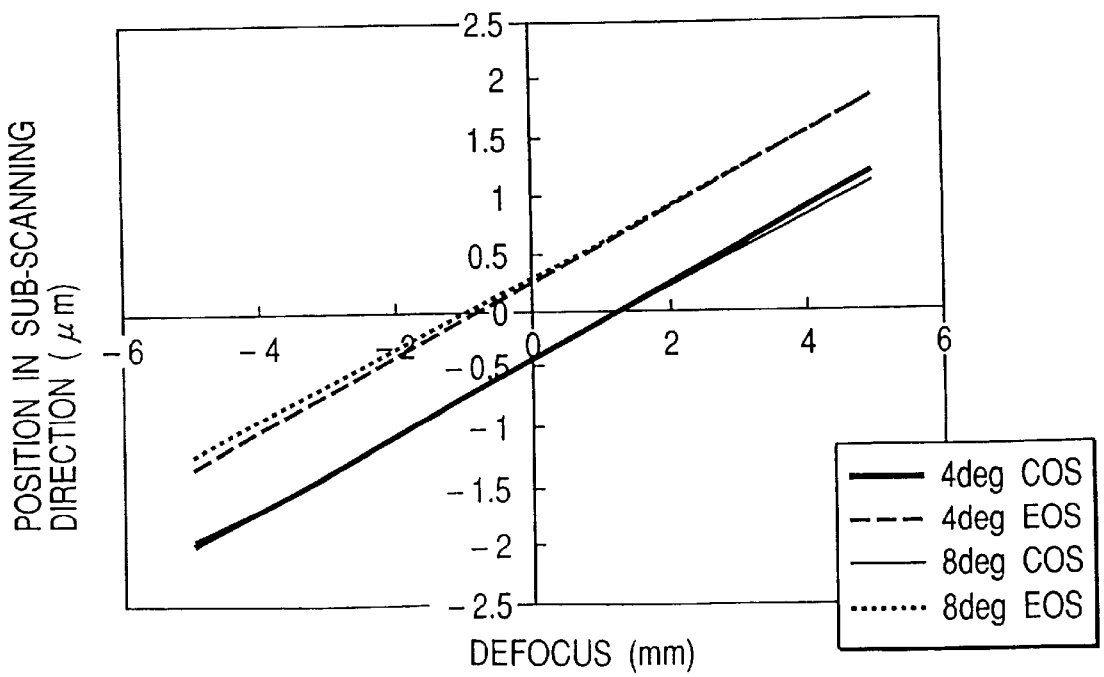
FIG. 49 is a chart showing plane-inclination correction performance of the light deflector in the seventh embodiment.
Figure 50:
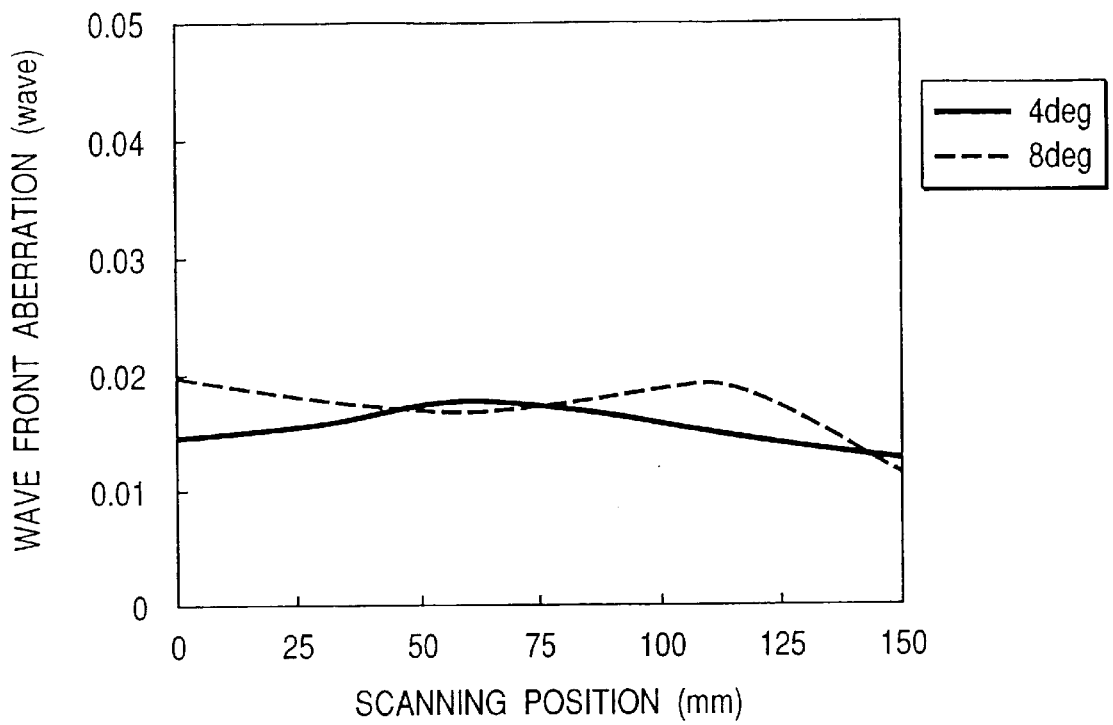
FIG. 50 is a chart showing the image-formation performance in the seventh embodiment.
Figure 51:
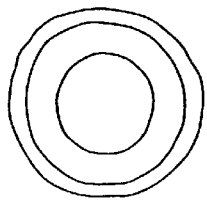
FIG. 51 is a chart showing the shape of an optical spot at EOS in the seventh embodiment.
Figure 52:
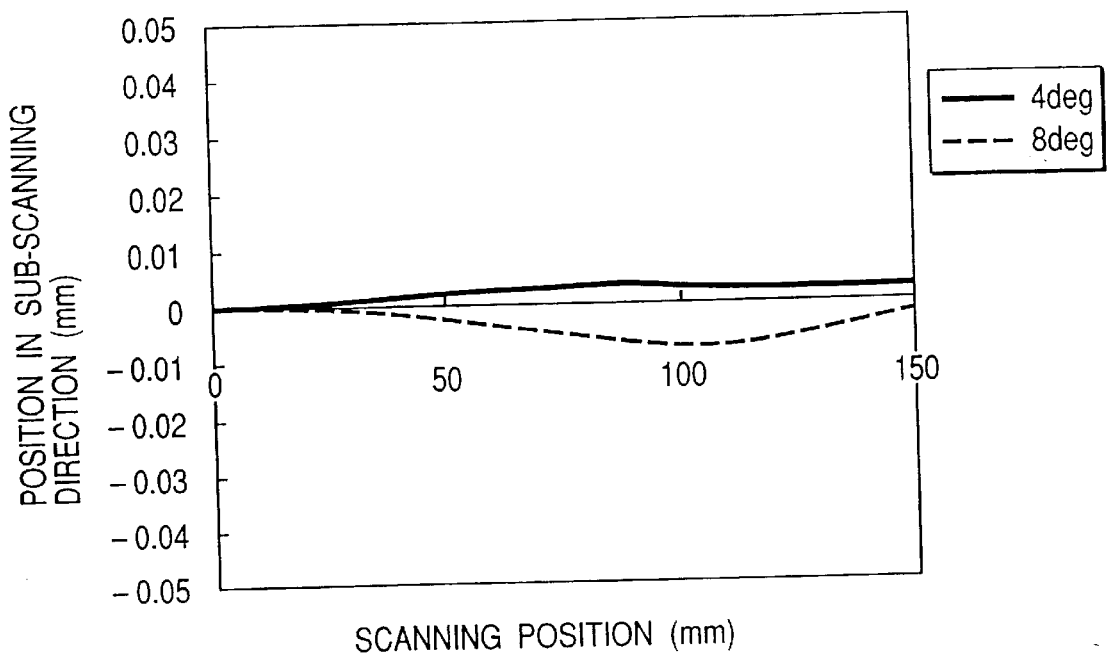
FIG. 52 is a chart showing a degree of curvature in the locus of light beams on the surface to be scanned in the seventh embodiment.

The Fθ characteristic in the seventh embodiment is shown in FIG. 48, the correction performance for inclination of the polygon mirror plane is shown in FIG. 49, and the wave front aberration is shown in FIG. 50. The embodiment has sufficient performances for all of them, and it further deserves special mention that there is hardly any difference in the performance between 4 deg and 8 deg in the angle of oblique incidence. FIG. 51 shows the shape of the optical spot at an angle of oblique incidence of 8 deg, at which the wave front aberration is large, and the scanning position of 116 mm. It is imaged on a fine circle of about 50 μm at 13.5% intensity. Also, in the seventh embodiment, the BOW on the surface to be scanned has been suppressed to as very small a value as 0.01 mm or less as shown in FIG. 52.

Figure 53:
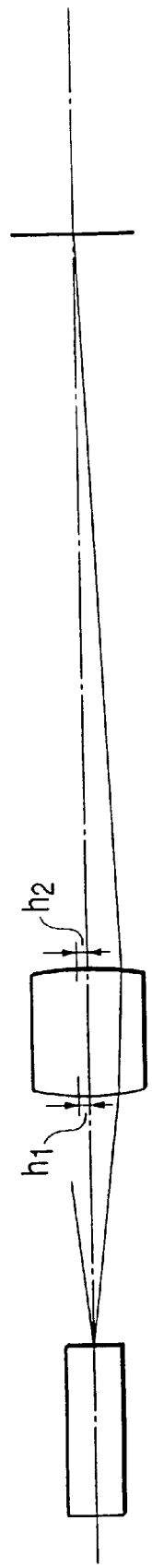
FIG. 53 is an explanatory view showing that the Fθ lens is decentered.

In a case where the deflection angle by the light deflector is comparatively small as shown in the seventh embodiment, the BOW on the surface to be scanned can be easily suppressed to be low. When, however, the deflection angle becomes large as in the first to sixth embodiments, it becomes difficult to reduce the BOW by only optimizing the aspherical coefficient. In such cases, the Fθ lens surface is decentered from the normal of a reflective surface, which passes through a light beam incident point on the deflecting refractive surface of the light deflector, on the side of the incident light beam on the light deflector in the slow scan direction as shown in FIG. 53, whereby the BOW can be further decreased. When the amount of decentering on the first surface is assumed to be h1, and that on the second surface is assumed to be h2, h1=h2 in the eighth embodiment, and h1≠h2 in the ninth embodiment.

Figure 54:
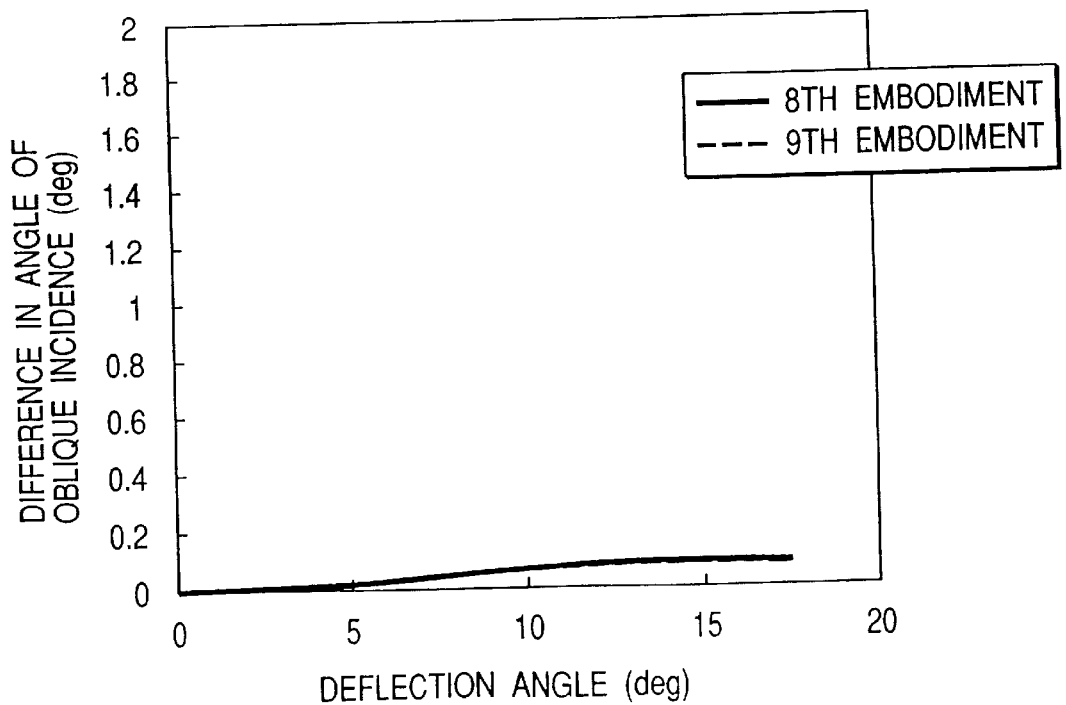
FIG. 54 is a chart showing a degree of reduction of a change in the angle of oblique incidence by the first surface of the Fθ lens decentered.
Figure 55:
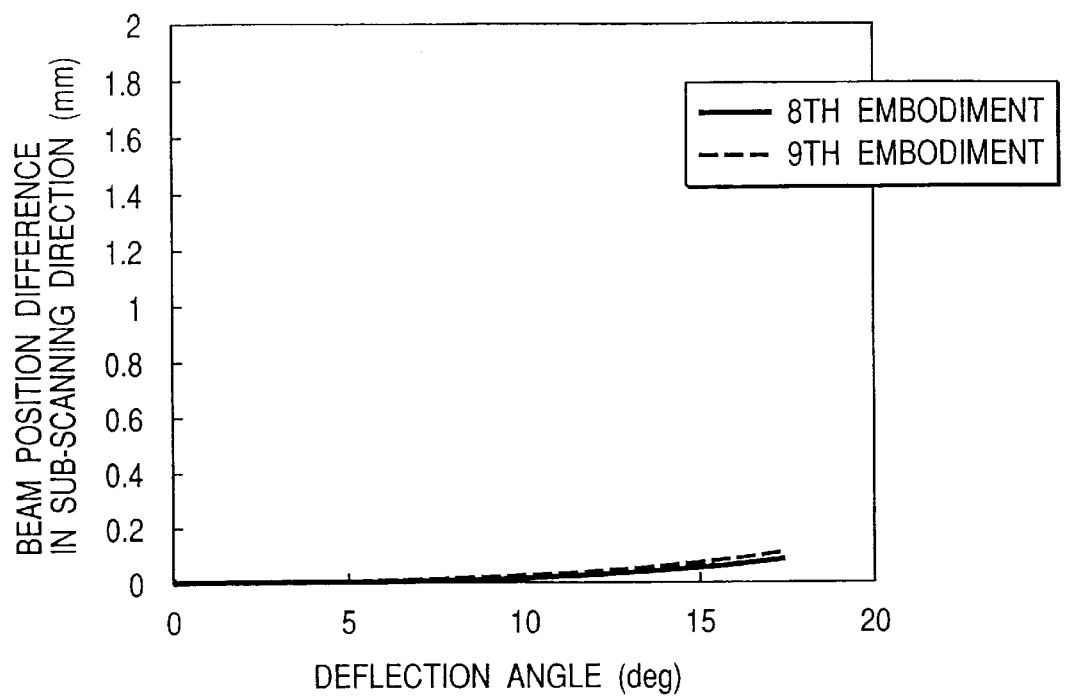
FIG. 55 is a chart showing a degree of reduction in a change in the curvature of locus of light beams by the second surface of the Fθ lens decentered.
Figure 56:
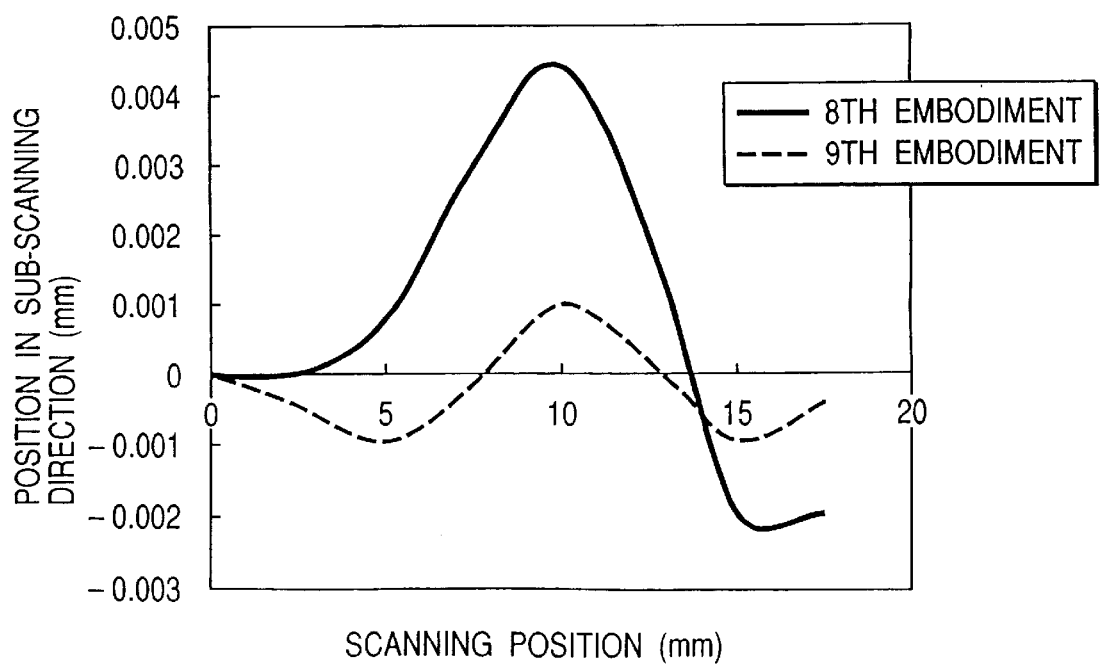
FIG. 56 is a chart showing BOW on the surface to be scanned.

The following Table 11 shows parameters in each embodiment. The deflection angle and the Fθ lens focal length are the same as in the first to sixth embodiments. FIG. 54 shows the state that the difference in the angle of oblique incidence has been decreased by the first surface, and FIG. 55 shows the state that the curved light beam locus has been decreased by the second surface. The difference in angle of oblique incidence, and the curved light beam locus on becoming incident on the first surface are caused by 6 deg in FIGS. 19 and 20. By decentering the lens surface, the difference in angle of oblique incidence, and the curvature are more favorably decreased than in the first to sixth embodiments. The BOW on the surface to be scanned, which was an object of the decentering, is as very low a value as 4.4 μm in the eighth embodiment, and 1 μm in the ninth embodiment as shown in FIG. 56.

TABLE 11

|  | Example 8 | Example 9 |
|---|---|---|
| α | 6 | 6 |
| D1 | 63.1959 | 63.0072 |
| D2 | 18.0447 | 17.9415 |
| D3 | 173.265 | 173.34 |
| n | 1.608924 | 1.608924 |
| S1 | | |
| RY | 842.123 | 801.102 |
| RX | −81251 | −72136 |
| KY | 89.0696 | 78.1025 |
| KX | 2692174 | 2058859 |
| AR | −8.362972E−08 | −8.997268E−08 |
| BR | −1.193168E−10 | 1.195005E−10 |
| CR | −3.902220E−14 | −3.871579E−14 |
| DR | 4.909745E−18 | 5.175971E−18 |
| AP | 3.051960E−01 | 2.964540E−01 |
| BP | −1.834480E−01 | −1.773090E−01 |
| CP | −1.718910E−01 | −1.703590E−01 |
| DP | −2.673830E−01 | 2.763390E−01 |
| S2 | | |
| RY | −114.870 | −115.607 |
| RX | −32.084 | −31.985 |
| KY | −1.65782 | −1.69896 |
| KX | −0.795079 | −0.796951 |
| AR | −1.831459E−08 | −1.814191E−08 |
| BR | 1.017962E−10 | 1.012424E−10 |
| CR | 4.052124E−14 | 4.264126E−14 |
| DR | −9.995797E−18 | −1.004636E−17 |
| AP | 1.79031 | 1.84297 |
| BP | −0.844966 | −0.862436 |
| CP | −0.272872 | −0.282509 |
| DP | −0.182164 | −0.184598 |
| h1 | 0.944746 | 1.415185 |
| h2 | 0.944746 | 0.871351 |

Figure 57:
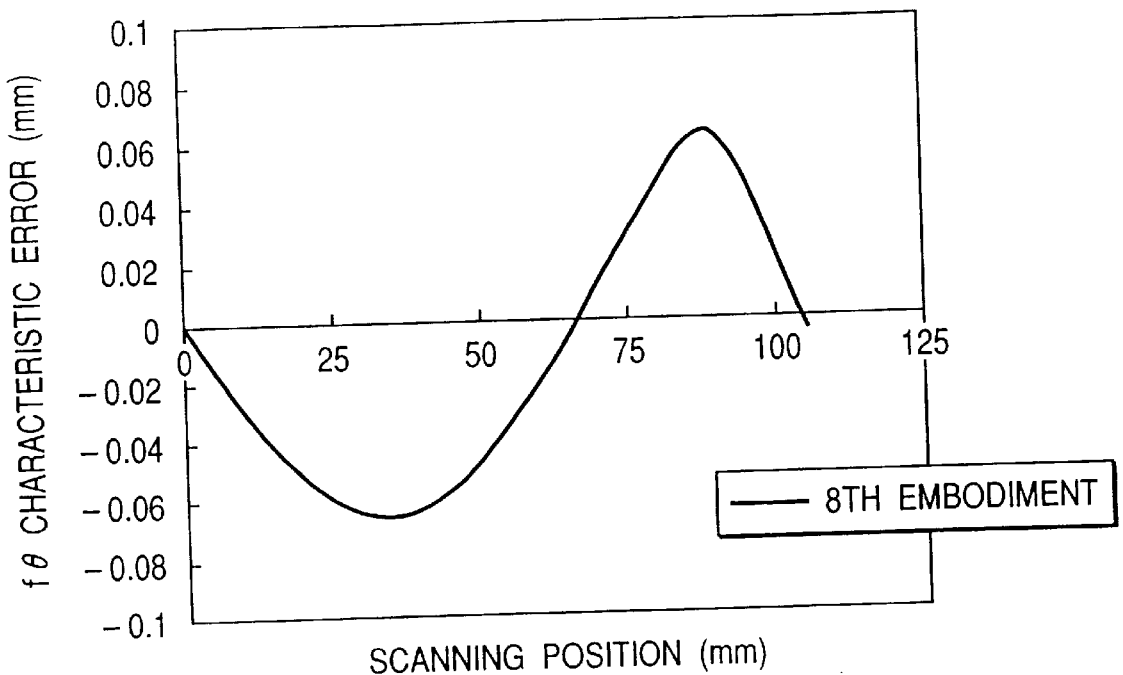
FIG. 57 is a chart showing the Fθ characteristic in an eighth embodiment.
Figure 58:
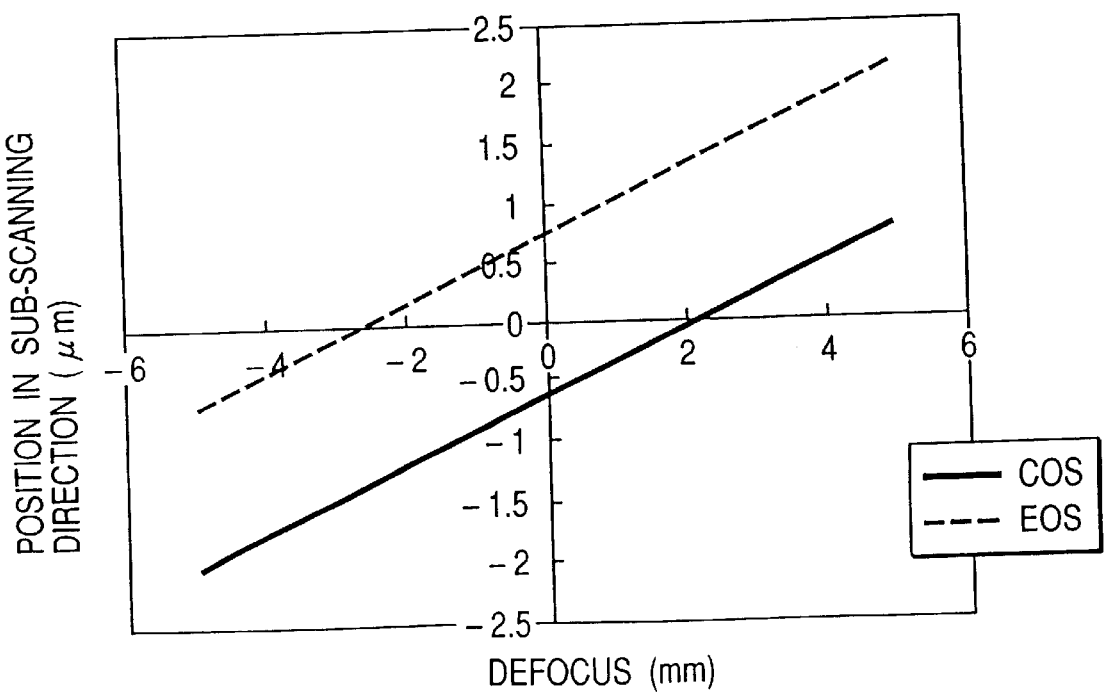
FIG. 58 is a chart showing plane-inclination correction in the eighth embodiment.
Figure 59:
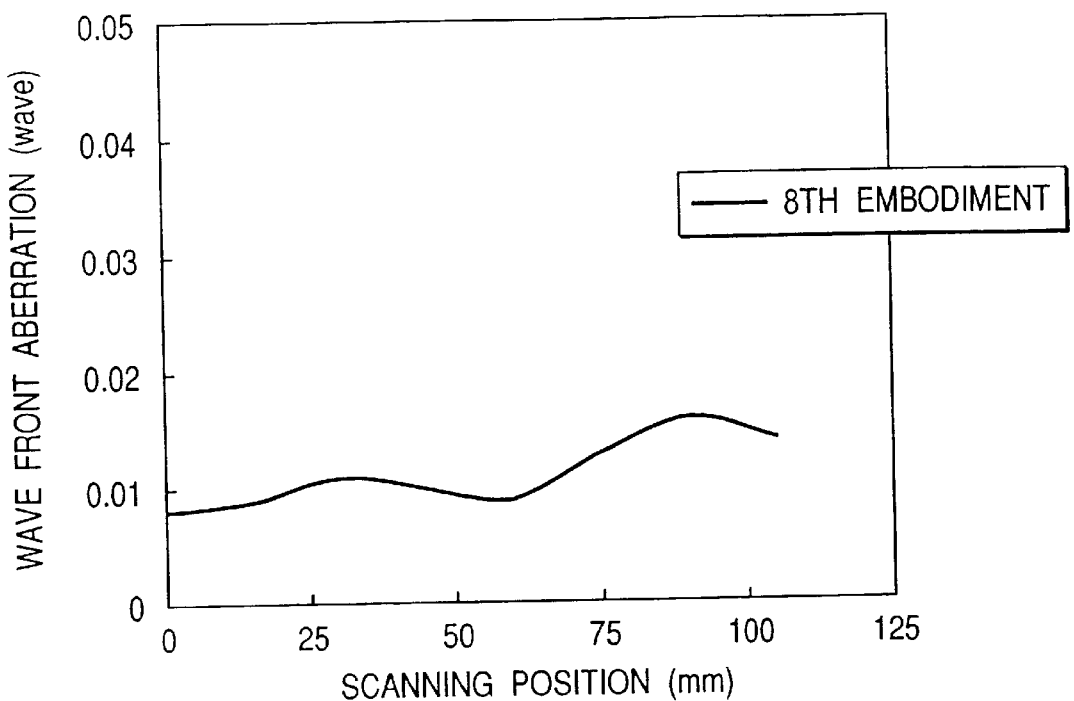
FIG. 59 is a chart showing wave front aberration in the eighth embodiment.
Figure 60:
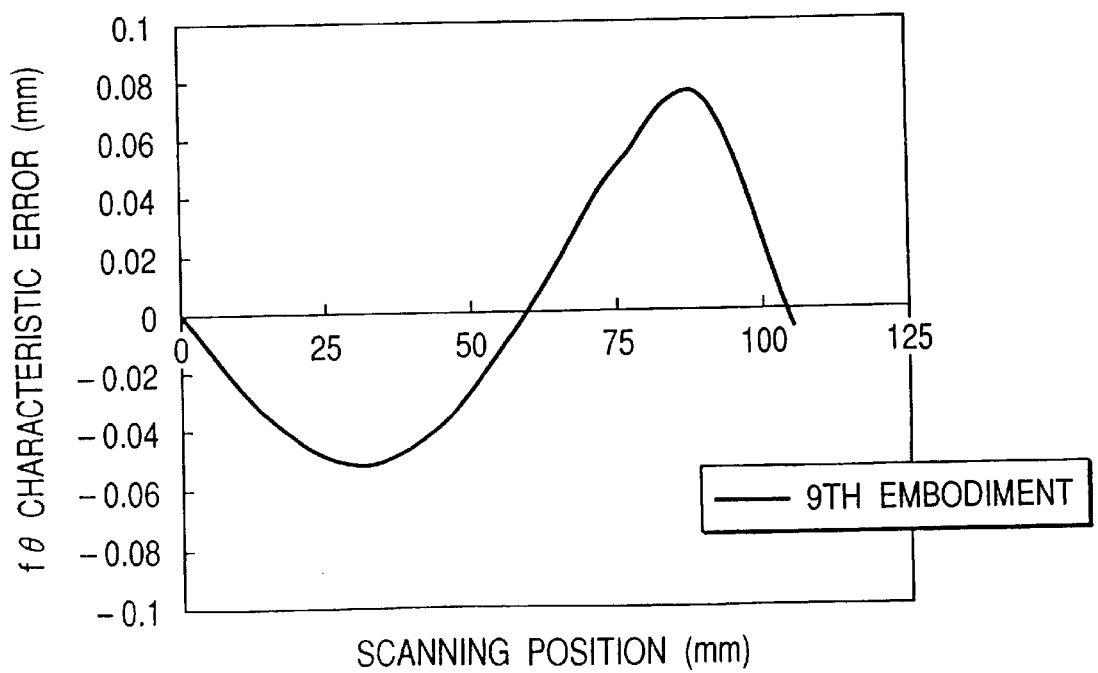
FIG. 60 is a chart showing the Fθ characteristic in a ninth embodiment.
Figure 61:
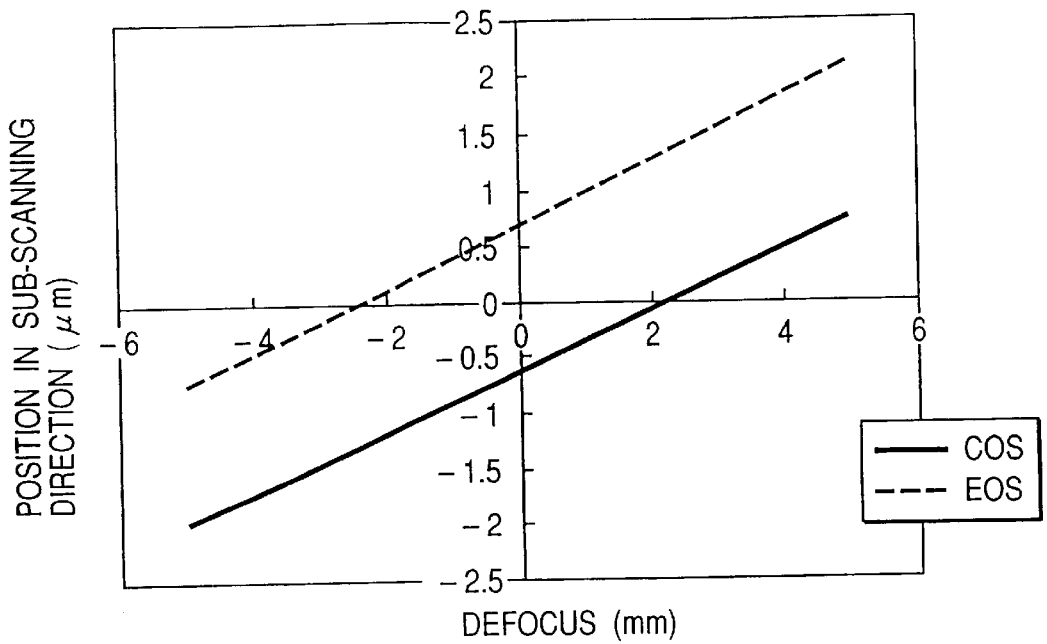
FIG. 61 is a chart showing plane-inclination correction in the ninth embodiment.
Figure 62:
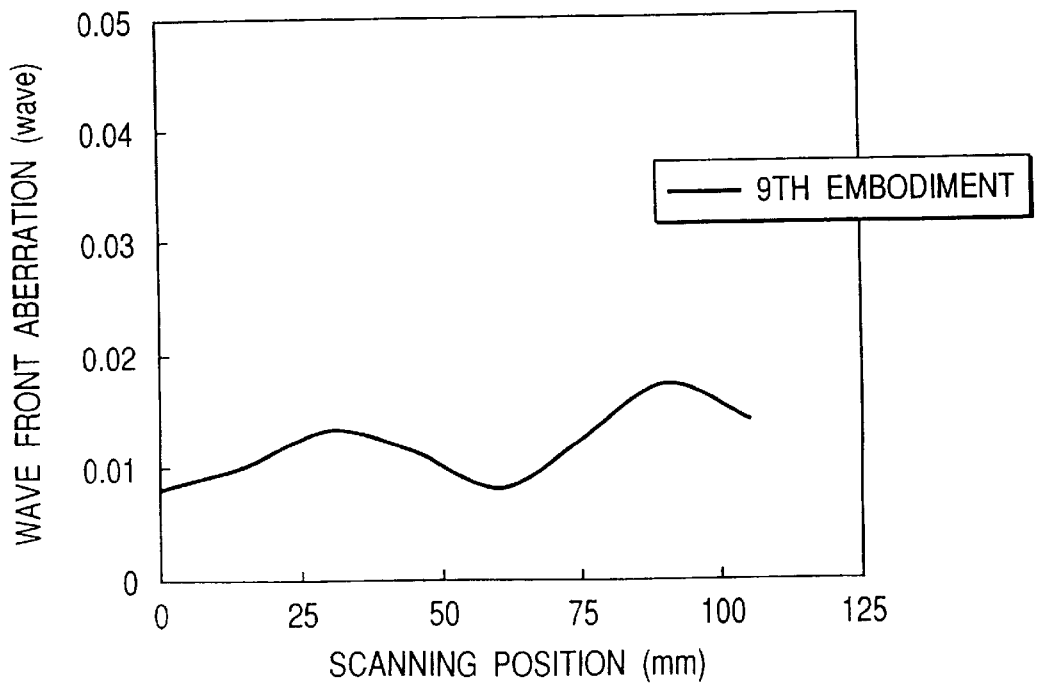
FIG. 62 is a chart showing wave front aberration in the ninth embodiment.

The following Tables 12 to 14 summarize curvature radii Rs1, Rt1, Rs2, Rt2, |Rs1/Rs2| and |Rt1/Rt2| at the light beam passage position on the first and second surfaces. As will be apparent from Table 14, |Rs1/Rs2| and |Rt1/Rt2| at the light beam passage position are within the ranges represented by the equations (1) and (2) also in the eighth and ninth embodiments. The Fθ characteristic, the correction for inclination of the plane and the wave front aberration in the eighth embodiment are shown in FIGS. 57 to 59, and the optical performance in the ninth embodiment is similarly shown in FIGS. 60 to 62. No worsened performance caused by decentering the lens surface is seen, excellent performance is maintained.

TABLE 12

| | S1 | | | |
|---|---|---|---|---|
| Deflection | Slow scan direction | | Fast scan direction | |
| angle | Example 8 | Example 9 | Example 8 | Example 9 |
| 17.5 | −1794.14 | −1970.94 | 1260.420 | 1224.420 |
| 15 | 3351.24 | 3437.64 | 1168.520 | 1132.880 |
| 12.5 | 4426.37 | 4526.46 | 11a2.720 | 1079.430 |
| 10 | 8672.38 | 8848.91 | 1127.960 | 1093.950 |
| 7.5 | 26503.60 | 28261.50 | 1064.240 | 1020.650 |
| 5 | −319455.00 | −161749.00 | 955.971 | 911.977 |
| 2.5 | −54269.10 | −45352.80 | 875.515 | 834.101 |
| 0 | −46113.10 | −39195.60 | 847.692 | 807.475 |

TABLE 13

| | S2 | | | |
|---|---|---|---|---|
| Deflection | Slow scan direction | | Fast scan direction | |
| angle | Example 8 | Example 9 | Example 8 | Example 9 |
| 17.5 | −39.2554 | −39.1296 | −110.843 | −111.626 |
| 15 | −37.9347 | −37.7846 | 126.290 | −126.462 |
| 12.5 | −36.9068 | −36.7498 | −125.008 | −125.148 |
| 10 | −36.1598 | −36.0023 | −121.619 | −121.944 |
| 7.5 | −35.6422 | −35.4862 | −119.831 | −120.334 |
| 5 | −35.3061 | −35.1516 | −119.284 | −119.913 |
| 2.5 | −35.1175 | −34.9639 | −119.208 | −119.912 |
| 0 | −35.0567 | −34.9034 | −119.213 | −119.941 |

TABLE 14

| | S1/S2 | | | |
|---|---|---|---|---|
| Deflection | Slow scan direction | | Fast scan direction | |
| angle | Example 8 | Example 9 | Example 8 | Example 9 |
| 17.5 | 45.7 | 50.4 | −11.4 | −11.0 |
| 15 | −88.3 | 91.0 | 9.3 | −9.0 |
| 12.5 | −119.9 | −123.2 | −8.8 | −8.6 |
| 10 | −239.8 | −245.8 | −9.3 | −9.0 |
| 7.5 | −743.6 | −796.4 | −8.9 | −8.5 |
| 5 | 9048.2 | 4601.5 | −8.0 | −7.6 |
| 2.5 | 1545.4 | 1297.1 | −7.3 | −7.0 |
| 0 | 13i5.4 | 1123.0 | −7.1 | −6.7 |

Figure 63A:
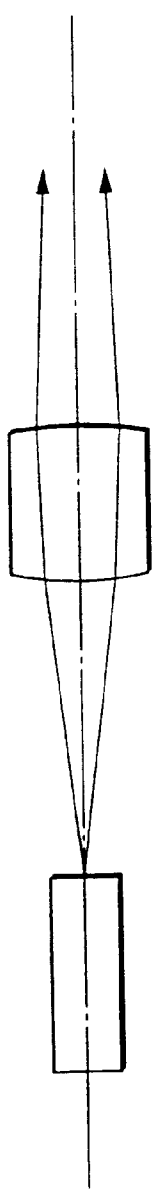
FIGS. 63A, 63B and 63C are explanatory views showing a method of causing light beams to become incident on the light deflector.
Figure 63B:
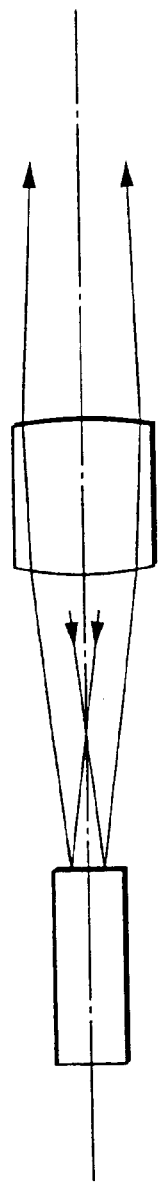

In the first to eighth embodiments, the first and second the Fθ lens are not decentered (in the eighth embodiment, however, the first and second surfaces are not decentered, but decentered to the light beam incident position on the reflective surface of the light deflector), and therefore, it is not necessary to use a plurality of lenses corresponding to the number of light beams with respect to a plurality of light beams which become incident at a symmetrical angle in the slow scan direction as in the conventional example (see, for example, the Japanese Published Unexamined Patent Application No. 10-73778). In a case where the first and second surfaces are not decentered with respect to the light beam incident position on the reflective surface of the light deflector as in the first to seventh embodiments, the optical paths are as shown in FIG. 63A. Also, in a case where the first and second surfaces are decentered with respect to the light beam incident position on the reflective surface of the light deflector as in the eighth embodiment, the Fθ lens can be decentered on the incident side with respect to the light beam incident position on the reflective surface of the light deflector as shown in FIG. 63B. In this case, however, optical paths for the first incident light beams and the second light beams reflected and deflected overlap, and therefore, it is advisable to cause the light beams to obliquely become incident also in the fast scan direction as in the technique specified in, for example, the Japanese Published Unexamined Patent Application No. 10-73778. In a case where an angle is also given in the fast scan direction, there may be cases where the shape of the Fθ lens is preferably made into a bilaterally asymmetrical shape as disclosed by the technique specified in the Japanese Published Unexamined Patent Application No. 10-73778.

Figure 63C:
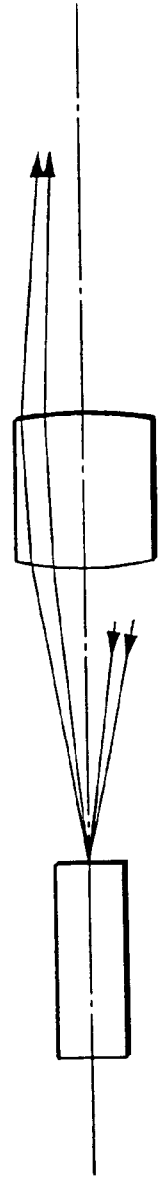

As, however, the present invention is capable of simultaneously satisfying the performance with respect to different incident angles as in the seventh embodiment, any interference of optical paths of a plurality of light beams can be avoided even if the light beams are not caused to obliquely become incident in the fast scan direction if a plurality of light beams are caused to obliquely become incident from the same direction as shown in FIG. 63C.

Figure 64:
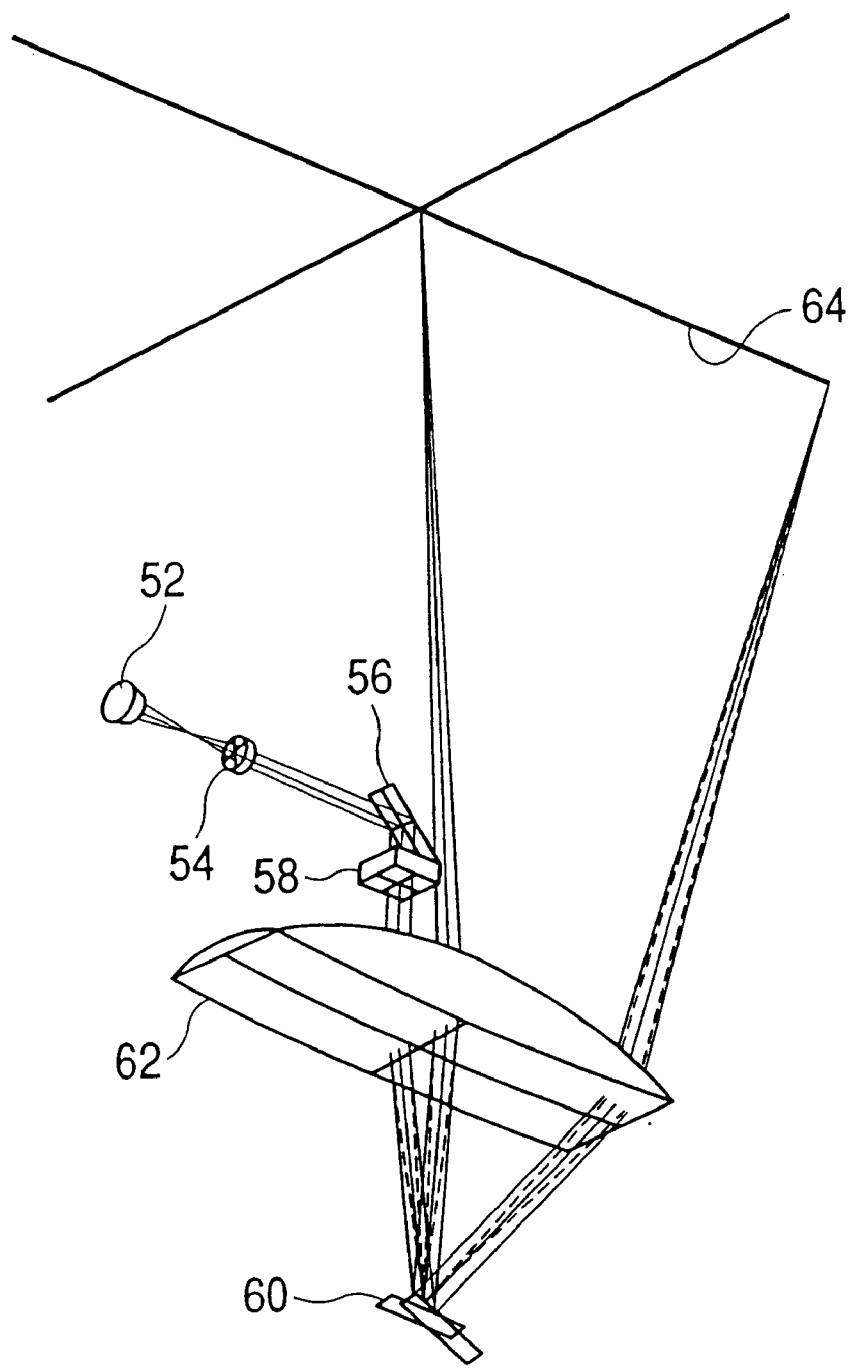
FIG. 64 is a perspective view for explaining double pass.

In the above-described embodiments, the description has been made of the structure of the optical system in which light beams are caused to pass through the Fθ lens only after reflection by the light deflector as shown in FIG. 11, but in order to reduce the angle of oblique incidence, the structure is arranged such that light beams are caused to pass through the Fθ lens also on becoming incident on the light deflector as shown in FIG. 64 (double-pass). If an optical system is arranged such that there is no reflection point and the first and second surfaces are not decentered as in the first to seventh embodiments, the incident light beam and the deflection-reflective light beam pass through symmetrical positions on the lens. Therefore, in the case of an Fθ lens according to the present invention designed such that the wave front aberration to outgoing light beams can be satisfactorily corrected, no incident light beams will be adversely affected. As regards nearly the same amount of decentering as in the eighth and ninth embodiments, no noticeable deteriorated performance occurred even if the light beam was caused to pass through the Fθ lens on becoming incident.

Although an object of the double-pass is to reduce the angle of oblique incidence as far as possible, an Fθ lens according to the present invention has power not only in such fast scan direction, as the technique specified in the Japanese Published Unexamined Patent Application No. 9-230274, but also in the slow scan direction. Therefore, while the incident light beam separates from the deflection-reflective light beam from the light deflector toward the Fθ lens, the incident light beam approaches the deflection-reflective light beam as it separates from the Fθ lens between the Fθ lens and the surface to be scanned. Therefore, a return mirror for separating the incident light beam from the deflection-reflective light beam is compelled to be arranged near the Fθ lens, and the layout of the optical system is restricted. Thus, the shape of the Fθ lens in the slow scan direction is made to be asymmetrical, to thereby make it possible to easily separate the incident light beam from the outgoing light beam. In this case, the relation of focal lengths fin and fout between the incident side area and reflected light beam side area in the slow scan direction is set into a shape in conformity with the equation (4) or (5), to thereby make it possible to realize.

Figure 65:
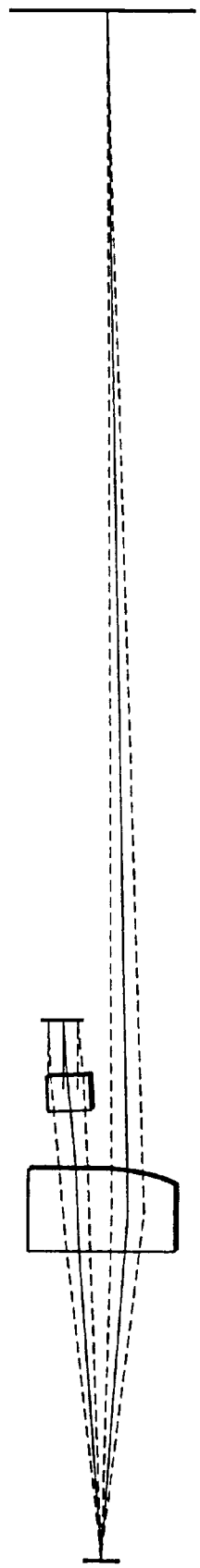
FIG. 65 is a chart showing the Fθ lens constructed in an asymmetrical shape in the slow scan direction.

The structure in the slow scan direction is shown in FIG. 65 (tenth embodiment). In the tenth embodiment, the area, through which reflected light beams by the light deflector pass, both on the first and second surfaces have a shape represented by the equation (3) and has a curvature radius in the slow scan direction. In an area, through which incident light beams on the light deflector pass, the shape in the fast scan direction is represented by the equation (6), and the shape is a plane in the slow scan direction. In this structure, the focal length fin of the incident side area in the slow scan direction is infinity, the reflective light beam side has a finite focal length, and therefore, the equation (4) is satisfied. In the tenth embodiment, the incident light beam side surface and the reflective light beam side surface are in contact on y-axis (x=0), and the shape of the reflective light beam side surface is the same as in the first embodiment. Parameters for the incident light beam side shape are shown below.

| First Surface | | | | | |
|---|---|---|---|---|---|
| RS | ∞ | A | −1.993139E−7 | B | 7.484022E−11 |
| | | C | −1.707617E−14 | D | 7.769040E−19 |
| Second Surface | | | | | |
| RS | ∞ | A | −1.937542E−7 | B | 1.001177E−12 |
| | | C | 1.131985E−14 | D | −3.436560E−18 |

The other parameters are the same as in the first embodiment. Also, the incident-side shape parameters A, B, C and D, and the deflection/reflection-side shape parameters AR, BR, CR, DR, AP, BP, CP and DP satisfy the equations (7) to (10). The shapes of the surfaces of the Fθ lens are set in this manner, whereby the incident light beam and the deflection/reflection light beam separate from each other toward the surface to be scanned even between the Fθ lens and the surface to be scanned. Therefore, it becomes easy to separate the incident light beam from the deflection/reflection light beam, the shapes of portions in contact between the incident light beam passage area and the deflection/reflection light beam passage area become the same, and therefore, the boundary between the incident light area and the deflection/reflection light area becomes continuous. Thus, there is the effect that it becomes easy to manufacture the lens. The shape of the incident side in the slow scan direction need not be a plane (RS=∞), and if RS for each surface is set to satisfy the equation (4) or (5), it becomes easier to separate than a lens having vertically-symmetrical shape in the slow scan direction.

What is claimed is:

1. An optical scanner having a deflection part that deflects, in a fast scan direction, a light beam incident to incline its optical axis by a predetermined angle in a slow scan direction, which intersects said fast scan direction; and a scanning optical system provided on a deflection side of said deflection part, for focusing, on a surface to be scanned, the light beam incident to scan an optical spot, wherein said scanning optical system being constructed of a scanning lens, which refracts, on a first refractive surface on the side of said deflection part, to reduce a change in an incident angle of the incident light beam in the slow scan direction, said change occurs in response to a deflection angle of said deflection part within a fast scan range in the fast scan direction, and which emits, on a second refractive surface on the side of said surface to be scanned, such that the light beam after emission substantially coincide in the slow-scan direction.

2. The optical scanner according to claim 1, wherein said scanning lens is constructed of a single lens whose double sides are aspherical.

3. The optical scanner according to claim 1, wherein said scanning lens functions as an Fθ lens.

4. An optical scanner having a deflection part that deflects, in a fast scan direction, a light beam incident to incline its optical axis by a predetermined angle in a slow scan direction, which intersects the fast scan direction; and a scanning optical system provided on a deflection side of said deflection part, that focuses, on a surface to be scanned, the light beam incident to scan an optical spot, wherein said scanning optical system being a scanning lens constructed of a single lens, and when the lens surface on the side of said deflection part is set to a first surface, the lens surface on the side of said surface to be scanned is set to a second surface, curvature radii at a light beam passage position at the same deflection angle for the first and second surfaces in the slow scan direction are set to Rs1 and Rs2 respectively, and curvature radii at the light beam passage position in the fast scan direction are set to Rt1 and Rt2 respectively, the shapes of said first and second surfaces at a position where at least light beams at the same deflection angle pass through being formed to satisfy the following equations (1) and (2):

$$|Rs1/Rs2| \geq 5.9 \quad (1)$$

$$|Rt1/Rt2| \geq 3.7 \quad (2).$$

5. The optical scanner according to claim 4, wherein assuming the direction of the axis of rotation of the deflection part to be x, the fast scan direction perpendicular to the x-axis to be y, a direction perpendicular to the x-axis and y-axis to be z, a curvature radius near the z-axis in the slow scan direction to be RX, a curvature radius near the z-axis in the fast scan direction to be RY, a conical constant of the aspherical shape including the z-axis in the slow scan direction to be KX, a conical constant of the aspherical shape including the z-axis in the fast scan direction to be KY, and higher order aspherical constants to be AR, BR, CR, DR, AP, BP, CP and DP respectively, the aspherical shapes of said scanning lens on both sides are curved surfaces in which the position z of the surface in the z-axis direction is represented by the following equation (3):

[Equation 1]

$$z = \frac{\frac{x^2}{RX} + \frac{y^2}{RY}}{1 + \sqrt{1 - (1+KX) \cdot \left(\frac{x}{RX}\right)^2 - (1+KY) \cdot \left(\frac{y}{RY}\right)^2}} + \\ AR \cdot [(1-AP) \cdot x^2 + (1+AP) \cdot y^2]^2 + \\ BR \cdot [(1-BP) \cdot x^2 + (1+BP) \cdot y^2]^3 + \\ CR \cdot [(1-CP)x^2 + (1+CP) \cdot y^2]^4 + \\ DR \cdot [(1-DP) \cdot x^2 + (1+DP) \cdot y^2]^5. \quad (3)$$

6. The optical scanner according to claim 4, wherein a plurality of light beams are incident on said deflection part.

7. The optical scanner according to claim 6, wherein said deflection part has a deflecting surface for reflecting incident light beams, the angles which the incident light beams form with a normal of said deflecting surface are a substantially coincided angle in said slow scan direction and the light beams are incident from both sides with said normal substantially as the center.

8. The optical scanner according to claim 6, wherein said plurality of light beams are incident on said deflection part at different angles in said slow scan direction.

9. The optical scanner according to claim 4, wherein at least any one of said first and second surfaces of said scanning lens is decentered to reduce the curved scanning line formed on said surface to be scanned by the deflection of said deflection part.

10. The optical scanner according to claim 4, wherein said scanning lens is formed asymmetrically in the slow scan direction.

11. The optical scanner according to claim 10, wherein, when a focal length of said scanning lens on x-axis in an incident light beam passage area is set to fin, and a focal length on x-axis in a deflected light beam passage area is set to fout, fin and fout satisfy the following equation (4) or (5):

$$fin < 0 \quad (4)$$

$$fin > fout \quad (5).$$

12. The optical scanner according to claim 11, wherein said scanning lens is, on both the first and second surfaces, formed into the aspherical shape as follows:

assuming the direction of the axis of rotation of the deflection part to be x, the fast scan direction perpendicular to the x-axis to be y, a direction perpendicular to the x-axis and y-axis to be z, a curvature radius near the z-axis in the slow scan direction to be RX, a curvature radius near the z-axis in the fast scan direction to be RY, a conical constant of the aspherical shape including the z-axis in the slow scan direction to be KX, a conical constant of the aspherical shape including the z-axis in the fast scan direction to be KY, and higher order aspherical constants to be AR, BR, CR, DR, AP, BP, CP and DP respectively, the aspherical shapes of said scanning lens on both sides are curved surfaces in which the position z of the surface in the z-axis direction is represented by the following equation (3):

[Equation 1]

$$z = \frac{\frac{x^2}{RX} + \frac{y^2}{RY}}{1 + \sqrt{1 - (1+KX) \cdot \left(\frac{x}{RX}\right)^2 - (1+KY) \cdot \left(\frac{y}{RY}\right)^2}} + \\ AR \cdot [(1-AP) \cdot x^2 + (1+AP) \cdot y^2]^2 + \\ BR \cdot [(1-BP) \cdot x^2 + (1+BP) \cdot y^2]^3 + \\ CR \cdot [(1-CP)x^2 + (1+CP) \cdot y^2]^4 + \\ DR \cdot [(1-DP) \cdot x^2 + (1+DP) \cdot y^2]^5 \quad (3)$$

the aspherical shape in an area, where a light beam deflected by a deflection part passes through, and wherein assuming higher order aspherical constants to be A, B, C and D, in an area where a light beam incident on said deflection part passes through, shapes of the first and second surfaces on y-axis are, when a position z on a surface in the z-axis direction is represented by the following equation (6), curved surfaces obtained by rotating the shape about an axis, parallel to x-axis, spaced apart by RS from the origin:

[Equation 2]

$$z = \frac{\frac{y^2}{RY}}{1 + \sqrt{1 - (1+KY) \cdot \left(\frac{y}{RY2}\right)}} + A \cdot y^4 + B \cdot y^6 + C \cdot y^8 + D \cdot y^{10}. \quad (6)$$

13. The optical scanner according to claim 12, wherein the shape of said scanning lens satisfies the following equations (7) to (10):

$$A = AR \cdot (1+AP)^2 \quad (7)$$

$$B = BR \cdot (1+BP)^2 \quad (8)$$

$$C = CR \cdot (1+CP)^2 \quad (9)$$

$$D = DR \cdot (1+DP)^2 \quad (10).$$

14. A scanning lens provided between a surface to be scanned and a deflection part that deflects, at substantially constant angular velocity in a fast scan direction, a light beam incident to incline its optical axis by a predetermined angle in a slow scan direction, which intersects the fast scan direction, for focusing, on a surface to be scanned, the light beam incident to scan an optical spot, wherein, when a lens surface on the side of said deflection part is set to a first surface, a lens surface on the side of said surface to be scanned is set to a second surface, curvature radii at a light beam passage position at the same deflection angle for the first and second surfaces in the slow scan direction are set to Rs1 and Rs2 respectively, and curvature radii at the same light beam passage position in the fast scan direction are set to Rt1 and Rt2 respectively, both the first surface and the second surface being formed into an aspherical shape and the shape of said scanning lens at a position, where light beams at the same deflection angle pass through, being formed to satisfy the following equations:

$$|Rs1/Rs2| \geq 5.9$$

$$|Rt1/Rt2| \geq 3.7.$$

15. An image forming apparatus, comprising:

A deflection part that deflects, in a fast scan direction, a light beam incident to incline its optical axis by a predetermined angle in a slow scan direction, which intersects the fast scan direction;

a scanning optical system provided on a deflection side of said deflection part, for focusing, on a photoreceptor, the light beam incident to scan an optical spot, for refracting, on a first refractive surface on the side of said deflection part, to reduce a change in the incident angle of the incident light beam in the slow scan direction, said change occurs in response to the deflection angle of the deflection part within a fast scan range in the fast scan direction, and for emitting, on a second refractive surface on the side of the photoreceptor, such that a light beam after the emission substantially coincide in the slow scan direction; and an image forming part that uses an image on said photoreceptor formed by irradiation light to form said image on a recording medium.

16. An image forming apparatus, comprising:

a deflection part that deflects, in a fast scan direction, a plurality of light beams incident to incline their optical axes by a predetermined angle in a slow scan direction, which intersects said fast scan direction;

a scanning optical system provided on a deflection side of said deflection part, for focusing, on a photoreceptor, each of a plurality of light beams incident to scan an optical spot, for refracting, on a first refractive surface on the side of said deflection part, to reduce a change in the incident angle of the incident light beams in the slow scan direction, said change occurs in response to a deflection angle of said deflection part within a fast scan range in the fast scan direction, and for emitting, on a second refractive surface on the side of the photoreceptor, such that the light beams after the emission substantially coincide in the slow scan direction;

a guiding part that guides each of a plurality of light beams emitted from said scanning optical system to different positions on said photoreceptor; and an image forming part that uses each of images on said photoreceptor formed by irradiation light by each of the light beams guided by said guiding part to form a composite image on a recording medium by combining those images.

17. An image forming apparatus, comprising:

a deflection part that deflects, in a fast scan direction, a plurality of light beams incident to incline their optical axes by a predetermined angle in a slow scan direction, which intersects the fast scan direction;

a scanning optical system provided on a deflection side of said deflection part, for focusing each of a plurality of light beams incident to scan an optical spot, for refracting, on a first refractive surface on the side of said deflection part, to reduce a change in the incident angle of the incident light beams in the slow scan direction, said change occurs in response to the deflection angle of said deflection part within a fast scan range in the fast scan direction, and for emitting, on a second refractive surface on the side of the photoreceptor, such that the light beams after the emission substantially coincide in the slow scan direction;

a photosensitive part that has a plurality of photoreceptors, comprising each of said plurality of light beams corresponded to each of said plurality of photoreceptors respectively;

a guiding part that guides each of a plurality of light beams emitted from said scanning optical system onto said corresponding photoreceptor; and an image forming part that uses each of images on said photoreceptor formed by irradiation light to form a composite image on a recording medium by combining those images.

18. An image forming apparatus according to claim 17, wherein said guiding part includes a separating part that separates into light beams corresponding to each of said photoreceptors.

19. An image forming apparatus, comprising:

a deflection part that has a plurality of deflecting surfaces for reflecting incident light beams, and that deflects, to each of different deflecting surfaces in a fast scan direction, each of a plurality of light beams incident to incline their optical axes by a predetermined angle in a slow scan direction, which intersects the fast scan direction;

a scanning optical system having a plurality of scanning lenses, provided on a deflection side of said deflection part, for focusing one or a plurality of light beams incident to scan an optical spot while corresponding to one or a plurality of light beams deflected by each of said plurality of deflecting surfaces, for refracting, on a first refractive surface on the side of said deflection part, to reduce a change in the incident angle of the incident light beams in the slow scan direction, said change occurs in response to the deflection angle of the deflection part within a fast scan range in the fast scan direction, and for emitting, on a second refractive surface on the side of a photoreceptor, such that the light beams after the emission substantially coincide in the slow scan direction;

a photosensitive part that has a plurality of photoreceptors, comprising each of said plurality of light beams corresponded to each of said plurality of photoreceptors;

a guiding part that guides each of a plurality of light beams emitted from said scanning optical system onto said photoreceptor corresponding thereto; and an image forming part that uses respective images on said photoreceptor formed by irradiation light to form a composite image on a recording medium by combining said images.

20. The image forming apparatus according to claim 19, wherein said deflection part causes light beams to become incident on each of the deflecting surfaces opposed to incline their optical axes by a predetermined angle in the slow scan direction, which intersects the fast scan direction.

* * * * *